United States Patent
Rigney

(10) Patent No.: US 11,022,051 B2
(45) Date of Patent: Jun. 1, 2021

(54) INTERNAL COMBUSTION ENGINE AND METHOD OF OPERATING AN INTERNAL COMBUSTION ENGINE

(71) Applicant: WATER 2 HYDROGEN (IP) PTY LTD, Victoria (AU)

(72) Inventor: Shaun T. Rigney, Victoria (AU)

(73) Assignee: WATER 2 HYDROGEN (IP) PARTY LTD, Victoria (AU)

(*) Notice: Subject to any disclaimer, the term of this patent is extended or adjusted under 35 U.S.C. 154(b) by 0 days.

(21) Appl. No.: 17/052,180

(22) PCT Filed: May 2, 2019

(86) PCT No.: PCT/AU2019/050405
§ 371 (c)(1),
(2) Date: Oct. 31, 2020

(87) PCT Pub. No.: WO2019/210369
PCT Pub. Date: Nov. 7, 2019

(65) Prior Publication Data
US 2021/0087983 A1 Mar. 25, 2021

(30) Foreign Application Priority Data
May 2, 2018 (AU) .............................. 2018901471

(51) Int. Cl.
*F02D 19/08* (2006.01)
*F02B 47/02* (2006.01)
(Continued)

(52) U.S. Cl.
CPC ............ *F02D 19/081* (2013.01); *F02B 47/02* (2013.01); *F02D 19/0689* (2013.01);
(Continued)

(58) Field of Classification Search
CPC .. F02D 19/081; F02D 19/0689; F02D 19/091; F02D 19/0671; F02B 2275/14;
(Continued)

(56) References Cited

U.S. PATENT DOCUMENTS 6,170,441 B1 * 1/2001 Haldeman .......... F02M 25/0228
123/25 D
7,931,711 B2 4/2011 Wootton et al.
(Continued)

FOREIGN PATENT DOCUMENTS

CN 1229878 9/1999
JP 2018-35682 3/2018

OTHER PUBLICATIONS

The International Search Report (ISR) with Written Opinion for PCT/AU2019/050405 dated Jul. 17, 2019, pp. 1-17.
(Continued)

*Primary Examiner* — George C Jin
(74) *Attorney, Agent, or Firm* — McDonnell Boehnen Hulbert & Berghoff LLP

(57) ABSTRACT

A method of operating an internal combustion engine having at least one combustion chamber and an actuator disposed therein being arranged to drive an output shaft of the engine, the method comprising: 5 (i) injecting a water containing fuel into the combustion chamber; (ii) flash boiling the water-containing fuel to form water vapour within the combustion chamber; (iii) thermolyzing the water vapour to form hydrogen gas and oxygen gas; and (iv) combusting the hydrogen gas to drive the actuator within the combustion chamber to 10 thereby drive the connected output shaft of the combustion engine.

19 Claims, 1 Drawing Sheet

(51) Int. Cl.
  *F02D 19/06*   (2006.01)
  *F02M 43/04*   (2006.01)
(52) U.S. Cl.
  CPC ... *F02B 2201/0622* (2013.01); *F02B 2275/14* (2013.01); *F02D 19/061* (2013.01); *F02M 43/04* (2013.01)
(58) Field of Classification Search
  CPC .. F02B 2201/0622; F02B 47/02; F02M 43/04
  See application file for complete search history.

(56)        References Cited

U.S. PATENT DOCUMENTS

2002/0100836 A1* 8/2002 Hunt ............... F02M 21/023
                                                   244/50
2010/0314878 A1* 12/2010 Dewitt ............. F01K 25/005
                                                   290/52
2011/0061622 A1* 3/2011 Lund ............... F02B 13/00
                                                  123/1 A

OTHER PUBLICATIONS

The International Preliminary Report on Patentability with amended sheets for or PCT/AU2019/050405 dated Aug. 18, 2020, pp. 1-127.

* cited by examiner

INTERNAL COMBUSTION ENGINE AND METHOD OF OPERATING AN INTERNAL COMBUSTION ENGINE

CROSS REFERENCE TO RELATED APPLICATION

This application is a U.S. national phase of International Application No. PCT/AU2019/050405, filed May 2, 2019, which claims priority to Australian Patent Application No. 2018901471, filed May 2, 2018, both of which are incorporated by reference herein in their entirety.

FIELD OF INVENTION

The present invention relates to an internal combustion engine. The internal combustion engine is adapted to generate energy from a fuel containing water.

BACKGROUND

Industries are heavily reliant on fossil fuel particularly for transport. As such, the cost and availability of organic fuels, such as bio and fossil fuels, can be critical to their success. Increasing fuel costs due to depleting fossil fuel reserves may adversely impact many industries and can also have a significant effect on domestic and international transport costs.

To reduce costs and make fuels more effective, additives are often used. However, there are environmental issues associated with using additives, such as ignition enhancers, which can produce pollutants upon combustion.

It is desirable that there be provided an internal combustion engine that reduces organic fuel usage and reduces output of harmful emissions and pollutants. The present invention was derived with these aspects in mind.

SUMMARY OF INVENTION

In this specification, the expression "transition" is understood to refer to a change in the state of an organic fuel or water components of a homogenised fuel, from a liquid to a vapour phase.

In this specification, the expression "organic fuel" is understood to include fossil fuels, bio-fuels, and light oils, such as diesel and gasoline.

In this specification, the expression "conventional engine fuel" is understood to refer to fuel consisting of organic fuel without any aqueous component. However, the term "conventional engine fuel" is understood to define an engine fuel that may contain additives.

In this specification, any processes that is described in relation to a combustion chamber is equally applicable to an engine cylinder, and vice versa.

In this specification, the expression "internal combustion engine" is understood to include gas-turbine engines and cyclic engines.

In this specification, the expression "supercritical water" is understood to be water above its critical point where distinct liquid and gas phases do not exist.

In this specification, a water-containing fuel is understood to comprise an organic fuel and water, in which the amount of water ranges from 1-100 wt % water.

In this specification, a homogenised fuel is understood to comprise an organic fuel and water, which does not phase separate upon standing.

In this specification, pressure units of pressure per square inch (psi) is convertible to Pascals (Pa) by multiplying the psi value by $1.45 \times 10^{-4}$.

In this specification, the expression "actuator" is understood to include a piston or a turbine blade that drives an output shaft of an internal combustion engine.

The present invention provides a method of forming a homogenised fuel, comprising organic fuel and water, the method comprising mixing an organic fuel with supercritical water to form the homogenised fuel.

The present invention also provides an internal combustion engine that generates energy from water, comprising:
  an actuator disposed within a combustion chamber, and connected to an output shaft;
  a fuel tank to contain water;
  a pump and a heat exchanger to generate supercritical water from the water;
  a combustion chamber;
  at least one fuel injector adapted to separately inject the supercritical water and an organic fuel into the combustion chamber, wherein flash boiling the supercritical water forms water vapour and the ignition of organic fuel generates a flame front of at least 1,800° C. to initiate thermolysis of the water vapour into hydrogen gas and oxygen gas in the combustion chamber, and wherein the hydrogen gas autoignites in the combustion chamber to drive the actuator which drives the output shaft.

The present invention also provides an internal combustion engine that generates energy from a water-containing fuel, comprising:
  an actuator disposed within a combustion chamber, and connected to an output shaft;
  a fuel injector adapted to inject a water-containing fuel into the combustion chamber to form water vapour; and
  an electrical discharging device that generates an electrical discharge to thermolyze the water vapour into hydrogen gas and oxygen gas in the combustion chamber, wherein the hydrogen gas is ignited in the combustion chamber to drive the actuator within the combustion chamber to thereby drive the connected output shaft of the internal combustion engine.

The present invention also provides an internal combustion engine that generates energy from a water-containing homogenised fuel, comprising:
  an actuator disposed within a combustion chamber, and connected to an output shaft;
  a fuel injector adapted to inject a homogenised water-containing fuel into the combustion chamber to flash boil the homogenised fuel into organic fuel vapour and water vapour; and
  an electrical discharging device that generates an electrical discharge to thermolyze the water vapour into hydrogen gas and oxygen gas in the combustion chamber, wherein the combustion chamber is adapted to combust the hydrogen gas to generate energy to drive the actuator.

The present invention also provides a method of operating an internal combustion engine having at least one combustion chamber and an actuator disposed therein being arranged to drive an output shaft of the engine, the method comprising:
  (i) generating supercritical water from a water feed stream;
  (ii) injecting the supercritical water into a combustion chamber;

(iii) flash boiling the supercritical water to form water vapour within the combustion chamber;
(iv) injecting and igniting an organic fuel into the combustion chamber to generate a flame front of at least 1,800° C. to initiate thermolysis of the water vapour to form hydrogen gas and oxygen gas in the combustion chamber; and
(v) autoigniting the hydrogen gas within the combustion chamber to drive the actuator which drives the output shaft of the combustion engine.

The present invention also provides a method of operating an internal combustion engine having at least one combustion chamber and an actuator disposed therein the actuator being arranged to drive an output shaft of the engine, the method comprising:
(i) injecting a water containing fuel into the combustion chamber;
(ii) flash boiling the water-containing fuel to form water vapour within the combustion chamber;
(iii) thermolyzing the water vapour to form hydrogen gas and oxygen gas; and
(iv) combusting the hydrogen gas to drive the actuator within the combustion chamber to thereby drive the connected output shaft of the internal combustion engine.

The present invention also provides a method for operating an internal combustion engine having at least one combustion chamber and an actuator disposed therein the actuator being arranged to drive an output shaft of the engine, the method comprising:
(i) injecting the water-containing homogenised fuel into a combustion chamber;
(ii) flash boiling the water-containing homogenised fuel to form water vapour and organic fuel vapour;
(iii) thermolyzing the water vapour to form hydrogen gas and oxygen gas; and
(iv) combusting the hydrogen gas and organic fuel vapour to drive the actuator within the combustion chamber to thereby drive the connected output shaft of the internal combustion engine.

Principle

The principle behind the present invention is the generation of energy from the water, and optionally the organic fuel component of the water-containing fuel to operate an internal combustion engine.

The primary source of energy is derived from the combustion of hydrogen and/or oxygen obtained via the thermolysis of water.

A first embodiment of the invention provides an internal combustion engine that generates energy from a water-containing fuel comprising predominantly water.

The energy generated to operate the internal combustion engine is derived from the thermolysis of water into oxygen and hydrogen, and the subsequent combustion of these gases.

A second embodiment of the invention provides an internal combustion engine that generates energy from a water-containing fuel, comprising a homogenised mixture of water and an organic fuel.

The homogenised water-containing homogenised fuel possesses two temperatures at which the fuel transitions into a combustible form. The first temperature is the vaporisation temperature of the organic fuel and the second temperature is the thermolysis temperature of water. In contrast, conventional engine fuel only has one transition temperature (i.e. the vaporisation temperature of the organic fuel).

Without being bound by theory, it is believed that the first source of energy is released when the organic fuel component of the homogenised water-containing fuel ignites, and the second source of energy is released when the hydrogen and the oxygen ignite.

It is believed that the energy generated from the combustion of hydrogen and/or oxygen is equivalent or greater than the energy generated by the combustion of a conventional engine fuel.

The water of the water-containing fuel provides a non-polluting energy release.

In the water-containing homogenised fuel, multiple energy releases are possible. The first energy release occurs during vaporisation of water from a non-combustible liquid into a non-combustible water vapor. The second energy release occurs during thermolysis of the non-combustible water vapor into its elemental gases oxygen and hydrogen. And a third energy release occurs during combustion of the combustible oxygen, hydrogen and/or organic fuel vapour.

Advantages of the present invention may include any one or more of:
lowering fuel cost by reducing consumption of organic fuels which are more expensive than water;
reducing pollutants by providing a fuel that generates water and oxygen as the main combustion by-products;
reducing fuel usage by substituting at least part of the organic fuel with water;
increasing safety by providing a fuel in which the fuel vapor (i.e. water vapour) will not ignite and or combust;
improving engine efficiency because there is no risk of the combustion chamber flame being extinguished by water, Water-Containing Fuel Water is considered an impurity in a conventional engine fuel which adversely affects the performance of the engine. In certain instances, the presence of water can cause damage to the engine.

The present invention has the ability to generate energy from water to operate an internal combustion engine.

The water-containing fuel may contain 1-100% water. The water-containing fuel may contain 20-100% water. The water-containing fuel may contain 40-100% water. The water-containing fuel may contain 60-100% water. The water-containing fuel may contain 80-100% water.

The water may be in a number of different forms including fresh, salt, distilled, sewage, or rain water. Preferably, the water-containing fuel is absent of organic fuel.

It is known that water and organic fuels are immiscible. However, it was discovered that the properties of supercritical water including increased compressibility, reduced dielectric properties and reduced solubility for electrolytes enable the supercritical water to mix with non-polar liquids, such as organic fuel (including diesel and gasoline) to form a homogenised mixture.

In this specification, the homogenised fuel is distinct from an emulsion because the homogenised fuel does not include an additive such as: a surfactant; soluble oil; hydrogen peroxide; or ammonia, to prevent the homogenised fuel from separating into its individual components.

The water-containing homogenised fuel has a number of advantages over an emulsified fuel including having the ability to:
(i) keep water non-combustible in the vapour phase;
(ii) be exposed to elevated temperatures without causing pre-ignition or separation of the emulsified fuel;

(iii) reach the organic fuel ignition temperature without cooling or diluting the organic fuel charge; and (iv) transition into a combustible fuel in less time compared to conventional engine fuel.

The step of forming the homogenised fuel may include heating the water component of the homogenised fuel to form supercritical water. The water may be heated to a temperature of at least 200° C. Suitably, the water is heated to a temperature ranging from 200° C.-3,300° C. More suitably, the water is heated to a temperature ranging from 374° C.-3,300° C.

The source of heat may be residual heat from a previous ignition/combustion process or a flame front from a previous combustion process.

The step of forming the homogenised fuel may include pressurising the water to a pressure of at least 150 psi. Suitably, the water is subjected to a pressure of at least 3,200 psi.

The step of forming the homogenised fuel method may include subjecting a water and organic fuel mixture to a pressure ranging from 150 psi to 1,500 psi and a temperature ranging from 200° C. to 3,300° C.

The individual components of the homogenised fuel may be pre-mixed in the storage tank prior to forming the homogenised fuel.

The homogenised fuel may be formed in the fuel delivery system between the storage tank and the fuel injector.

Transition of Water from (i) Liquid into Water Vapour and (ii) into Hydrogen and Oxygen The water in the water-containing fuel transitions into the vapour phase, and subsequently into its elemental gases (i.e. hydrogen and oxygen). Energy is produced during each transition which may be used to operate the internal combustion engine.

When a homogenised water-containing fuel is used, expansion energy is produced by transitioning the organic fuel and water components into their respective vapour phases and thermolyzing the water vapour into its elemental gases.

The generation of energy by the homogenised water-containing fuel is achievable because of a staged process of (1) transitioning the homogenised fuel into organic fuel and water vapours and (2) thermolyzing the water vapour into its elemental gases.

The staged process may occur within the combustion chamber, prior to ignition or combustion.

The staged process may generate over 1.27 times more pressure/energy than conventional engine fuel combustion at similar liquid volumes.

Stage (1) may involve flash boiling of the water-containing fuel. This involves the thermal expansion/transition of the liquid homogenised fuel into vapor phase.

Stage (2) may involve thermolysis of water vapour into hydrogen and oxygen.

Fuel Injection

The water-containing fuel may be heated pre-injection to facilitate flash boiling of the water-containing fuel. Heating of the water-containing fuel may occur in a fuel storage tank.

The heat may be supplied by recirculated fluid, and mechanical, electrical and/or exhaust gas heating. Suitably, the heat is supplied by an injection cycle occurring in an exhausting event/stroke containing heated gases from a previous combustion event in a combustion chamber.

Recirculation of a conventional fuel from the engine and/or fuel system is commonly understood as a bleed-off procedure from the injection system. However, in the present invention, the recirculation system/procedure forms a primary heating protocol. This is because the temperature of the recirculated water-containing fuel may be up to 450° C., thus when mixed with the water-containing fuel being supplied to a fuel injector, heats the water-containing fuel being supplied to a fuel injector.

An intake fuel charge may be heated to increase the temperature on the compression stroke during which the water-containing fuel is injected into the combustion chamber.

The increased temperature of the intake fuel charge at the reduced compression stroke, whether through a lower compression engine type or ejection of the water-containing fuel earlier timed in the compression stroke and/or ejection of the water-containing fuel in an exhaust event/stroke, may generate a greater pressure differential (pressure drop) between the fuel injector and the combustion chamber.

Heating the intake air is opposite to known intake air technology for internal combustion engines, which attempts to reduce the temperature of the intake air/gas charge to maximize volumetric efficiencies to fit intake air into the cylinder on the intake stroke to maximize the static compression ratio.

Ejection of the water-containing fuel may commence earlier than conventional engine fuels in an engine cycle to effect the energy release of the fuel.

Ejection of the water-containing fuel can be initiated and/or completed at any point of an engine cycle. This may allow flash boiling and/or thermolysis to occur at peak compression.

The water-containing fuel may be ejected/injected at the greatest pressure differential between the fuel injector and the combustion chamber. For example, the fuel may be ejected/injected earlier in the engine cycle to either exhaust and/or compress at different cycles or actuator positions.

The water-containing fuel may be heated to a pre-ejection temperature greater than 150° C. Suitably, the pre-ejection temperature ranges from 150° C. to 450° C. More suitably, the pre-ejection temperature ranges from 200° C.-400° C. Even more suitably, the pre-ejection temperature is about 374° C.

The water-containing fuel may be pressurised to a pre-ejection pressure greater than 3,000 psi. Suitably, the pre-ejection pressure ranges from 3,200 psi to 36,000 psi.

An advantage of operating the fuel injector at the aforementioned high operating pressures is that it increases turbulence of the injected water-containing fuel and provides an even distribution throughout the chamber. The even distribution of the fuel in the chamber may be evidenced by a smoother engine performance with reduced engine knock (rattle). Such results are not achievable using conventional engine fuels or emulsified fuel blends.

Early and/or multiple points/timing of ejection of the fuel as the actuator (e.g. piston) ascends in a chamber allows for multiple ejections into the combustion chamber. This may cause multiple transitions and ignitions in one or more engine cycles. Thus, an initial ejection can occur at any actuator position such that a subsequent ejection can occur after the initial ejection with the actuator at a different position within the combustion chamber. This in turn produces multiple flame fronts which can facilitate flash boiling and/or thermolysis.

The fuel discharges may create large volumes of heat in the chamber by increasing the size and the intensity of an ignited flame front at any actuator position of the engine's crank rotational cycle.

The fuel discharges may increase flame front size and heat. This is achieved by increasing the amount of ejected fuel into the chamber flame front, which may allow larger volumes of water-containing fuel to transition without extinguishing the initial flame front.

Flash Boiling

Flash boiling is the thermal expansion of non-combustible liquid water-containing fuel into non-combustible vapor.

Flash boiling of the water-containing fuel may occur by injecting the water-containing fuel into the combustion chamber across a pressure drop which reduces the vaporisation temperature of the water and/or the fuel. Suitably, the pressure drop reduces the vaporization temperature of the water-containing fuel, suitably to 0° C.

Expansion energy may be generated when the water-containing fuel expands from a liquid to a vapour phase.

In embodiments of the invention that utilise a homogenised water-containing fuel, expansion energy may be generated when the homogenised fuel expands from a non-combustible liquid to non-combustible organic fuel and water vapours.

Suitably, up to 100% of the water-containing fuel is vaporised upon ejection into the combustion chamber.

The water-containing fuel may expand by at least 1,600 times its original volume after flash boiling.

When expansion of the water-containing fuel occurs in the combustion chamber, energy in the form of increased pressure within the combustion chamber is generated. This increased pressure is greater than that derived from an equivalent volume of conventional engine fuel being ignited and combusted and reduces or eliminates the amount of organic fuel required to operate the internal combustion engine.

The combustion chamber pressure may increase when the fuel physically expands when transitioning from liquid to vapour phase through flash boiling.

The water-containing fuel may expand by at least 1,600 times its volume when transitioning into the vapour phase.

At least 1.27 times more pressure/energy may be generated by the transition of the water-containing fuel from its liquid phase to its vapour phase when compared to conventional engine fuel combustion alone.

The elevated temperature and/or pressure maintains the water-containing fuel in a liquid state prior to flash boiling.

The water in the fuel may transition and physically expand in about 1 to 2 micro-seconds to form water vapour.

Thermolysis

The water vapour generated from flash boiling the water-containing fuel is subjected to conditions that thermolyze the water vapour into its elemental gases hydrogen and oxygen.

The generation of oxygen and hydrogen from thermolysis of the water-containing fuel increases the air density ratio and pressure in the combustion chamber over and above the standard known pressure in the combustion chamber from a normal intake charge.

In this invention, thermolysis generates combustible gas and contributes to the total expansion pressure in the combustion chamber.

Water and organic fuel have different specific densities (0.7 for organic fuel and 1.0 for water) which imparts different vapor temperatures to each fuel component. Thus, when a homogenised water-containing fuel is utilised, organic fuel will vaporize and combust at a lower temperature. This allows the formation of an initial organic fuel flame front having a temperature that is greater than the thermolysis temperature of water, which facilitates thermolysis of the water.

Thermolysis of water into its elemental gases may take approximately one tenth of the time taken to vaporise organic fuel.

Thermolysis may occur at a temperature greater than the auto-ignition temperature of hydrogen.

The thermolysis temperature for water may be reduced by subjecting the water-containing fuel to supercritical conditions of water.

Thermolysis may occur at the auto-ignition temperature of hydrogen.

The water vapour may be subjected to a temperature ranging from 1,400-2,000° C. during thermolysis. More suitably, the water vapour may be subjected to a temperature of about 1,800° C. during thermolysis.

Thermolysis occurs at a temperature higher than the auto-ignition temperatures of 1,000° C. of hydrogen. This causes instant ignition/combustion upon completion of the thermolysis process.

Thermolysis of water vapour into hydrogen and oxygen may be completed in 1 to 2 micro-seconds, which is within the operational time frames of normal combustion.

The water-containing fuel may expand 200 times its volume when the water vapor thermolyzes to hydrogen and oxygen. Thermolysis may be initiated using electrical discharging and/or flame front heating.

Thermolysis may occur by injecting the water-containing fuel into one or more electrical discharges. Suitably, thermolysis occurs by subjecting the water vapor to one or more electrical discharges.

Thermolysis may occur by injecting the water-containing fuel into a flame front of an igniting organic fuel. Suitably, thermolysis occurs by subjecting the water vapour to a flame front generated by an organic component of the water-containing fuel or a flame front from a preceding water ejection.

The ignition source may be an electrical discharging device that generates electrical discharges to facilitate thermolysis of water into oxygen and hydrogen.

Electrical discharging of this invention can be achieved because the water-containing fuel absorbs a greater amount of heat compared to organic or emulsified fuels. This may provide lower vaporization, flash boiling, thermolysis, and auto-ignition temperatures. Pre-ignition or uncontrolled ignition combustion is prevented because water is non-combustible before it is thermolyzed into its elemental gases.

Heating the water-containing fuel results in the water component transitioning into water vapour and ultimately into its elemental gases. The use of electrical discharging in the combustion chamber heats and does not electrically ignite or dissociate the water-containing fuel compared to conventional engine fuels.

In contrast, known engine sparking processes use a low voltage, low temperature spark to electrically ignite and combust the conventional engine fuel in the combustion chamber.

The electrical discharging device may generate multiple electrical discharges during a fuel injection cycle to raise the temperature of the vaporised water-containing fuel to ignite and/or combust the fuel. In this embodiment, ignition/combustion of the vaporised fuel occurs by heat ignition and not electrical ignition. This is because the elevated ignition temperature of the organic fuel component is reached first to ignite the fuel.

In contrast, conventional electrical sparking systems utilise multiple spark discharges to ignite any remaining hydrocarbons from a previous ignition/combustion event to reduce emissions. This process is called a "dead spark" system as it does not contribute any energy to combust the organic fuel component nor provide heat to the combustion chamber at any point from its electrical discharge.

The electrical discharging device may generate a first electrical discharge prior to the ejection of the water-containing fuel into the combustion chamber. This allows the fuel to be ejected into the electrical discharge to elevate the temperature of the fuel.

This is in contrast to a conventional engine sparking system wherein a spark is delivered to the organic fuel present in the combustion chamber.

The ejection timing and multiplicity of the discharging quantities of the electrical discharging device may be controlled to extend the transitioning time reflected in the output shaft, suitably crank shaft, rotational timing, while heating occurs in the combustion chamber.

Where more than one discharge occurs, gas formed from the discharge auto-ignites the water-containing fuel vapour such that subsequent fuel discharges can use either or both the electrical discharge and/or the combustion and flame front of the previous fuel discharge to elevate the temperature of the subsequent discharge. This generates the heat required for transitioning and auto-igniting of any one discharges of the water-containing fuel.

The electrical discharging device may generate multiple discharges repeated at micro-second intervals to form a blanket effect.

The electrical discharging device may generate a temperature greater than 900° C. Suitably, the electrical discharging device may generate a temperature ranging from 1,000° C. to 3,000° C. More suitably, the electrical discharging device may generate a temperature of about 2,500° C. Exposing a conventional spark plug to such temperatures is likely to melt the spark plug.

The electrical discharging device may generate a voltage of at least 150,000V. Suitably, the combustion chamber electrical discharging device generates a voltage of at least 250,000V.

It was discovered that electrical discharging temperature elevates proportionately with voltage. It was also discovered that the combustion chamber electrical discharging device requires a minimum of 150,000 Volts per discharge to travel from the output electrode to the receiving electrode of the combustion chamber electrical discharging device. Applying such a voltage to a conventional spark plug would damage the plug.

The total heat derived from the electrical discharge may be controlled by the voltage and/or frequency/multiplicity of the discharges for any single fuel ejection cycle. This provides sufficient heat to elevate the temperature of the ejected fuel.

The frequency/multiplicity of the electrical discharges may be used to control the temperature in the combustion chamber.

The electrical system comprising the combustion chamber electrical discharging device may be independent of the engine or vehicle electrical system or circuitry.

Auto-Ignition/Combustion

The thermolyzed water-containing fuel vapours may be subjected to a temperature above the auto-ignition temperature of hydrogen. Suitably, the water-containing fuel vapours are subjected to a temperature at least 1,400° C. to auto-ignite hydrogen (in the presence of oxygen). More suitably, the water vapour is subjected to temperature ranging from 1,400° C.-1.800° C.

It is believed that oxygen raises the flame front temperatures during the combustion of hydrogen.

The temperatures of the gases contained in the combustion chamber may be above the supercritical and auto-ignition temperatures of hydrogen.

Combustion of hydrogen and oxygen may provide at least two times the energy of conventional engine fuel. Suitably, the energy provided by the combustion of hydrogen and oxygen is about 2.4 times the octane/energy rating of conventional engine fuel.

Heat generated by auto-ignition of the organic component of the water-containing fuel or the hydrogen and oxygen vapour mixture may be used to facilitate thermolysis of a subsequent charge of water-containing fuel.

Multiple electrical discharges may be applied to the water-containing fuel vapour to increase the flame front temperatures. The increased flame front temperatures allow greater overall volumes of discharging water-containing fuel to transition and ignite.

An igniting flame front may provide a catalyst (heat) for subsequent discharges of water-containing fuel ejected into the flame front upon ignition. This replicates the same transitioning/ignition function in that flame front for different volumes of fuel at each subsequent discharge/ejection. A final ignition of the last volume of water-containing fuel may combine with any and/or all previous ejected volumes of fuel to provide sufficient energy to move a piston or turbine blade.

Combustion of the initial discharge of fuel may increase the available heat for subsequent discharges of fuel. This creates multiple flame fronts of hydrogen which are able to ignite subsequent discharges of water-containing fuel to increase overall power/energy that is achievable in a combustion chamber.

This strategy allows the ejecting water-containing fuel to produce more energy in the combustion chamber and engine power output.

Ignition of hydrogen may produce flame fronts having temperatures ranging from 1,800° C. to 3,500° C.

Transitioning of the water to hydrogen and oxygen may provide a 1,800 times volume expansion. In contrast, combustion of conventional engine fuel may provide a 1,400 to 1,600 times volume expansion.

Combustion of hydrogen and oxygen may provide 2.4 times more energy than combustion of conventional engine fuel at comparative liquid volumes. Thus, the water-containing fuel may have an expansion ratio of approximately 3,000 times by volume. Suitably, the expansion ratio is 2,920 times by volume.

The expansion energy generated from flash boiling and/or thermolysis combined with the energy generated from the combusting gases is sufficient to drive the actuator at the same or greater rate as conventional engine fuels.

In contrast, conventional engine fuel only provides a 9 times expansion of volume when transitioning from liquid to vapor phase. This is insufficient to move the piston or rotor. Sufficient energy to move the actuator of the combustion engine is only generated when the organic fuel is combusted.

Net pressure/energy generated from the water-containing fuel may be greater than 2 times of that generated by conventional engine fuel. Suitably, the net pressure/energy generated from the water-containing fuel is 2.08 times greater than that generated by conventional engine fuel. This reduces conventional engine fuel consumption by over of 60% whilst providing the same amount of energy to the engine.

When a homogenised water-containing fuel is used, combustion occurs in two stages.

In the first stage, the organic fuel component of the homogenised fuel vapour ignites (as it has lower gas formation and auto-ignition temperatures ranging from 500° C. to 700° C.). In the second stage, water is thermolyzed (at a temperature of at least 1,400° C.) to form an oxygen and hydrogen vapour mixture which auto-ignites.

The organic fuel component may have an auto-ignition point ranging between 600° C. to 700° C. compared to the auto-ignition point of hydrogen at about 1,000° C. As such, hydrogen will combust later than the organic fuel component. The ignited hydrogen may produce a flame front at a temperature of at least 1,800° C.

Conventional engine fuel which is combustible cannot operate at the operating temperatures of the present invention. This is because if elevated to the present operating temperatures, the conventional engine fuel will auto-ignite earlier in the engine cycle (i.e. pre-ignition) and experience severe reduction in its fuel density/ratio. This would cause a number of problems such as lean burn combustion, an increase in emissions, loss of power from the resulting engine miss fire, and pinging or engine knock pre-ignition, which may ultimately cause engine failure.

The operating temperature may allow a range of injection timings not useable on conventional engine fuels.

Compression Ratio

The compression ratio is the difference between the total volume of the engine cylinder that houses the engine actuator, which in this example is a piston, between the top of the engine block (top dead centre) and when the piston is at the bottom of the engine block (bottom dead centre) within the cylinder, as compared to the total volume of the combustion chamber area alone. The latter can be a chamber formed in the engine head itself or an area between the top dead centre position of the piston and the top of the engine block where the head meets the block and where a non-chambered head is used to give the total actual volume for a combustion chamber. This means the rising piston in a cylinder will compress the full volume of what has been introduced to the cylinder into the smaller combustion chamber. This causes pressure heating of the gases from the cylinder.

The temperature in the combustion chamber may be elevated to the desired operating temperature by increasing the compression ratio and/or elevating the temperature of the intake gas charge for compression.

The compression ratio may be increased by increasing the cylinder volume to provide a greater volume of intake gases to be compressed into the combustion chamber or reducing the combustion chamber capacity. This increases the difference between the cylinder and the combustion chamber volumes. The increase in compression pressure and resulting elevated temperatures generated in the intake (compression) gases may generate the required operating temperatures for the present invention.

The compression ratio may be at east 20 to 1. Suitably, the compression ratio is 27 to 1.

In contrast, standard and gasoline engines have known ratios ranging from 8 to 1 and 9 to 1, respectively, due to the use of conventional engine fuels and their octane ratings. High octane conventional engine fuels have compression ratios ranging from 13 to 1 up to 16 to 1.

Compression ratios of at least 20 to 1 are not suitable to be applied to conventional engine fuels due to the low temperature combustibility of conventional engine fuel in liquid and vapour form. If compression ratios of at least 20 to 1 are applied to conventional organic fuels, it will cause the fuel to pre-ignite and combust prior to and with the piston lower in the cylinder whilst ascending the cylinder to its normal optimum ignition position. This may cause engine knock and piston/engine failure.

Exhaust Gas Recirculation

The combustion chamber may include an exhaust gas recirculation system (EGR) to feed exhaust substances from the combustion of hydrogen back to the combustion chamber. Suitably, the exhaust substances are generated from the auto-ignition of hydrogen in the presence of oxygen.

The exhaust substances may be liquid, gas and/or supercritical water.

The substances may include re-constituted/reformed/retained fuel from a previous combustion event or from ejection of the fuel into the exhaust gases at any point in the engine cycle.

EGR is used to reduce nitrous oxides (NOX) by diluting the intake charge with an inert gas. This forms a rich Air Fuel Ratio (AFR) which is the compared fuel quantity to combustible air quantity. The standard is about 15 parts of air (average) to 1 part fuel, suitably, 14.7 parts of air (average) to 1 part fuel.

Conventionally, EGR is achieved by supplying non-combustible exhaust gas from conventional engine fuel as a percentage of the total volume of intake gas from the organic fuel combustion to dilute the air intake. However, one drawback of this method is that there is a reduction in oxygen for oxidation.

In contrast, the improved EGR provided by the present invention enhances the combustion process due to the increased starting temperatures of an intake charge for the fuel. This facilitates the transitioning/ignition/combustion processes because exhaust gas from combustion of the water-containing fuel includes uncombusted and/or reconstituted fuel which can be used as a further source of energy.

The retained and/or reconstituted water-containing fuel in either or both its liquid and vapor form is non-combustible. This allows the water-containing fuel to be supplied into the hot exhaust gases without risk of pre-ignition.

The amount of water-containing fuel and non-combustible gases such as exhaust gas relative to intake air may be adjusted to control the AFR without increasing NOX or other emissions.

The engine may continuously recycle exhaust gas as a source of energy. Additional water-containing fuel may be injected to offset or increase combustion energy in the combustion chamber.

This allows a volume of injected water-containing fuel to be supplied to the combustion process to replace fuel consumed by the previous combustion. This maintains the required amount of fuel to meet the engine speed and load demands.

The extra water-containing fuel may be injected as an additive prior to the engine reaching a minimum operational temperature such that upon elevating the temperatures, the injected water-containing fuel becomes a secondary source of fuel.

Exhaust gases may be used as a fuel source for the combustion process by closing all inlet and exhausting valves to seal the combustion chamber. This causes the actuator in the form of a piston to compress the exhaust gases to elevate the temperature of the gases to heat the fuel for flash boiling, thermolysis, and/or auto-ignition.

Thus, the whole process may function as a single piston cycle of compression, transition, ignition/combustion, power/energy, production and retention of the heated exhaust gases containing fuel without introducing more intake gases/charges to meet the demands that result from normal engine heat losses.

This can convert a stroke or stroke engine into a single cycle/stroke engine, such that a combustion event occurs every time the piston rises to top dead centre. This is achievable as the valves are maintained closed after the engine warms up to the required temperature such that compression occurs on each stroke like a 2-stroke engine with no exhaust and/or external intake process.

Internal Combustion Engine Components

Storage Tank

A storage tank for receiving the water-containing fuel may be provided. The engine may contain more than one storage tank for storing individual components of the fuel.

The tank may include a first inlet point for receiving fuel and a first outlet which acts as a vent. The tank may include a second inlet point for returning fuel from the fuel delivery system and a second outlet for allowing the fuel to travel to the combustion chamber via the various pumps.

Low Pressure Pump

The engine may include a primary low-pressure pump to supply the water-containing fuel to other components of the engine. The primary low-pressure pump may be in fluid communication with the storage tank.

The engine may include a second low-pressure pump. The second low-pressure pump may be in fluid communication with the primary low-pressure pump.

Water and/or organic fuel may be supplied through a filter to a primary low-pressure supply pump.

The pump may be external or internal to the storage tank.

The low-pressure pump may supply the water-containing fuel to a secondary high-pressure pump via a first heat exchanger.

Heat Exchanging/Mixing Device

The engine may include a heat exchanging/mixing device.

The heat exchanging/mixing device may be used to combine organic fuel and water to form the homogenised fuel. Suitably, the heat exchanging/mixing device heats and combines the organic fuel and water components of the fuel to form the homogenised fuel.

The heat exchanging/mixing device may be in fluid communication with a low-pressure pump. Suitably, the heat exchanging/mixing device is positioned before the high-pressure pump such that the water-containing fuel is fed into the high-pressure pump.

The heat exchanging/mixing device may heat the water-containing fuel from 100-300° C., preferably 200° C.

The heat exchanging/mixing device may include tube housing having undulating/corrugated and or riffling on the inner walls. This facilitates mixing of the water-containing fuel components by causing swirling or turbulent/agitating effect on the fuel components during mixing. This may also improve heat exchange by increasing contact of the water-containing fuel with the inner wall surfaces of the heat exchanging/mixing device.

The heat exchanging/mixing device may operate at a pressure up to 200 psi.

The heat exchanging/mixing device may use exhaust gas or compression gas as the hot stream.

High Pressure Pump

A high-pressure pump may be used to pressurise the water-containing fuel prior to the fuel ejection into a combustion chamber to maintain the water-containing fuel as a liquid.

The high-pressure pump may pressurise the water-containing fuel to at least 3,000 psi. Suitably, the water-containing fuel is pressurised to about 3,200 psi.

The water-containing fuel in a heat exchanging/mixing device may be supplied at an elevated pressure ranging between 1 to 200 psi to prevent boiling of the water-containing fuel prior to being received by the high-pressure pump. An elevated pressure on the fuel maintains the fuel in liquid state prior to a second high-pressure pump where further heat may be applied.

The high-pressure pump may induce flow of the water-containing fuel from the storage tank(s) and flow of the re-circulated fuel by generating a suction force.

Mixing Fuel Rail

A mixing fuel rail may be positioned between the high-pressure pump and the fuel injector.

The fuel rail is a multi-functional component that distributes fuel to individual injectors or cylinders of the combustion engine and acts as a heat exchanger to elevate the fuel to supercritical conditions. The fuel rail may also act as a mixer by agitating or swirling the fuel as it travels from the input ports of the fuel rail to the individual outlets and/or distribution points of the fuel rail that supply each individual injector. This provides blending of the two components of the homogenised fuel and may assist in flash boiling of the homogenised fuel.

Exhaust Manifold Heat Exchanger

An exhaust manifold heat exchanger may be used to heat the water-containing fuel using heat generated by the exhaust substances during combustion of hydrogen and/or organic component of the fuel. The exhaust manifold heat exchanger may be adapted to heat the water-containing fuel to a temperature ranging from 150° C. to 450° C.

The exhaust manifold heat exchanger may be positioned before the fuel injector and/or combustion chamber.

Conventional technology does not provide for fuel to be stored in an exhaust manifold for heating to form a combustion chamber combustible liquid. All conventional exhaust manifolds may be used to pre-heat coolant for engine temperature control. Such manifolds are not used for fuel temperature control.

Heating of the water-containing fuel may be provided by wrapping the exhaust manifold and/or exhaust pipe with the pressure fuel lines, suitably high-pressure fuel lines, such that the fuel lines are in close proximity to receive radiated heat. This causes conduction of the heat through the walls of any suitable fuel lines. The fuel lines absorb the heat of an engine's exhaust into the non-combustible fuel contained within the fuel lines.

The fuel lines may be high-pressure metal fuel lines to improve absorption of heat from the exhaust manifold. This may transfer heat more efficiently from the exhaust gases to heat the water-containing fuel contained inside the fuel lines.

Heating of the fuel lines ay occur during distribution to individual fuel injectors.

The engine may include a common-rail fuel distribution component to heat the water-containing fuel. Conventional common-rail fuel distribution components do not heat the fuel but instead cool the fuel to maintain fuel density ratios.

The common-rail fuel distribution component may utilise hot exhaust gases to heat the contained water-containing fuel. Suitably, the fuel is heated from 40° C. and 450° C. and distributed to the individual engine cylinders.

The common-rail fuel distribution component may include undulating inner surfaces and/or rifling on its outer walls of the inner feed tubes to assist the mixing and blending of the fuel.

Fuel Injector

The engine may include a fuel injector for injecting the water-containing fuel into the combustion chamber.

The fuel injector may inject the organic fuel component and water separately into the combustion chamber.

The fuel injector may heat the water-containing fuel contained within the injector to increase the temperature of water to above its supercritical temperature.

The fuel injector may be positioned to allow gases to circulate to the injector up to at least the supercritical temperature of water.

The fuel injector may be in electrical communication with the electrical discharging system.

A combustion chamber end of the fuel injector may be connected to the electrical discharge device. This may allow heat in the combustion chamber to contact the fuel injector. Thus, heat in the combustion chamber may be used to elevate the temperature of the fuel injector up to the temperature of the combustion chamber.

This heating process may function in parallel with the electrical discharge current to heat the fuel injector. When the fuel injector is positioned in conjunction the electrical discharging device, the fuel may be ejected at any angle into the electrical discharge layers/web. Suitably, the fuel is ejected at 90° to the electrical discharge layers/web.

The fuel injector may comprise a body, nozzle, Pintle and ejecting end.

The Pintle may include a Pintle needle valve having an internal shaft having steps in a circular groove. The steps may have a width and depth sufficient to circumvent the needle and or inside outer walls of the fuel injector. This may increase the volume of fuel retained for ejection and the total surface area for contacting the fuel.

The steps may cause the fuel to travel in a circulating motion around the inside of the fuel injector to increase contact with either or both the inside of the outer wall and needle surface area. This increases fuel temperature via conduction and has a compounding effect on both conduction and pressure heating inside the fuel injector.

This may also increase the pressure differential/drop between the fuel injector and the chamber. Therefore, the fuel injector may act as a heat exchanger to facilitate the formation of the homogenized fuel and/or elevate the water fuel to at least its supercritical temperature.

Heat to the body, nozzle, Pintle and or ejecting end of the fuel injector may be provided by the electrical current flowing through the fuel injector and/or the electrodes that surround the fuel injector. The heat can be utilised to heat the stored fuel inside the fuel injector.

The fuel injector may be installed into the rear of the combustion chamber electrical discharging device. This exposes the ejecting nozzle end of the fuel injector to the combustion chamber directly, such that fuel can be ejected into the combustion chamber after electrical discharging is started.

The fuel injector may heat the water-containing fuel via conduction. When electrical discharging occurs prior to the ejection of the fuel, upon ejection, the fuel absorbs the heat from any one or more of the fuel injector, the electrical discharging device and combustion chamber. This causes the transitioning and heat combustion of the fuel.

The fuel injector may be sealed such that the body of the fuel injector becomes exposed to the ambient conditions of the combustion chamber. This may allow the elevated temperature of the body to heat the fuel inside the fuel injector. The heat may cause the fuel to be heated to supercritical conditions and homogenized.

A one-way valve system may be fitted into or upstream of the fuel injector.

In embodiments of the invention in which the water-containing fuel excludes an organic component, each fuel injector may include an electrical supply port connected to a source of electricity. The electrical supply port electrically connects a spark (e.g. plasma spark) tip with the power source to create a spark.

Combustion Chamber

The engine may include a combustion chamber. Suitably, the combustion chamber includes a heat exchanger. The combustion chamber may have a dual purpose/function of: (i) a heat exchanger and (ii) a combustion chamber.

The operating temperature in the combustion chamber may be greater than at least one of the supercritical temperature, auto-ignition temperature, vaporisation temperature of either the organic fuel or water component of the water-containing fuel. Suitably, the operating temperature is greater than at least one of the supercritical temperature, auto-ignition temperature, vaporisation temperature of the water component in the water-containing fuel.

The combustion chamber may be maintained at a temperature of at least 1,400° C. to auto-ignite hydrogen.

Electrical Discharging Device

The ignition source may be an electrical discharging device that generates electrical discharges to facilitate thermolysis of water into oxygen and hydrogen.

The electrical discharging device may comprise at least two electrodes between which an electrical discharge is generated.

The electrical discharging device may include two to four electrodes on the circumference of the rim of the electrical discharging device that are exposed to the combustion chamber.

Each electrode may be a rectangular plate.

The distance between the two electrodes, suitably the anode and the cathode, may range from 2 mm to 25 mm.

In contrast, the electrode gap for a conventional spark plug is at most 1 mm. Thus, a conventional electrical sparking system utilising a conventional spark plug which generates a voltage ranging from 25,000 to 60.000 volts would not be able to discharge its electrical spark across the electrodes of the combustion chamber electrical discharging device.

The electrical discharging device may include two or more electrodes either of the same polarity and/or opposing polarity extending into the combustion chamber.

Engine Sleeve/Multi-Tapered O-Ring Seal

The engine may include a multi-tapered outer flat O-ring seal.

The seal may have top and bottom radii, in which the top radius matches the injector/delivery device nozzle and/or body to seal each surface.

The seal may be constructed of copper to seal the space between the nozzle and the enlarged sleeve inner wall diameter. This may prevent gases escaping to atmosphere and causing a loss of compression/combustion pressure which reduces loss of power.

The seal may have two tapers that fit between the nozzle/body of the fuel injector such that the one taper is in contact with the inner wall of the sleeve and the second taper with the external/outer walls of a nozzle and or body of a fuel injector.

The engine may include an engine sleeve.

The multi-tapered outer flat O-ring seal may seal the fuel injector to the sleeve.

The seal may seal the fuel injector to the combustion chamber, and/or engine head and/or cylinder. This prevents reduction of the combustion pressure from use of the fuel.

The engine may include a holding clamp.

The sleeve may be in communication with a combustion chamber. The chamber may be proximal to the actuator and between the outside of the internal engine head and/or cylinder. This connects the outside of the combustion chamber with an internal combustion chamber and allows access by the fuel injector from the outside of the engine to the inside of the chamber.

The seal may provide a pressure contact on the radii and/or tapered surfaces between the outer walls of the injector nozzle/body and the inner wall of the sleeve.

The temperature of the water-containing fuel in the combustion chamber fuel inject ay be elevated by adjusting the location of the fuel injector in the sleeve.

The sleeve design may allow the elevated temperatures from the combustion chamber gases to surround the nozzle and or body of the fuel injector.

BRIEF DESCRIPTION OF DRAWINGS

A preferred embodiment of the present invention is hereinafter described by way of example only, with reference to the accompanying drawings, wherein.

DETAILED DESCRIPTION

Figure 1:
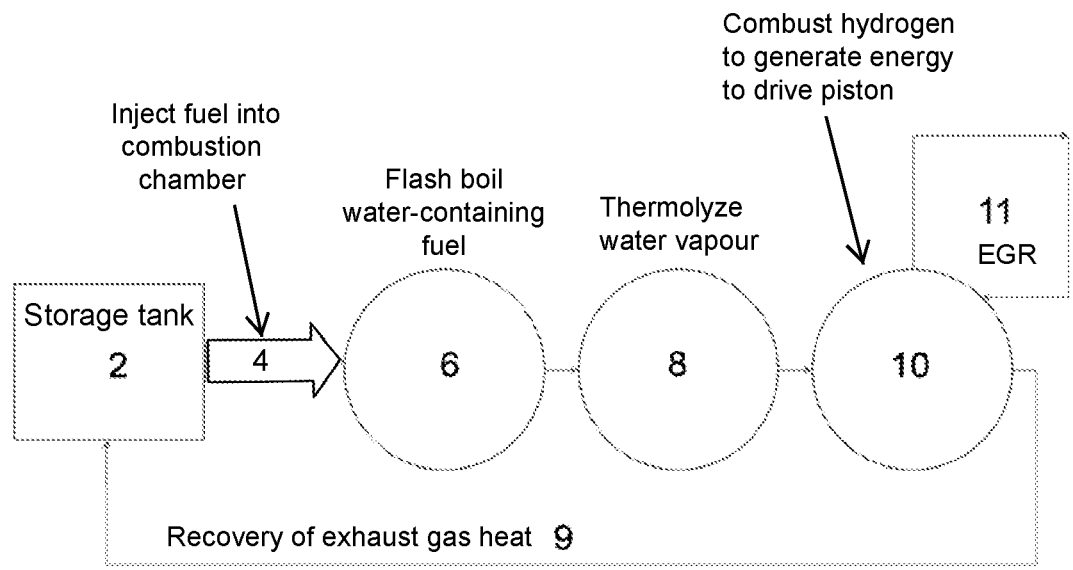
FIG. 1 is a flow diagram of a method of operating an internal combustion engine according to one form of the present invention.

One aspect of the present invention provides a method of operating an internal combustion engine having at least one combustion chamber and an actuator in the form of a piston disposed therein, the piston being arranged to drive an output shaft of the engine as illustrated in FIG. 1.

The method includes:
(i) providing or forming a water-containing fuel in a storage tank (2);
(ii) injecting the water containing fuel into a combustion chamber (4);
(iii) flash boiling the water-containing fuel to form water vapour (6) within the combustion chamber;
(iv) thermolyzing the water vapour to form hydrogen and oxygen (8); and
(v) combusting the hydrogen to generate energy to drive the piston within the combustion chamber to thereby drive the connected output shaft of the internal combustion engine (10).

Figure 2:
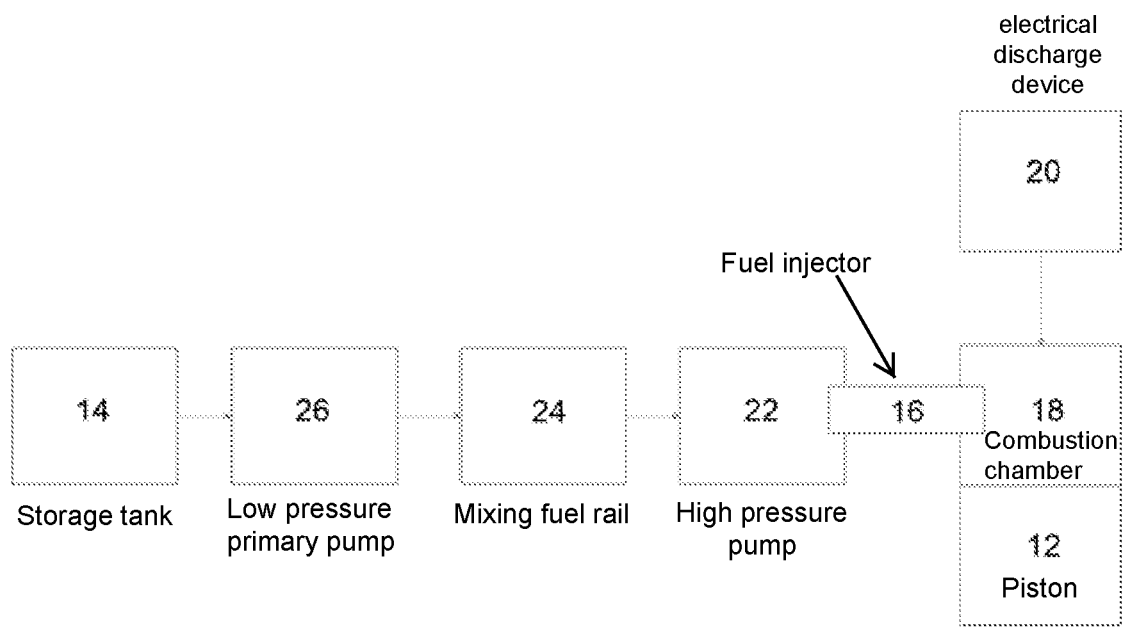
FIG. 2 is a block diagram of an internal combustion engine according to one form of the present invention.

Another aspect of the present invention provides an internal combustion engine that generates energy from a water-containing fuel as illustrated in FIG. 2.

The internal combustion engine comprises:
a piston (12) disposed within a combustion chamber, and connected to a crankshaft;
a storage tank (14) for holding the water-containing fuel;
a fuel injector (16) adapted to inject the water-containing fuel into the combustion chamber (18) to form water vapour; and
an electrical discharging device (20) that generates an electrical discharge to thermolyze the water vapour into hydrogen gas and oxygen gas in the combustion chamber (18), wherein the hydrogen gas is ignited in the combustion chamber (18) to drive the piston (12) to thereby drive the connected crankshaft of the internal combustion engine.

The water-containing fuel in the storage tank (6) contains 1-100% water. When the water-containing fuel comprises a mixture of organic fuel and water, the organic fuel and water is processed under specific temperature and pressure conditions to form a homogenised mixture.

In this respect, a further aspect of the invention provides a method of forming a homogenised fuel comprising organic fuel and water, including mixing organic fuel with supercritical water to form the homogenised fuel mixture.

Water under normal circumstances is almost uncompressible and possesses a low thermal expansion rate, high dielectric constant and an excellent solvent for electrolytes. This completely alters under supercritical conditions. Without being bound by theory, it is believed that supercritical water becomes compressible, expandable, and a very poor dielectric and solvent for electrolytes, which enables the water to mix with nonpolar liquids to form a homogenised mixture.

As such, the present homogenised fuel is formed by heating and pressurising water and a nonpolar organic fuel such as diesel/gasoline under supercritical conditions.

The mixing of the organic fuel and water into a homogenised fuel is facilitated by heating and pressurising one or more components of the internal combustion engine to form supercritical water.

To form the homogenised fuel, water and organic fuel are supplied through a filter to a primary low-pressure pump (26). Suitably, the organic fuel component is supplied directly to the low pressure pump (26) into the input side of the pump so that the organic fuel is drawn into the pump to mix with the water to form the homogenised fuel.

A mixing fuel rail (24) may be positioned between the high-pressure pump and the fuel injector(s) (16) to blend water and organic fuel to form the homogenised fuel.

Maintaining the fuel at a temperature of 374° C. and a pressure ranging from 3,200 psi to 36,000 psi keeps the fuel mixture homogenised.

The present invention provides a multi-stage (see FIG. 1) energy generation process involving flash boiling (6) of the water-containing fuel, thermolysis (8) of the water vapour generated, and combustion (10) of the vapours of the water-containing fuel.

This process can generate over 1.27 times more pressure/energy than conventional engine fuel combustion at similar liquid volumes. The energy obtained from the water-containing fuel from flash boiling and thermolysis (without combustion) provides more energy than the combustion of an equivalent volume of conventional organic fuel.

Conventional engine fuel conversion from liquid to vapor only provides a 9 times expansion of volume, which is insufficient to move the piston of an engine. Combustion of the conventional engine fuel which provides an average 1,400 to 1,600 times expansion energy is required to move the piston. This is less than the 1,800 times by volume increase provided by flash boiling and thermolysis of the homogenised fuel.

Combustion of the thermolysed fuel provides a further 2.4 times greater energy than that generated by combusting conventional engine fuel at comparative liquid volumes. Thus, the water-containing fuel has an expansion ratio 2,920 times by volume.

Net pressure/energy obtained from the water-containing fuel in comparative volumes to conventional engine fuel is greater than 2.08 times. This reduces the use of organic fuel by at least 60% whilst providing a similar amount of energy to the engine.

The tank (14) may include a first inlet point for receiving the water-containing fuel and a first outlet which acts as a vent. The tank (14) may include a second inlet point for returning fuel to the tank from a fuel delivery system and a second outlet in fluid communication with the delivery system for allowing the non-combustible water-containing fuel to travel to the combustion chamber (18).

The returning water-containing fuel can act as a heat source to heat the water-containing fuel stored in the tank (14). The stored fuel in the tank (14) may be heated to a temperature ranging from 40 and 115° C. depending on the volume of return fuel and the volume of stored fuel. As such, the return fuel acts as a pre-heater to elevate the temperature of the fuel before it enters the combustion chamber (18). A 6 to 12 microns filter is located between the tank (14) and the combustion chamber (18) to filter the fuel before it enters the combustion chamber.

The fuel may be further heated in a heat exchanger (28) located between the two pumps. The source of heat supplied to the heat exchanger (28) is derived from exhaust gas exiting the exhaust manifold of the engine.

The water-containing fuel is heated to a temperature up to 200° C. without boiling prior to being received by the high pressure pump (22). The water-containing fuel is maintained as a liquid because of a pressure of 100 psi applied by the low pressure primary pump (26) between the first heat exchanger but before the high pressure pump (22) receiving the fuel.

Where a primary pump is utilised that operates at a higher initial pressure, the supplied fuel to the high-pressure pump (22) may be up to the operational limits of the high-pressure pump (22). In this embodiment, the temperature can exceed 200° C.

Prior to the fuel exiting the high-pressure pump (22), the fuel may be further heated by applying pressure up to 36.000 psi on the fuel.

The fuel may also be heated within a fuel rail (24) which acts as a second heat exchanger that receives heated elements from the engine, including exhaust gas and/or hot fluids such as exhaust gas, engine coolant, oils or an electric heater.

The fuel rail holes receiving the fuel are provided with a swirling/rifling pattern machined into the outer face of the inside of the port. This causes the flowing fuel to rotate within the rail tube holes whilst being heated to cause blending into a single homogenous fluid.

In this embodiment of the invention, the fuel rail (24) utilises exhaust gas to heat the fuel rail (24) and the fuel. The use of the exhaust gas draws off the pre-cooled exhaust gas to extract the heat at its hottest point. The gas is transferred to a separate heat exchanger fuel rail distribution component to heat the fuel inside.

The 36,000 psi pressure produced between the high-pressure pump (22) and the fuel injector (16) nozzle exceeds the known minimum pressure of 3,200 psi required to maintain liquidity of the water-containing fuel.

The outlet of the fuel injector (16) is located directly in the combustion chamber (18) of the engine (direct injection). The nozzle or end of the injector (16) is sealed against the wall of the combustion chamber to prevent heat from the exhaust gas or compression intake air from passing between the head and the end/nozzle exposed to the combustion chamber (18). The outlet orifice or tip of the nozzle of the direct fuel injector (16) is the only area of the injector exposed to the combustion chamber (18).

In this embodiment, the entire nozzle area is exposed to the combustion chamber (18) to provide a further heating source.

The invention also provides a device for heating the fuel, comprising a nozzle for holding at least one charge of water, the nozzle being heated by heat generated in the combustion chamber (18).

The water-containing fuel in stage (2) injected into a combustion chamber (18) in stage (4) using a fuel injector (16).

The fuel injector (16) comprises: a body having an inlet port for receiving the water-containing fuel, a nozzle connected to the body for delivering charges of the fuel to the combustion chamber and a metering mechanism within the body and movable relative to the body to deliver single charges of fuel into the combustion chamber. Movement of the metering device relative to the body may be lubricated by the water-containing fuel.

The fuel injector (16) may be adapted to inject water into the combustion chamber (18).

The internal combustion engine may include a system for delivering water to the combustion chamber (18) comprising: a pressure device for pressurising the water; and a heating device for heating the water-containing fuel in fluid communication with the pressure device, so the water passing through the system is pressurised and heated before being delivered to the combustion chamber (18).

During injection (4), the water-containing fuel is subjected to a pressure drop between the fuel injector (16) and the combustion chamber (18) which reduces the vapor point of the water-containing fuel to 0° C.

This causes flash boiling and the formation of non-combustible water vapour (and organic fuel vapour when a homogenised fuel mixture is used). During flash boiling (6), the homogenised fuel physically expands in approximately 1 to 2 micro seconds to form water vapour.

The liquid to vapour phase transition provides a first energy release.

In contrast, conventional engine fuel only changes one state into a combustible liquid vapor. That transition itself does not release energy.

The combustion chamber pressure increases through physical expansion of the water-containing fuel from liquid to vapour phase. During this transition, the fuel expands by a minimum of 1,600 times its original volume.

To induce flash boiling (6), the water-containing fuel is heated progressively in eight individual phases or stages of increasing pressure in which the fuel travels from the storage tank (14) to the fuel injector (16). The fuel remains in liquid state when travelling from the tank (14) to the fuel injector (16).

When the water-containing fuel is delivered into the combustion chamber (18) by the fuel injector (16), the fuel experiences a reduction in pressure and an increase in temperature.

The fuel injector (16) is positioned in the combustion chamber (18) such that the outer wall of the fuel injector (16) exposed to the combustion chamber (18) absorbs and transfer heat from the combustion chamber (18) to the contained fuel in the fuel injector (16).

The pressure on the fuel to maintain the fuel in a liquid state may be provided by a high pressure pump (22) positioned between the storage tank (14) and the fuel injector (16).

The pressure from the high pressure pump (22) combined with the thermal expansion pressure due to the increased temperature of the homogenised fuel may cause the pressure on the fuel to exceed 3,200 psi to provide the required pressure to maintain liquidity of the water-containing fuel.

The ejection of water-containing fuel into the combustion chamber (18) causes a pressure drop from 3,200-36,000 psi to from 700-1,500 psi. The ejected water-containing fuel is subjected to further stages of contact heating from the combustion chamber with heat from the heated intake gas charge and the combined gas comprising exhaust gas, oxygen, water-containing fuel and water from previous water-containing fuel combustion reforming in the exhaust.

This combined gas has a relatively high water/oxygen content, due to the reconstitution of the water-containing fuel in cooler exhaust gases as compared to the combustion temperature in the chamber. This water/oxygen rich gas can be used to heat and enrich a subsequent intake/compression charge.

The fuel injector (16) provides the necessary basis for the next stage of energy generation in the combustion chamber (18) involving thermolysis of the water vapour into hydrogen and oxygen in stage (8) of FIG. 1.

The operating temperature in the combustion chamber (18) assists in thermolysis of the water vapour to create combustible gas, in the form of hydrogen and oxygen, as well as contributing to the total expansion pressure provided by the liquid to vapour transition of the water-containing fuel. A 200 times by volume expansion occurs when the non-combustible water vapor of the water-containing fuel thermolyzes into hydrogen and oxygen. No ignition/combustion occurs up to this point in the combustion chamber.

Flash boiling (6) and thermolysis (8) of the water-containing fuel occurs because of a combination of an elevated pre-ejection pressure in the fuel injector which is greater than the combustion chamber pressure.

The flash boiling and thermolysis of the fuel releases energy via the expansion of the fuel during its transition from liquid to vapour providing pressure/energy to the top of the piston at top dead centre to move the piston down a cylinder bore rotating the crankshaft of the internal combustion engine.

The combustible gas mixture of the homogenised water-containing fuel has an auto ignition temperature ranging from 600 and 1,000° C. depending on the volume of organic fuel. When the water-containing fuel contains only water, the auto-ignition temperature of hydrogen is 1,000° C.

Thermolysis of the non-combustible water vapor into hydrogen and oxygen occurs at or near the auto-ignition temperature of hydrogen.

Expansion and combustion (10) of hydrogen and oxygen provide a further release of energy. Thermolysis of water to form hydrogen and oxygen is completed in 1 to 2 micro seconds. This enables the combustion of these gases within the operation time frames of normal combustion. The final phase of heating of the injected water-containing fuel occurs in a flame front.

The flame front can be formed in any one of the following ways:—
1. auto-ignition of the thermolyzed water-containing fuel.
2. auto-ignition of the thermolyzed water vapour only.
3. auto-ignition of organic fuel vapour whether in the homogenised water-containing fuel or when organic fuel is separately introduced into the combustion chamber to form an initiating flame front/heat source for flash boiling the injected water-containing fuel and thermolysis of the water vapour.

The organic fuel component of the homogenised fuel has an auto-ignition point ranging normally between 600° C. to 700° C. compared to the auto-ignition point of hydrogen at 1,000° C., This means the hydrogen will ignite and combust later than the organic component of the water-containing fuel which produces a flame front at 1,800° C. in stage (10). The resulting hydrogen combustion can produce greater flame front temperatures in the presence of oxygen from the water-containing fuel.

As a result, flame front and combustion temperatures may reach over 3,000° C. in the combustion chamber which is in excess of the known thermolysis temperature of water vapour.

A reduction in the thermolysis temperature can be enhanced by introducing multiple ejecting discharges of water-containing fuel to form greater flame front temperatures which in turn allows greater overall volumes of discharging water-containing fuel to flash boil, thermolyze and combust. This strategy allows increasing volumes of ejecting fuel to produce more energy in the combustion chamber and engine power output. This staged or staggered increase allows reduced throttle opening to limit the volume of conventional engine fuel required to form an external flame front.

Whilst the auto-ignition point of hydrogen has remained the same, the multiple discharges of the water-containing fuel allows an initial discharge of the water-containing fuel to increase the available heat for subsequent discharges. This creates multiple flame fronts of hydrogen and oxygen to ignite subsequent discharges of fuel.

In embodiments of the invention wherein the water-containing fuel is substantially water, the absence of an organic fuel component (e.g. diesel or petrol) means that there is no organic fuel to provide a flame front to initiate thermolysis of the water and into which charges of water are injected.

In these embodiments, to thermolyze water, each fuel injector (16) includes an electrical supply port connected to a source of electricity. The electrical supply port electrically connects a spark (e.g. plasma spark) tip with the power source so as to cause a spark in the heated and pressurised water.

Systems may include sparking tips, such as standard spark plugs. This embodiment of the invention applies to gasoline (petrol) engines that require spark ignition of the fuel. These types of engine are normally understood to have a low combustion chamber compression rate or ratio and require a modified spark output to assist with the transition.

In one embodiment, a gasoline engine utilises the heated pressurised fuel of this invention and injects the fuel into the low compression ratio combustion chamber to effect the same transitions as previously described but now applies an electrical spark. In conventionally understood spark ignition systems, the fuel is supplied to the combustion chamber first either by upstream injection or direct injection.

In conventional systems, this is the only way it can be done as organic fuel requires time to convert to a combustible vapor in order for the spark to ignite the fuel. Therefore, the spark is at all times following or subsequent to the introduction of the fuel.

In contrast, the invention performs the ignition in reverse.

An electrical discharge/sparking device (20) is provided to generate a high voltage spark (7) of at least 150,000 V into which the water-containing fuel is injected into. Suitably, the voltage ranges from 400,000 V to 1,700,000 V. This electrical discharge is performed for each ignition cycle in each individual engine cylinder and can be a continuous discharge for the required period and or individual multiple discharges with only a micro second apart, thus giving the appearance of a single continuous event into the combustion chamber (18).

The sparking or ignition strategy of the present invention is performed prior to and during the ejection of the water-containing fuel rather than the normal ignition process in which the spark being provided to the cylinder once the fuel is in the cylinder.

The combustion chamber (18) is provided with two anodes as part of the electrical discharge device (20). The electrical discharge device (20) receives the high voltage discharge from a modified ignition coil through the first anode. That anode then discharges the high voltage spark only to the second anode as part of the new circuit. Because the second anode is the earth/switching side of the circuit and not the conventionally understood engine/battery earth circuit, the high voltage discharge will only travel between the two anodes in the combustion chamber (18) to complete the new sparking circuit and does not require the engine/battery earth system to complete a conventional engine sparking circuit.

The electrical discharge device (20) is hollow and comprises non-electrically conductive material with the two anodes inserted into the sides or walls of the electrical discharge device (20) so as to protrude into the combustion chamber (18) side of the outlet of the electrical discharge device (20). This causes a high voltage spark to transverse the combustion chamber (18) between the two anodes of the electrical discharge device (20) in a direct path of the incoming fuel. This direct spark interference with the ejecting fuel is due to the electrical discharge device (20) having a hollow centre where upon the fuel injector (16) is installed. This allows the ejecting fuel to fire between the two exposed anodes in the combustion chamber when ejected into the discharging spark.

Unlike other multiple or dead spark systems which ignite the fuel mixture that is in the combustion chamber first with the initial discharge and follow up with further spark discharges to capture and combust any uncombusted organic fuel, the present invention utilises the initial sparking to heat the fuel to support its transition to vapor then to a combustible gas, releasing the energy from those transitions for the final release of energy as a combustible gas and igniting the transitioned fuel by both spark and elevated temperatures which are at the water-containing fuel's auto-ignition point. This dual ignition process enables up to 100% combustion of the fuel. This sparking principle is in contrast to conventional spark ignition systems (including a spark plug) which are heat rated so as to not increase combustion chamber temperature and keep the combustion chamber as cool as possible whilst still providing a spark to ignite the organic fuel component of the water-containing fuel.

The spark is used to heat the fuel to facilitate flash boiling (6) and thermolysis (8) for the release of pre-combustion energy. The sparking process utilises more than one spark and greater voltages to perform more than one function compared to conventional engines. These voltages range upwards of 30,000 V and can be achieved by elevated capacitive discharges through one or more ignition coils, and or specifically modified CDI systems, producing voltages in the range of up to 1,700,000 V. An embodiment of the increased spark voltage is the addition of a 500 V capacitor of an ignition coil that normally discharges 40,000 V. This means that instead of 12 V on the primary side of the coil which would normally step up the output by 3,333 to 40,000 V, it now receives 512 V directly to the primary side of the coil and steps up the output to 1,706,667 V. This heats the output spark and the coil. Controlling coil temperatures may be achieved by immersing the entire coil into oil which is an extremely poor conductor of electrical current and thus insulates the coil terminals. The oil also prevents spark jump between its terminals and causing spark output failure. The oil is circulated via a pump through a cooler to maintain an operating temperature of the coils and are sealed in a vessel holding the circulating oil.

The ignition point in the combustion chamber is typically at the highest possible compression position for crank rotation. Any energy release has to occur with usually 5 to 10° of crank rotation before or after top dead centre. In contrast, the ejection of the present invention can occur at any time, any piston position and cycle.

The elevated pre-ejection fuel temperature provides a reduction in the vaporization temperature to 0° C. or below and aids the ignition/combustion earlier in an engine cycle. This may allow elevated intake compression temperatures to complete transitioning prior to piston reaching optimum position, which is not limited to top dead centre, as with conventional engine fuel ignition.

The combusting gas combined with the expansion energy from the transitioning of the of water-containing fuel into its vapour phase increases the total energy applied to the top of the piston on a power stroke upon combustion of the hydrogen and oxygen gases. This reduces the amount injected fuel required and in the amount of pollutants and harmful emissions generated whilst maintaining the same power output.

The elevated pre-ejection fuel temperature may be provided at different times or cycles in the engine crank rotation and, consequently, at any piston position in the cylinder on any stroke for fuel injection. This allows ejection of the water-containing fuel to occur at any point in any cycle and piston cylinder position.

The elevated pre-ejection fuel temperature does not normally occur at bottom dead centre for a piston. As the rising piston compresses the hot intake charge, the temperature is further elevated thus causing greater heating which has a starting temperature already above the standard engines intake, to cause greater heating to the already transitioning fuel vapor for thermolysis of the water vapour.

Combustion (10) of the thermolyzed vapour in stage generates exhaust gas containing water, oxygen and residual water-containing fuel. The residual water-containing fuel is at supercritical temperatures which is similar to the water-containing fuel in the fuel injectors. Thus, recycling and/or retention of the fuel in the combustion chamber elevates the starting intake gas temperatures for subsequent compression and combustion from a fuel injector such that the reconstituted water-containing fuel in the exhaust is of sufficient quantity to form a combustible mix for the subsequent cycle. This also supports combustion chamber heating of the exposed fuel injectors to further elevate their stored and ejecting fuel temperatures into the combustion chamber.

The elevated compression temperature allows the stored water-containing fuel to be further heated upon ejection to reduce the transition time of the water-containing fuel.

When heated, water and organic fuel components of the homogenised water-containing fuel having different specific densities (0.7 for fossil fuel and 1.0 for water) which would result in the organic fuel component combusting first forming an initial organic fuel flame front having a temperature greater than the thermolysis temperature of water vapour.

The inclusion of an organic component to the fuel either applied as an original ejecting volume or in the homogenized fuel blend can facilitate energy release from water and ultimately causing the combustible gas to ignite and combust in the combustion chamber.

Combustion chamber heat produced during the compression, ignition or exhaust strokes, and in the exhaust and compression gases raises the temperature of the combustion chamber to over 200° C. with flame fronts at over 1,800° C. Hydrogen and oxygen combustion can further elevate the combustion temperature to increase the flame front and combustion process temperatures which may be transmitted into the fuel injectors and the subsequently ejected homogenised fuel discharges which are in direct communication with the combustion chamber. This elevated temperature from the elemental gases can further increase the temperature of the fuel injectors to increase the temperature of the homogenised fuel to above 450° C.

The water-containing fuel is ignited either by compression ignition and or spark ignition, when the water-containing fuel is delivered to the combustion chamber.

There is an increase in pressure in the combustion chamber because of the formation of water vapor from the water, followed by the formation of hydrogen and oxygen from the water vapour, and ignition of hydrogen and oxygen.

This increased overall pressure is greater than that generated by an equivalent volume of conventional engine fuel being ignited and combusted and enables a reduced volume of conventional engine fuel to generate the same amount of energy to rotate the crankshaft and operate the engine. It was discovered that the reduction in organic fuel requirement is sufficiently significant that the engine can operate normally on an equivalent volume of organic fuel that is typically required to idle the engine.

The pressure derived from the transitioning of water into water vapour, subsequently into hydrogen and oxygen, and combustion of the hydrogen and oxygen when applied to the top of the piston whilst said piston is at top dead centre on the compression stroke of a combustion engine will substantially replace the expansion energy/pressure derived from oxidation/combustion of conventional engine fuels in the same combustion chamber.

This expansion pressure/energy moves the engine connecting rod causing the crankshaft to rotate and the piston to move down the cylinder and via the engine to operate the storage tank that holds the non-combustible water-containing fuel.

The combustion chamber may include an exhaust gas recirculation system (EGR) (11) to feed exhaust substances from the combustion of hydrogen back to the combustion chamber.

In this invention, EGR (11) increases the starting temperatures of an intake fuel charge to facilitate the transitioning/ignition/combustion processes and increases volatility and overall combustion expansion effect. The exhaust gas includes uncombusted and or reconstituted water-containing fuel liquid, vapor and or gas. These exhaust gases can also contain water-containing fuel as a result direct injection of the fuel into the hot exhaust gases and or heated intake charges on any engine stroke or piston position in the cylinder.

The retained and reconstituted water-containing fuel is non-combustible which is the same as the pre-gas transitioned ejected water-containing fuel. This allows the water-containing fuel to be injected/supplied into the hot exhaust gases below the thermolysis and auto-ignition temperatures. The fuel will not pre-ignite even at supercritical temperatures. Ignition occurs when the final compression temperatures upon the piston reaching optimum compression position in the combustion chamber is reached. This exhaust gas fueling process allows continuous re-use of exhaust gas as the fuel and only injecting further water-containing fuel to offset or increase combustion energy used in the combustion chamber. This heat work energy loss naturally occurs in a combustion engine and varies according to engine demand placed upon the engine, requiring it to supply more power (heat/work energy) for higher demand.

This embodiment allows a volume of injected water-containing fuel to be supplied to the combustion process only as support for the water-containing fuel consumed in the heat/energy/work from the previous combustion cycle to maintain the required amount of water-containing fuel consumed from the exhaust gas to meet the engine speed and load demands.

The extra water-containing fuel injected also can be an additive prior to the engine reaching a minimum operational temperature supporting heating methodologies as described for this invention. Upon the temperatures being elevated, the injected water-containing fuel can be a secondary source of water-containing fuel. Thus, a primary source of water-containing fuel can be the fuel found in the exhaust gases and a normal injection cycle as commonly understood can be secondary. The water-containing fuel found in the exhaust gases can be water-containing fuel from a previous combustion event or from ejection of the water-containing fuel into the exhaust gases at any point in the engine cycle. This allows the use of exhaust gases in the combustion process such that closing all inlet and exhausting valves to completely seal the combustion chamber will cause the piston to compress at every stroke or engine cycle the exhaust gases containing the water-containing fuel to heat the water-containing fuel for transitioning and auto-ignition. Thus, the whole process will function as a single piston cycle of compression, transition, ignition/combustion, power/energy, production and retention of the heated exhaust gases containing water-containing fuel and oxygen.

By utilising the water-containing fuel in an original combustion event, the reconstituted water-containing fuel in the exhaust gases comprises heated oxygen and water. Thus, the oxygen for oxidation is provided in the exhaust gases from the transitioning of any water-containing fuel of the exhaust gases. This eliminates the need for external intake charges to provide oxygen for oxidation. The amount or volume of oxygen can be less than normally required for a normal intake charge and will not affect the combustion process as the derived hydrogen from the water-containing fuel will combust at greater fuel to air ratios than conventional organic fuels.

The exhaust gas provides further oxygen for the combustion of hydrogen. This can convert a 4-stroke and or 2-stroke engine and its processes into a single cycle/stroke engine and function, such that a combustion event occurs every time the piston rises to top dead centre and or to a selected ignition combustion position for the piston.

In this embodiment, the valves are maintained closed after engine warm up to the required temperature such that a compression occurs on each and every stroke like a 2 stroke with no exhausting and or external intake process. Auto-ignition occurs every time because of the exhaust gases act as a fuel at their elevated temperatures.

This almost perpetual motion is supported with injection of more water-containing fuel, as required for engine speed and load demands. A useable combustible air fuel ratio range can be a lean mixture of 90 parts oxygen and 10 parts hydrogen to 25 parts oxygen and 75 parts hydrogen, and a 2 parts hydrogen and 1 part oxygen naturally occurs from the formed gases from the water. Meaning that under the conditions provided in the combustion chamber, hydrogen will combust when the water vaporises.

The exhaust gas from the water-containing fuel is non-combustible unlike conventional organic fuels, which offers no combustion chamber energy for work in subsequent ignition/combustion cycles. When the water-containing fuel combusts, the portion which does not combust will remain as a gas and or reconstitute in a supercritically heated liquid and or vapor. Therefore, exhaust gas reuse can be a new fuel supply in a combustion process.

The pre-heated intake air and/or exhaust gases can be introduced in the combustion chamber such that the intake air charge and exhaust charge are interchangeable.

The heat generated by the exhaust gas can be recovered to heat various components of the internal combustion engine (9).

The heat exchanging/mixing device may use exhaust gas or compression gas as the hot stream. In some embodiments, the exhaust gas is fed to an exhaust manifold heat exchanger to heat the water-containing fuel. The exhaust gas can also be used as the hot stream for the heat exchangers (24, 28).

A further description of various embodiments of the present invention is provided below.

Water or a mixture of Biological ("Bio") and or Fossil fuels and or any water alone in this invention can form with, but not limited to: any combination of any Bio and or Fossil fuel and any water, or any water alone, is known as "fuel"/water in this invention. This invention and inventive processes can cause any water, and or in combination homogeneously as one fluid with Bio and or Fossil fuels where Bio/Fossil fuels are retained in the "fuel"/water to release its energy in a combustion chamber. The "fuel"/water of this invention in one embodiment as a homogenized blend of two normally dissimilar or non-compatible fluids, that through the inventive processes described herein of heating and applied pressures cause the non-polar oil based fluids such as diesel and gasoline and or any Bio/Fossil fuels to combine with a water component as a single homogenized fluid. The "fuel"/water is not an emulsion which normally requires a third or fourth or more substances to mix with the water and or Bio/Fossil fuel to cause the formation of a combined fluid mixture. Such ingredients as soluble oil, hydrogen peroxide, ammonia, all well-known and commonly understood technologies and methodologies with prior art dating back to 1931, act as a catalyst to allow the Bio/Fossil fuel to combine with water to form a single emulsified fluid. This type of combustible emulsion does not function in invented methodologies of this invention as the emulsified mixture is still combustible in its liquid/vapor states, the same as Bio/Fossil fuels alone and only releasing a single energy output or expansion event. Nor can the homogenized blend of "fuel"/water herein act/perform like an emulsified mixture as they both perform in different methodologies requiring opposing technologies and methodologies to combust. An emulsified mixture cannot be exposed to elevated temperatures of these inventive processes as it will combust causing pre-ignition and causes a breaking down of the combining effect that forms a single fluid pre-compression thus defeating the purpose of emulsification. The emulsified mixtures are also combustible as a liquid and or vapor with a commonly understood blend ratio of 50% diesel, 40% water and 10% combining agents to form the emulsion, to ignite and combust like normally understood Bio/Fossil fuels thus making a "combustible wet fuel" as a liquid and or vapor and different and unlike the "fuel"/water of this invention which is formed in components of this invention. Factually an emulsified blend and although prior art claims blends of up to 80% water 10% diesel and 10% combining agents is in fact untrue as a blend of that combination will not ignite or function as a fuel as commonly understood because that much water content will act as too greater diluting factor. Meaning the diesel will not reach its optimum ignition temperature because the water will cool and or dilute the combustible Bio/Fossil fuel charge, opposite to the "fuel"/water herein. The homogenized formations of this invention occur in fluid communication, in a, storage/delivery system; and or in the combustion chamber fuel delivery devices and or a combustion chamber and or engine cylinder; and or in a compression/combustion and or exhaust processes and or any combination of; and or; during, pre, and or post the compression/ignition, combustion, and or during exhaust processes of either an autoignition (diesel) or spark ignition (gasoline) internal combustion engines or any combustion engine that ignites and normally combusts a fuel that is received into the engine for combustion. The "fuel"/water in fluid communication can form in any components of this invention and including; but not limited to; a combustion chamber/cylinder of an internal combustion engine prior to, during and or in ignition/combustion and or exhaust events, utilising the inventive processes described herein. The "fuel"/water can be any water alone and or water combined with any Bio/Fossil fuel to form the homogenous liquid; and or homogenous vapor from specifically invented principles components, methodologies and processes described in the following manner of, protocols and functions for water and or in Bio/Fossil fuels combination as "fuel"/water of this invention in a procedure of:—preheating of water and or Bio/Fossil fuel and or "fuel"/water prior to either its introduction to the original engine components in fluid communication between the storage tank and the combustion chamber/cylinder and where those components are retained and utilised and or the components of this invention to temperatures ranging usually but not limited to: 40 to 450 Degrees Celsius starting with the introduction of recirculated "fuel"/water and or the original Bio/Fossil fuel recirculated from the original engine/components and or fuel systems. Either being from the original equipment and or from the equipment/components and or fuel system of this invention at the invented temperatures to initially heat to, but not limited to; of 40 to 115 Degrees Celsius. Recirculation of fuel from the engine and or fuel system components is commonly understood as a bleed off procedure from the injection system.

However in this invention the recirculation system/procedure is a primary heating protocol as the recirculated "fuel"/water can be and not limited to; up to 450 Degrees Celsius, thus when mixed provides the primary heating of the inducted "fuel"/water being supplied to a delivery system of this invention such that the heating occurs in the storage unit and or the out flow of the "fuel"/water from the storage unit. This initial pre-heating can also occur in the "fuel"/water storage tanks by the recirculated fluid, mechanical, electrical and or exhaust gas heating supplied/provided to the "fuel"/water storage tank as the new "fuel"/water is a non-combustible liquid or vapor, unlike common Bio/Fossil fuels or emulsions, until the "fuel"/water is treated as per this invention described herein. Overall initial heating can also be a combination of storage heating and the previously described re-circulated introduction heating from Bio/Fossil fuel and or "fuel"/water prior to supply to a pressurising device where the recirculated Bio/Fossil fuel and or "fuel"/water is pressurised individually and or in combination to any required pressure and is but not limited to; between 1 to 200 psi in this first pressurising device for this embodiment. Thus mixing/blending together of either the stored "fuel"/water, the recirculated water or Bio/Fossil fuel and or "fuel"/water and or with or without the stored "fuel"/water being pre-heated can be any combination supplied to a pressurising device and be, but not limited to; elevated to the engines operational temperatures of, but not limited to; between 40 to 115 Degrees Celsius or greater where greater heat is available. This blend in fluid communication in this embodiment when supplied to a pressurisation device, where the "fuel"/water blend is pressurised, and in this embodiment exits the device is subject to, but not limited to: a minimum of 1 psi pressure or greater. The output pressure from the pressurising device in this embodiment of the invention is limited by the maximum input pressure for a secondary pressurisation device of this embodiment, however is sufficient so that the water and or Bio/Fossil fuel and or "fuel"/water is maintained as a liquid between a first pressurisation device and a second pressurising device whilst elevated in temperature as described herein. This is usually, but not limited to a maximum input limit of a second pressurising device of 200 psi at 200 Degrees Celsius in fluid communication for that initial elevation of pressure/temperature of the "fuel"/water in this embodiment. This embodiment of the invention utilises the primary low pressurising pressure device to pump and supply the "fuel"/water in fluid communication to the components either (OEM) original equipment manufactured and or components of this invention. Other embodiments a low-pressure pressurising device is not utilised and the delivery system can rely on the suction from the second and or high pressurising pressure device which induces flow of the water, and or Bio/Fossil fuel and or "fuel"/water of this invention from the storage tanks and the flow of the re-circulated fuels and or "fuel"/water of this invention. Subsequent to the first pressurising device if and or if not utilised as per other embodiments the fluids are now combined as "fuel"/water and supplied through a first heat exchanging mixing device prior to the input side of the high pressurising pressure device/pump. The heat exchanging devices not only heats the Bio/Fossil fuel and or the "fuel"/water of this invention it mixes the fluid as it moves through the heat exchanger by causing swirling or turbulent/agitating effect on the fluid utilising undulating/corrugated and or riffling on the inner walls of the tube housing containing the "fuel"/water thus causing the "fuel"/water to have greater contact with the heated inner wall surfaces of the heat exchanger fluid tube in fluid communication thus transferring greater heat to the "fuel"/water contained therein. All heat exchangers of this invention apply the same effects and principles causing turbulence, swirling and an agitation effect to increase contact by the "fuel"/water with the respective heated walls/surfaces. This also breaks up the Bio/Fossil fuels where retained and or the "fuel"/water into smaller particles to allow faster more efficient heat transfer to the "fuel"/water in liquid, vapor and gas. Different methodologies such as, but not limited to:—rifling; and or corrugated; and or undulating outer and or inner tube wall surfaces to agitate and or swirl the "fuel"/water in any of the heat exchangers and tubes in fluid communication which in turn has its outer wall surface in contact with any heat source for all heat exchangers, thus conducting/transferring heat to the "fuel"/water in any vessel containing the "fuel"/water. Heat exchangers of this invention are also under various amounts of pressure from the low pressure up to 200 psi in a first heat exchanger up to the last heat exchanging component, the combustion chamber fuel delivery device which is subject to pressure greater than the high pressurising device of this embodiment above 36,000 psi described herein further utilising the methodologies to form homogenized "fuel"/water liquid, vapor and gas. Any heat source can be utilised in heat exchangers in this invention, in this embodiment the exhaust gas and or compression gases in their respective heat exchangers as described herein are the heating sources. The functions described herein are for all heat exchangers of this invention, are replicated in the functionality of a combustion chamber of a combustion engine because of use of the "fuel"/water of this invention and the specifically invented principles, methodologies and functions performed to release the energy of the "fuel"/water as partial or complete replacement for Bio/Fossil fuel in a combustion chamber.

Thus the functions as described herein for the heat exchangers of:

conduction or transfer heating, pressure heating, agitating/swirling/mixing/blending are the same functions that are now performed in a combustion chamber for the "fuel"/water because of this invention, thus now making the primary function of an engine cylinder/combustion chamber a heat exchanger rather than simply an area to contain a combustion event. All heat exchangers of this invention whether specifically stated or not, perform the same functions as described herein including breaking down the Bio/Fossil fuel and or "fuel"/water using these functions to create smaller particles improving heat transfer into the "fuel"/water causing or assisting in the formation of homogeneous liquid and or vapor. This functionality as found in all heat exchangers is replicated in the combustion chamber/cylinder upon ejection of "fuel"/water in the combustion chamber.

Therefore because of the use of "fuel"/water as the energy source of this invention the combustion chamber itself has a dual purpose/function of: (1) a heat exchanger and (2) a combustion chamber, performing and providing the functions as described for all heat exchangers herein. Such that the afore-mentioned effect is further enhanced in the combustion chamber through the extremely high pressure ejection/thrust of the heated direct injected "fuel"/water at the extreme velocity from the delivery system causing greater turbulence and a more even distribution throughout the cylinder and or chamber for its energy release than normally understood from current high pressure injection because of the nature of the added pressure due to injector heating discussed later and the invented methodology of how the energy is released from the non-combustible "fuel"/water in a combustion chamber. The more even distribution of the "fuel"/water in the chamber is evidenced by a smoother engine performance such that the normally and commonly understood engine knock (rattle) associated with most diesel engines is significantly reduced and in some instances eliminated altogether. Such results are not achieved from Bio/Fossil fuels and or emulsified blends thus also indicating a difference in functionality. As described through the "fuel"/water's transitions from liquid to vapor to gas: these transitions cause a release of expansion energy at every stage which is totally opposite to that of normally understood Bio/Fossil fuels which do not transition like the "fuel"/water of this invention. The transitioning of "fuel"/water releases part of its energy in the combustion chamber prior to ignition. Bio/Fossil fuel unlike the "fuel"/water is at all times combustible and cannot be treated as "fuel"/water is, with the extreme temperatures and only releases its single energy source from the liquid when combusted with no transitioning as described for the "fuel"/water used in this invention.

The transitioning of "fuel"/water increases its own agitation, swirling and blending in the combustion chamber which self-promotes and complements the invented transitioning processes described herein by forcing greater movement of the transitioning "fuel"/water and but not limited to, producing additional movement in a normal intake compression charge and or the blend of hotter than normal compression gases created for this invention.

This means the transitioning "fuel"/water itself increases overall combined movement within the combustion chamber through its physical expansion as it transitions thus gaining greater contact with the moving compression gases further elevating temperatures and heat absorption into the "fuel"/water in its liquid, vapor and gas states on any engine cycle (intake and or exhaust strokes) upon ejection of the "fuel"/water. This process is different, unlike and totally opposite to the functionality of normal Bio/Fossil fuels as Bio/Fossil fuels cannot replicate the functionality of the "fuel"/water and its transitioning processes as it is chemically unable to perform in this manner and cannot be introduced into the combustion chamber to transition because the heat will cause Bio/Fossil fuels to pre-ignite in a combustion chamber and fail to power the engine correctly and will produce power loss and greater amounts of harmful emissions. Bio/Fossil fuels only have an expansion factor of only 9 times its own volume when evaporated offering no effective increase in combustion chamber pressure or any fuel conversion induced activity through that evaporation.

The transitioning processes of this invention cause a reduction in droplet and particle size of the "fuel"/water without the use of the "Reynolds Principle". This principle is the reduction of the liquid droplet and particle size from air speed moving across the surface area of that liquid to evaporate it to form vapor.

This known principle is used both for upstream and direct injection (commonly known as diesel injection) with the later relying on combustion chamber resistance between the ejecting liquid and the intake air movement from the ascending piston in the cylinder to remove the liquid layers to form vapor for ignition capability. The invented "fuel"/water transitions are through the imposition pre and post entry into the combustion chamber of multiple levels heating and applied pressure from invented principles and processes in different stages from storage through supply from a tank in fluid communication to a combustion chamber forming combustible gas for ignition/combustion. The invention uses multiple levels of heating of low and very high temperatures, multiple levels of applied pressure of low and high pressure and pressure reduction during ejection into a combustion chamber. In an embodiment of the principles, invented technology and new injection strategies causing faster and more complete Flash Boil of the "fuel"/water into a vapor (steam) and that release of energy, the ejection of the heated "fuel"/water can be, but not limited to; commenced earlier than normally understood or completed with Bio/Fossil fuels in an engine cycle to effect the energy release of the "fuel"/water at a greater pressure drop/differential between the combustion chamber pressure at the time of ejection and the applied pressure in the "fuel"/water delivery system. Thus, the ejection of the "fuel"/water can be initiated and or completed in any point of an engine cycle giving greater effect to Flash Boiling of this invention. This can allow Flash Boil vapor (steam) completion in compressing heat created in the combustion chamber and or final transitioning at peak compression, for the final temperature transitioning called Thermolysis, occurring at or upon and not limited to; the re-application of pressure causing one of the final stages of heating in the chamber upon the completion of the compression stroke; and or where utilised, electrical discharging and or flame front heating to transition the "fuel"/water liquid and vapor into a gas.

These new principles and methodologies of this invention increase the speed with which the liquid "fuel"/water transitions/converts to a gas completing its transitioning in approximately one tenth of the time that Bio/Fossil fuel converts in a normal intake and or combustion chamber, Thus demonstrating the known and current technology including the "Reynolds Principle" of gas formation from a liquid for Bio/Fossil fuel which cannot and is not utilised for the liquid "fuel"/water as it will not evaporate it and requires the invented technology of heat, pressure, pressure reduction and reapplication of heat as described herein all of which combine in this invention providing energy from the new "fuel"/water from this new and invented technology. In one embodiment of the use of "fuel"/water but not limited to where cylinder and or compression temperatures are not elevated through principles and methodologies and or where combustion chamber/cylinder modifications are not available and or where temperature of the "fuel"/water is not able to be elevated then the imposition of electrical discharges into "fuel"/water of this invention can serve as the element to complete a final elevation of temperature of the "fuel"/water to initiate and or complete transitioning and auto-ignition processes. Electrical discharges are either supplied and or imposed upon the homogenized "fuel"/water or water alone in the combustion chamber and or cylinder and upon the discharging "fuel"/water, meaning, the imposition of the invented electrical processes for the "fuel"/water for this invention are totally opposite to known and current technology for electrical ignition or dissociation of water. As utilised in this invention the use of the electrical discharging in the combustion chamber as discharged from the combustion chamber electrical delivery component serves to heat not electrically ignite or dissociate the "fuel"/water. The heating principles of this invention cause transitioning rather than the use of, as commonly understood lower voltage and current that would normally cause dissociation, ignition and combustion of water is not utilised but rather the invented processes of heating, that is naturally produced in high voltage electrical discharges thus that the imposition of the high voltage/temperature electrical discharges of this invention supplies the required heat. An imposition of heat and temperature from the invented electrical discharging and or where available and not limited to; heating from other methodologies causes heating/temperature elevation for this invention as described, will cause the "fuel"/water to separate where Bio/Fossil fuel is retained as described herein, causing a Bio/fossil fuel gas and or gases of Hydrogen and Oxygen. The gas formations in this invention and embodiment is, but not limited to; from the hot high voltage electrical discharges imposed on the "fuel"/water to transition, as the "fuel"/water cannot and will not ignite as a liquid or vapor prior to its transitioning to gases. This occurs in stages due to differing vaporization, gas formation and ignition temperatures of "fuel"/water. Bio/Fossil as part of the "fuel"/water having a lower range of temperatures in the stages described above under the invented and imposed conditions of this invention forms a gaseous state earlier/sooner in the transition processes.

The invented and imposed temperatures and pressures will not cause ignition in a storage/delivery/supply and combustion chamber methodologies as it is non-combustible in its liquid and vapor state unlike and totally opposite to normal Bio/Fossil fuels. Thus in the embodiment discussed herein, the electrical discharging only causes an elevation in temperature of the "fuel"/water, to transition, ignite/combust the "fuel"/water through that heat albeit in separate stages where Bio/Fossil fuel is retained in the "fuel"/water, as occurs in all other embodiments due to the invented applications of principles in this invention and the invented technology causing the same reactions of "fuel"/water. In this embodiment the "fuel"/water fires/ejects through a field of high voltage, high temperature multiple electrical discharges within the combustion chamber and or in the electrical discharging device of this invention elevating the temperature of the "fuel"/water as it passes through or enters, or in the combustion chamber/cylinder. In this embodiment the above methodology and technology of this invention is totally opposite and different to known engine sparking processes that normally impose lower voltage at a minimal temperature spark into the Bio/Fossil fuel already delivered to and in the combustion chamber to electrically ignite and combust that Bio/Fossil fuel mixture without any applied or utilised heat. Thus, meaning the invented electrical process of this invention not only performs to heat to cause transitioning, ignition and combustion of "fuel"/water through the application of that heat, but it electrically discharges prior to the introduction of the "fuel"/water which is totally opposite to conventional, known and current sparking and or fuel injection methodologies making this whole process new and inventive. The combustion chamber electrical discharging device of this invention, unlike any currently known spark plug is a hollow component to allow the installation of the fuel injector into the back of it and giving the ejecting nozzle end of the injector access to the combustion chamber. The combustion chamber sparking device of this invention for this embodiment has but not limited to; two electrodes traversing parallel down the inside opposing walls so that the two electrodes are facing each other from either side of the component thus that the electrical discharge travels across the centre of the component between the two electrodes. The electrodes can be any shape and but not limited to in this embodiment a rectangular shape with four long parallel sides, two sides of which have larger surface areas than the other two sides providing two opposing faces with the inner large faced long sides of each electrode opposite each other. The overall size of the invented component is the same as conventional spark plugs ensuring fitment in the OEM (Original Equipment Manufacturer) hole in the engine head and or block to be used as a replacement or direct exchange for a normal or commonly understood spark plug. However, the electrode gap/distance between the anode and cathode of the invented component is far wider than a normal spark plug and extends but not limited to; the full width of the component area that is exposed to the combustion chamber. This distance between the electrodes of this component is far greater at between 2 mm to 25 mm as compared to normally understood spark plug that normally has an electrode gap maximum of 1 mm thus the standard or commonly understood electrical sparking system with its normally lower voltage in the ranges of 25,000 to 60,000 volts will not discharge its electrical spark across the electrodes of the herein invented combustion chamber discharging component. Thus, requires the electrical output and methodology of the newly invented electrical discharging system of this invention at the new and invented voltages and resulting discharging temperatures at the applied/utilised voltages enabling a discharge to bridge the gap between the two electrodes completing the designed circuit and combustion chamber discharge. Therefore the electrical discharge and components of this invention are totally different with different functionality to that of a normally understood spark ignition systems as the discharge needs to be of sufficient voltage bridging the gap between the electrodes of the combustion chamber discharging components that range between 2 mm and 25 mm and is a far greater distance between electrodes than that of a normally known and understood spark plug thus normally understood voltage/current sparking systems will not traverse the gap at a normally understood 25,000 to 60,000 volt ignition output and requires but not limited to a minimum 150,000 volts per discharge to travel from the output electrode to the receiving electrode of this invented combustion chamber discharging device. The greater voltage in the discharge causes greater temperatures for that discharge. Thus, the normal spark plug is not able to be used with the invented discharge electrical outputs of this invention as it will cause melting of a spark plug. The required and utilised increase in voltage to actually perform this bridging/traversing function between new larger/wider electrodes with an increased gap for this invention also means an elevation in electrical discharging temperature proportionately as voltage increases. The now increased individual discharge temperature combined with the frequency/multiplicity of discharges further elevates the total discharging temperatures in the combustion chamber. Thus the voltage of this invention is at but not limited to; a minimum of 150,000 volts and greater per discharge and in this embodiment the total heat derived from the electrical discharge is managed/controlled by the voltage and or in combination with the frequency/multiplicity and total amount of discharges for any single "fuel"/water ejection cycle in the combustion chamber, thus ensuring sufficient heat to cause the elevation in temperature of the ejected "fuel"/water volumes as required by this invented technology and discussed throughout. By elevating "fuel"/water to the new useable temperatures of this invention through the multiple electrical discharges in any one "fuel"/water injection cycle using these high voltages for temperature, will transition it into a gas and ultimately cause heat ignition and combustion of the "fuel"/water from the imposed heat not electrical ignition as is commonly understood as the elevated ignition temperature of the "fuel"/water will be reached first to cause the ignition of the "fuel"/water without the use of an electrical discharge to ignite. The high temperature/voltage multiple electrical discharges of this invention are totally different performing totally different functions to commonly known multiple spark discharging. The known principles and application of currently known technology utilise second, third or multiple spark discharge known as dead sparking as emission reducing process by igniting any remaining hydro-carbons from a previous ignition/combustion event. This commonly known process called a "dead spark" system as it does not contribute any combustion energy as an actual ignition/combustion function for the Bio/Fossil fuel, nor provide heat or temperatures of this invention to the combustion chamber at any point from its electrical discharge. This is not the high temperature/voltage system of this invention. The currently known and commonly understood technology discharges a secondary and or multiple firing of no difference in voltage to the standard or normally understood voltage ranges for known spark ignition systems. Thus, there is no heat value imposed upon the Bio/Fossil fuel unlike and as required by the "fuel"/water of this invention from its invented multiple electrical discharging methodology. As previously described Bio/Fossil fuel cannot be treated the same as "fuel"/water of this invention. All known multiple sparking systems perform totally different functions applying totally different principles of firing a second or third spark to ignite the small amount of remaining hydro-carbons from previous combustion events. This known dead sparking system differs and is totally opposite in principle and application to the multiple high voltage high temperature electrical discharges of this invention with these discharges designed and created to heat the "fuel"/water to the required temperature causing transitioning of the normally non-combustible liquid and vapor and that heat causing ignition/combustion of derived gases for this embodiment rather than the normal spark ignition for this embodiment/invention.

The principles of this invention are well established and clearly demonstrates the known methodologies of heat transitioning of the liquid "fuel"/water through Flash Boil and Thermolysis followed by heat ignition from the electrical discharges as the auto-ignition of the "fuel"/water is a lower temperature than Thermolysis transition thus that upon completion of the Thermolysis transition the "fuel"/water auto-ignites because of those imposed elevated temperatures. These methodologies and principles of this electrical system have never been applied in, or to a combustion engine, an electrical discharging device; and or a fuel discharging component as another function of the electrical discharging embodiment such that the fuel delivery component can act and perform as both an Anode and Cathode either delivering or receiving the electrical discharges again this new and unique to this invention. The "fuel"/water discharging component of this invention when used in the specific electrical discharging embodiment can receive the electrical discharge because the electrical circuit is independent of the vehicles electrical system as discussed herein. The electrical discharge of this invention when applied to the "fuel"/water discharging component will cause an elevation in the body of that component thus causing through conduction the elevation in the "fuel"/water contained inside the component. This embodiment can be but not limited to; in combination with all; and or combined with other individual methodologies and principles known and new and or can either be individually utilised or in combination to form this embodiment of this new invention to utilise "fuel"/water of this invention as the replacement energy source for an internal combustion engine using the high voltage high temperature multiple electrical discharging as part of the transitioning of "fuel"/water. The liquid and or vapor "fuel"/water is unlike and is newly invented for use in a combustion chamber for this invention and is non-combustible, unlike Bio/Fossil fuels and or emulsions, until treated and processed as described herein, utilising elevated temperatures up to and greater than the supercritical temperature of the "fuel"/water at pressures both pre and post ejection to reduce the vaporization temperature to 0 Degrees Celsius to both initiate and or complete the processes of Flash Boil and Thermolysis of a non-combustible fluid forming combustible gas in combination in an engine cylinder and or combustion chamber for this invention with but not limited to; temperatures up to and greater than their known auto-ignition temperatures and or temperatures greater than; and not limited to; the currently known vaporization temperatures of Bio/Fossil fuels and or water.

Unlike normal Bio/Fossil fuels and or emulsions the "fuel"/water vapor will not ignite and or combust and requires the further transition to a full gaseous state for ignition and combustion. In this embodiment this is achieved through but not limited to; the use of the multiple high temperature high voltage electrical discharges for the described elevated temperatures. Thus, that transitioning occurs and is completed from elevate temperatures provided by the imposition of the high temperature discharge forming/causing the conversion of non-combustible vapor to the combustible gaseous state, via this elevation in temperature of "fuel"/water from the initial electrical discharges thus causing an elevated temperature auto-ignition of "fuel"/water gas. Thus, heat from the electrical discharge will cause temperature based ignition of the derived gases of the "fuel"/water and not as commonly understood and normally occurs with an electrical ignition of normal Bio/Fossil fuel or emulsion vapor and as vapor of the "fuel"/water will not ignite. The elevated temperatures for transitioning and or heat ignition/combustion of the "fuel"/water can be derived in this invention from any described processes herein including but not limited to; the multiple high voltage high temperature electrical discharging and utilised in any type of combustion engine. The electrical discharging strategy invented for this invention can but not limited to; be used in combination with the multiple "fuel"/water discharging strategy so that these multiple methodologies can be implemented to form gas from the "fuel"/water in the cylinder and or combustion chamber. Such that where more than 1 discharge occurs the formation of the gas from the discharge via the imposition of the heat from the electrical discharge so that that auto-ignited the gas from the "fuel"/water such that subsequent "fuel"/water discharges can use either or both the electrical discharge and or the combustion and flame front of the previous "fuel"/water discharge elevating the temperature of the subsequent discharge to cause the heat for transitioning and auto-ignition of any one discharge of the "fuel"/water. An embodiment of the Thermolysis where no preheating of "fuel"/water in a fuel delivery system is performed, Thermolysis will occur at its normally understood temperature commencing at 1,800 Degrees Celsius in atmosphere, however in the invented processes of this invention and generally but not limited to: in a combustion chamber/cylinder and as "fuel"/water of this invention will not ignite/combust until the Thermolysis transition is completed and the "fuel"/water is converted to a combustible gas so commonly understood auto-ignition temperatures of 1000 Degrees Celsius for Hydrogen and less for Bio/Fossil fuels causes instant ignition/combustion upon completion of Thermolysis the transition can now at lower temperatures in the conditions of the combustion chamber, for either and or both and or where both fluids are utilised in the one combustion event. The electrical discharging device described is totally opposite and unlike a normal and commonly understood combustion chamber spark plug and is able to withstand and utilise extremely high voltages and temperatures produced by electrical discharges of this invention to achieve transitioning of "fuel"/water from the heat of that discharge. The electrical discharging delivered through the combustion chamber electrical device utilising principles and applications of this invention are totally new and opposite and unlike commonly understood spark ignition systems/technology that deliver commonly understood discharging spark of between 25,000 volts to 60,000 volts that electrically ignites the Bio/Fossil fuel liquid or liquid vapor already delivered to the combustion chamber. Thus, that in standard or a normal engine sparking system the normally understood spark is delivered to the Bio/Fossil fuel where that fuel is already supplied/delivered and in place in the combustion chamber so that the spark is imposed on to the Bio/Fossil fuel. This function of normal spark ignition is totally opposite and unlike the invented technology herein where upon a first electrical discharge is, and already discharging in the combustion chamber and or electrical discharging device of this invention prior to the ejection of the "fuel"/water thus that the "fuel"/water is ejected into the electrical discharge, to cause the elevation in temperature of "fuel"/water as discussed herein. In current technology there is no attempt or premise to cause an elevation in temperature for ignition and in fact it is totally opposite technology as the normal sparking plug will overheat and melt as their normal operating temperatures range from 450 to 870 Degrees Celsius and electrical discharge temperatures of this invention ranges from 450 Degrees Celsius up to; and not limited to; and exceed 3,000 Degrees Celsius resulting in an electrode temperature up to and over 2,500 Degrees Celsius providing heat for absorption by the "fuel"/water upon ejection and or radiated/conducted heat provided to the fuel delivery component to heat the "fuel"/water stored internally in the component. This invented electrical methodology is unable to be utilised in a standard/conventional type spark plug as Bio/Fossil fuel does not absorb heat like "fuel"/water nor does the normal spark plug radiate heat in the manner described to cause heating of fuel and or the "fuel"/water as does the invented combustion chamber electrical delivery component of this invention/embodiment. Thus that the absorbed heat produced by the invented electrical discharges and system would cause and compound further heat absorption by the electrodes of the normal spark plug, causing a range of component failures including combustion from pre-ignition resulting in engine damage as discussed, and spark discharge failure due to melting of the electrodes of a normal spark plug due to the heat and compounding heat of multiple electrical discharges from the invented process. Thus the new sparking device of this invention is required for the new and invented heated electrical discharging processes utilising usually and not limited to; two to four large electrodes on the circumference of the rim of the electrical discharging device that are exposed to the combustion chamber but not limited to; 3 to 20 times larger albeit rectangular and or curved to the circumference profile of the device that is imposed into the combustion chamber for this embodiment to allow heat absorption into the electrodes and or the fuel delivery device positioned in the centre of the electrical discharging device. Such that the fuel delivery device which is also in electrical communication with the electrical discharging system of this invention as part of the circuit, can act as either the active or earth thus that heat from the electrical discharge current when travelling through the storage and discharge areas of the fuel delivery device that is in electrical communication with the electrical discharge current and circuit of this invention will cause an elevation in temperature of that area of the device as described herein, such that the heat via conduction is imposed on the "fuel"/water stored inside. The fuel delivery device is not limited to being elevated in temperature from the surrounding electrodes of the electrical discharge device and or as an electrode its self via current and voltage flow. Whilst the heat from the electrodes can be radiated/conducted to the body, nozzle, pintle and or ejecting end of the fuel delivery device thus heat can also be provided by the electrical current flowing through the fuel delivery device and or external radiated heat from the electrical device's electrodes that surround the fuel delivery device when the fuel delivery device is inserted into the electrical device for installation into an engine usually but not limited to; spark ignition type engines, thus that the available heat can be utilised from either or both sources to heat the stored "fuel"/water inside the fuel delivery device of this invention, up to the temperatures as described for this device/invention. This can occur in combination and or on its own and or whilst in communication/contact with the described conditions of the engine cylinder and or combustion chamber.

This electrical system is usually but not limited to use in a gasoline/spark ignition engine where the discharge device of this invention can normally be utilised as a replacement for the original equipment to employ the newly invented discharging process of this embodiment. The electrical discharging device's rectangular anodes and or cathodes have a very broad opposing facing surfaces spreading the discharge as it crosses to the opposing faces providing a large area of electrical discharging for the "fuel"/water to be ejected into and through a multiplicity of these discharges that forms the spread or layers of the discharging current at the invented voltages and temperatures due to the size and available surface areas of the opposing faces of the electrodes and or the specific areas of the fuel delivery device. As part of the discharging strategy of this invention multiple discharges are repeated within or less than and or at micro second intervals to appear as continuous to form a blanket effect. This discharging will occur at multiple place across the faces of the electrodes and or between the electrodes and fuel delivery device to also make the fuel delivery device an electrode in this embodiment of invented methodologies and thus creating the blanket or web effect of the discharging high voltage high temperature current in a combustion chamber and or traversing between all the opposing electrodes in the combustion chamber for the ejecting "fuel"/water to travel into. The electrical discharges are usually but not limited to; traversing across the combustion chamber and or opening in front of the ejecting orifices or openings of the "fuel"/water delivery device which is in this embodiment but not limited to; installed into the rear and centre of the combustion chamber electrical discharging device exposing the ejecting nozzle end of the "fuel"/water delivery device to the combustion chamber directly, such that the invented methodologies ejects the "fuel"/water into a combustion chamber/engine cylinder after the commencement and through the electrical discharging. The position of the "fuel"/water delivery device when installed into an engine cylinder, engine head, engine inlet or exhaust system or any suitable components or area of an engine for this invention, such that the installation or fitment provides and or enables access to "fuel"/water supply and electrical connections so that exposed parts/areas of the fuel delivery device that are outside the internal areas of the engine head, block, inlet or exhaust system, can be in communication with other components and the "fuel"/water delivery devices can be located in any position in an engine including but not limited to; any position that subjects the "fuel"/water delivery device to any of the produced temperatures and conditions of a combustion engine as described herein and can connect to the supply components including but not limited to; and "fuel"/water supply connections, electrical spark discharging current and electrical control current, the later causing the internal value to open to discharge the "fuel"/water.

In this invention this further means internal exposure of the body and or pintle and or nozzle and or ejecting end of the "fuel"/water combustion chamber delivery device to combustion chamber/cylinder conditions and or but not limited to; whilst being fitted/positioned into the combustion chamber electrical discharge device thus exposes these areas to the internal cylinder and or combustion chamber, Thus a cylinder and or combustion chamber end of the fuel delivery component can be sealed in an access port and or in the electrical discharge device to allow the produced temperatures of the cylinder and or combustion chamber to surround and come into contact with the body, pintle, nozzle and or ejecting end and or any exposed areas of the fuel delivery device. Thus the temperatures found in the engine cylinder and or combustion chamber cause elevation in temperature of the "fuel"/water delivery device up to the ambient temperatures found in the cylinder and or combustion chamber from any engine cycle. This process can but not limited to; function in parallel with the electrical discharge current to heat the same areas of the body, Pintle, Nozzle and or discharging end of a fuel delivery device. When the fuel delivery device is positioned in conjunction the electrical discharging device the "fuel"/water will eject but not limited to; at any angle and; but not limited to; 90 Degrees to the electrical discharge layers/web and thus, but not limited to; discharging the "fuel"/water into existing combustion chamber electrical discharges. These electrical discharges whilst between opposing electrodes of the electrical discharging device and or between the electrodes of the electrical device and the fuel delivery device, making the fuel delivery device part of the electrical circuit either acting as an anode or cathode, active or negative whilst positioned internal of the electrical discharging device as described herein can cause the electrical discharges due to their extreme voltages and current to travel into a combustion chamber and or cylinder whilst traversing between the active and earth of this independent electrical system. The penetration distance into a combustion chamber is unlimited and only limited by clearances required for the engine piston and combustion chamber. Where such clearances are not provided in the manufacturing of a piston and or engine, the electrical discharge will fill the engine cylinder and or combustion chamber whilst traversing between any of the electrodes due to the current voltage and discharge strategy as described herein. Two or more electrodes either of the same polarity and or opposing polarity being an anodes and or cathodes (active and earth) can extend into the combustion chamber where electrical discharging can be but not limited to; discharging between any electrodes of the combustion chamber electrical device and or that device and the fuel delivery device and is within its own circuit and not impacting on the original vehicle electrical system. The electrical system of this invention is able to provide such a discharging methodology as a standalone independent electrical system that creates its own circuitry within itself and does not interact with the engine or vehicle manufactured electrical system or circuitry, providing an active and earth independent of a normal and currently understood engines electrical wiring and circuitry including independent of the normal sparking system, Meaning the electrical discharging in the electrical discharging device using the invented circuitry can discharge between its own electrodes and or between those electrodes and the fuel delivery device of this invention, either can act as the active or earth (anode/cathode) and does not require the normal earth processes of an engine where that earth normally is part of the engine and combustion chamber to induce that voltage and current flow to the earth electrodes like a normal spark plug which is in earth contact of the engine. The duties of the invented electrical discharging device and electrodes can be either earth or active, are completely different to commonly understood normal spark plug because they are interchangeable in their functionality as long as one electrode is electrically insulated from the other electrode.

The independent electrical system utilised herein means that although one electrode will be in normal conductivity with the engine, the electrical voltage/current/discharge of this invention will travel to and through that electrode to earth or be an active, but will not become part of the engines normal circuitry and will only flow through or discharge to the earth and or within the new circuit and thus will only flow between the electrodes of the invented methodology to complete the circuit. This specific electrical circuitry and combustion chamber discharge strategy as described, allows greater voltage and current in its discharges providing the discharge and or combustion chamber electrical discharging device with the temperatures as required by this invention. A further invented protocol is use of the fuel delivery component of this invention to act as the active and or earth, thus the electrical discharges invented and supplied to a combustion cylinder/chamber and or electrical discharging device and or including the fuel delivery component as described herein will form its own complete circuit. The fuel delivery device can receive the electrical discharge voltage/current prior to and or after entry to the combustion chamber because that discharge forms a separate circuit to the normally engine circuitry. This design/methodology can form but not limited to; an electrical discharge at the end and or nozzle and or body of a fuel delivery device where that discharge will be either earth or active being received or discharged by the combustion chamber electrical component electrodes depending on the direction of flow of current and can be vice versa. The discharge can flow from either component to the other component or vice versa and or alternating between any electrodes in any discharge cycle thus discharging in an oscillating effect between combustion chamber electrical devices and fuel delivery devices and or between the electrical discharging device where both active and earth electrodes are present and are opposing insulated electrodes. The use of the fuel delivery component in this embodiment does provide heating for the "fuel"/water via conduction of the heat from the electrically heated fuel delivery device. With the electrical discharging occurring prior to the ejection of the "fuel"/water that upon ejection the "fuel"/water absorbs the heat from the fuel delivery component and or emitted/radiated heat from the electrical component and or combustion chamber, thus discharging and causing the transitioning and heat ignition/combustion of the "fuel"/water.

Electrical discharging of this invention with its elevated discharging temperatures can only be utilised with the "fuel"/water of this invention as the "fuel"/water naturally absorbs a greater amount of heat, causing lower vaporization, Flash Boil, Thermolysis, and auto-ignition temperatures are achieved subsequent to transition temperatures which are of a higher temperature thus that pre-ignition or uncontrolled ignition combustion is prevented as the "fuel"/water is non-combustible until transitioned, as compared to Bio/Fossil fuel or emulsion methodology thus elevating the "fuel"/water temperature will initiate and or complete the transitioning processes and auto-ignition from that heat. Normal and commonly understood Bio/Fossil fuels cannot be elevated in temperature the same as "fuel"/water of this invention or transition the same as the "fuel"/water of this invention, if elevated in temperature it will auto-ignite and experience severe reduction in its fuel density/ratio thus igniting earlier in the engine cycle causing lean burn combustion and an increase in emissions, loss of power from the resulting engine miss fire, pinging, engine knock pre-ignition ultimately causing engine overheating and engine failure and or permanent damage.

Gas formation from this invention through thermolysis of the homogenized blend of "fuel"/water prior to; and or in a combustion chamber now separates in a combustion chamber to form a Bio/Fossil fuel gas and supercritical water as part of this invention. This occurs due to the formation and ignition of the Bio/Fossil fuel gas first, as it has lower gas formation and auto-ignition temperatures in the ranges of 500° C. to 700° C. depending on its own blend as compared to water with Thermolysis temperature range but not limited to; now forming Hydrogen and Oxygen in the combustion chamber conditions from 1,500° C. and auto-ignition temperatures of 1000° C. Thus that the ignition of Bio/Fossil fuel where retained in the "fuel"/water and or separately utilised/injected into and or introduced to a combustion chamber will produce combusting flame fronts during its combustion at temperatures of approximately 1,800° C. to 3,500° C. which can and does, but not limited to; initiate and or complete when utilised in this invention and or any embodiment the Flash Boil and or Thermolysis transitioning processes of the "fuel"/water of this invention in a combustion chamber, and can be used, for any embodiments and; but not limited to; any embodiment that do not supply other elevated temperatures. Thermolysis; the transition/conversion of water to gases of Oxygen and Hydrogen utilising heat commencing at temperatures as commonly understood at 1 atmosphere at 1,800° C. a known process never utilised or able to be utilised in any application in terms of the functionality of known fuels including and not limited to; and prior to this invention for a fuel of an internal combustion engine. This is due to the fact that the process of Thermolysis will not function with Bio/Fossil fuels or emulsions due to the nature and combustibility of the "liquid" fuel pre-gas (vapor) formation which is totally opposite to the "fuel"/water of this invention, thus never able to be utilised in an internal combustion engine, nor any processes discussed herein and or their various combinations previously or ever been utilised or recognized with the functionality of a fuel and or a function performed by fuel in an engine cylinder and or chamber of an internal combustion engine. However, the newly invented parameters for Thermolysis for this invention described and utilised herein are able to be utilised because of the use of the new "fuel"/water of this invention. Thus allowing "fuel"/water to release its energy in a combustion chamber and or cylinder to power an internal combustion engine. The newly invented/developed parameters for Thermolysis in a combustion engine for the "fuel"/water can; but not limited to; now cause Thermolysis at lower temperatures, using pre-ejection low pressure and any pre-heating of the "fuel"/water above the normal operating temperatures of an engine as normally and commonly experienced or understood within the fuel delivery system. Thus upon ejection of the "fuel"/water into a combustion chamber or cylinder can now commence Thermolysis from approximately 1,700 Degrees Celsius subsequent to Flash Boil transitioning. However, as discovered these individual and combined invented processes when "fuel"/water temperature is elevated pre-ejection; and or up to, and or near its supercritical point, or higher; and under the pressure provided by this fuel delivery system in various stages up to and including the pre-ejection pressure in the combustion chamber delivery devices of this invention, that upon ejection of the "fuel"/water liquid into the engine cylinder and or combustion chamber at the relative pressure drop in the cylinder and or combustion chamber and as the "fuel"/water enters either of these areas at their invented respective elevated ambient temperatures in specific embodiments, the non-combustible liquid "fuel"/water subsequent to the first transition of Flash Boil into non-combustible vapor which now has a 0° C. vaporization temperature due to its pre-ejection elevated temperatures, will immediately initiate, cause, assist in commencement and or completion of thermolysis transition of the "fuel"/water vapor at its reduced temperatures of approximately 1,400° C. in a combustion chamber. This new Supercritical Thermolysis range in a combustion chamber and or in combination with the combustion chamber and or engine cylinder and conditions of elevated temperatures and pressure reduction provided by the methodologies as stated herein and that ejection pressure differential of the heated "fuel"/water from the delivery system which has an even higher end pressure in the combustion chamber delivery components due to those components invented exposure and absorption of engine cylinder and combustion chamber temperatures for further elevation of "fuel"/water temperatures above the temperatures of the delivery system. This results in a further increase in physical thermal expansion pressure for this invention from that final heating of the "fuel"/water in the delivery component. Thus any pressure created in the supply/delivery system for the "fuel"/water will be further increased above the stated pumping pressures whether standard or a high pressure pumping device of this invention as the combustion chamber delivery device will further increase the pressure due to its own heating and subsequent thermal expansion of the "fuel"/water in the combustion chamber delivery device prior to ejection. This increases the expansion pressure due to that further heating of the "fuel"/water in the combustion chamber fuel delivery device where a one way valve system fitted into the device or upstream between the delivery device and the heated fuel distribution component (fuel rail) of this invention in fluid communication in the supply/delivery system for a combustion chamber fuel delivery device, such that the "fuel"/water is supplied in methodologies described herein, but not limited to; at its elevated temperatures where upon a specific volume supplied to the delivery device and an inlet and relief/outlet valve are simultaneously closed and or the inlet valve whether internal or external to the combustion chamber delivery device is closed with The combustion chamber Pintle needle valve of that device closed causing a seal and isolated containment the "fuel"/water in the delivery device thus separating that sealed in volume to further supply and or any discharging of the "fuel"/water until the delivery device is activated to release the fluid into the chamber and or cylinder. "Fuel"/water can be supplied at non-elevated temperatures as part of this invention where sufficient heating is available in the combustion chamber delivery devices as described herein and or the subsequent cylinder and or combustion chamber temperatures can be elevated in methodologies of this invention which provides temperatures above the known or normal/commonly understood temperatures to cause the transitioning process described herein. Non-temperature elevated "fuel"/water can, but not limited to; form homogenized blend in the combustion chamber delivery device and or the cylinder and or combustion chamber upon ejection caused by the invented and utilised elevated temperatures in these components and the included invented mixing methodologies for the fuel delivery device and combustion chamber also described herein. In the fuel delivery device, the contained volume of "fuel"/water is further heated in the combustion chamber delivery device up to the available combustion chamber/cylinder temperatures causing thermal expansion and resulting increasing pressure within the delivery device. The percentage pressure increase will vary depending on flow thus affecting heating rates within the device of the "fuel"/water. In one embodiment, temperatures of the gases contained in the cylinder and or combustion chamber and on compression are of greater temperature above supercritical up to and above the auto-ignition temperature of hydrogen of 1000° C. for the "fuel"/water and as known so can the exhaust gases in its stroke depending on engine load and engine speed. The combustion chamber "fuel"/water delivery device is positioned in such a manner so as to allow these supercritical plus gases to circulate around the delivery device to cause the walls of the device to be heated up to and or above supercritical plus temperatures to conduct said heat into the "fuel"/water contained in the delivery device. The conduction of this heat is further supported via a unique design change to the delivery device so greater quantities of "fuel"/water are stored for ejection. The increased storage area is a simple enlargement of the internal storage area for the "fuel"/water as invented, to the inside of the outer walls and or the internal shaft called the Pintle needle valve of the fuel delivery device which now has steps in a circular groove machined in, called rifling thus that the grooves of the machined in, are of sufficient width and depth as they circumvent the needle and or inside outer walls of the delivery device so as to increase the volume of "fuel"/water retained for ejection and the total surface area for which the "fuel"/water comes into contact with. The step machining and or rifling not only increases the stored volume but causes the "fuel"/water to travel in a circulating motion around the inside of the delivery device causes greater contact with either or both the inside of the outer wall and or needle surface area. The increased contact for the "fuel"/water with either or both these surfaces conduct greater heat from them into the "fuel"/water: this increases "fuel"/water temperature via conduction and forms a compounding effect of both conduction and pressure heating (as stated herein) inside the delivery device. This causes increased pressure and greater pressure differential/drop during ejection from the combustion chamber delivery device into a cylinder and or chamber. Therefore, the combustion chamber fuel delivery device is now also heat exchanger, not only delivering the new fuel of this invention but either assists and or causes a change of state of the "fuel"/water into a homogenized blend where Bio/Fossil fuel is retained in the "fuel"/water in the delivery system/device. These transitioning processes are only able to be completed because the "fuel"/water is non-combustible as a liquid and or as an emitted or formed vapor, unlike Bio/Fossil fuels which will and does emit combustible vapor without specific gas formation methodologies as commonly utilised in an engine. The Bio/Fossil fuel in their pre-gaseous liquid state will naturally emit and combust the emitted vapor in an engine causing pre-ignition when the principles and methodologies of this invention are applied. However, the new "fuel"/water will only auto-ignite/combust upon completion of the Thermolysis (gas formation of the "fuel"/water) as the final release of its energy. To summarize, "fuel"/water is elevated in temperature in the tank and or from induction at the low pressure device/pump and or any fuel pumping/transferring device of any embodiment and or a high pressure pump of the invention up to its pre-ejection temperature of between 150° C. to 450° C. (Supercritical) under pressure described herein up to pre-ejection pressures 3,725 psi and or greater, up to, but not limited to; 36,000 psi of the current embodiment maintaining a liquid state in the fuel delivery system/components of this invention, and giving the "fuel"/water a reduced ejecting vaporization temperature of 0° C. Meaning that the "fuel"/water will transition to vapor at its elevated ejection temperatures with the imposition of the prevailing conditions of pressure drop and or any elevated ambient temperatures of a standard cylinder and or combustion chamber such that the temperatures found in a standard cylinder and or combustion chamber will and not limited to cause both types of transitioning where the "fuel"/water is heated to and not limited to the pre-ejection temperatures of this invention. Where the "fuel"/water is not elevated pre-ejection the modified engine of this invention with elevated cylinder and or combustion chamber temperatures up to and or greater than "fuel"/water supercritical temperatures now found in or caused to occur in the combustion chamber and or cylinder causes the Transitioning. Thus that standard combustion chamber/cylinders can perform both stages of transitioning (Flash Boil/Thermolysis) when operating/functioning with at least one other form of temperature elevation such as but not limited to; elevated temperatures in an intake gas charge or "fuel"/water as described herein. Also with modified/invented combustion chamber and engine designs will cause elevated temperatures with a greater pressure differential from injection timing to further enhance the applied and invented transition processes for "fuel"/water in a combustion engine. The "fuel"/water can eject into but not limited to a standard combustion chamber/cylinder that has normally understood pressure range between 200 to 750 psi at corresponding compression temperature scale of approximately 1° C. per 1 psi pressure depending on engine type and piston position in the cylinder and controlled injection timing for this invention on intake/compression stroke with an average starting external air temperature of 24° C. The intake temperature of the intake air/gas charge is also a controlling factor, such that an elevated temperature for that charge will provide an elevated temperature for the pre-compressed volume in the cylinder thus that the invented or standard compressed temperature will be greater than normally experienced. This is also relative to the total volume of exhaust gas recycled and or a pre-heated intake charge and or combined with the total intake charge as a combined blend of gases to elevate the total intake charge temperature. Such that the injection cycle can occur in an exhausting event/stroke which contains heated gases from previous combustion event of any engine cylinder/combustion chamber and can be supplied to the same and or another cylinder and or any combustion chamber of the engine and which then form the required temperatures in a standard combustion chamber and/or an invented/modified combustion chamber for transitioning. These principles and methodologies are totally opposite to known exhaust gas recirculation as the exhaust gas from "fuel"/water is not inert as it contains reconstituted "fuel"/water and through this unused or reconstituted "fuel"/water of a previous combustion event and retained as re-constituted supercritical "fuel"/water of this invention thus the unused and or reconstituted "fuel"/water from and contained in the cooling exhaust gas in the engine cylinder can be, but not limited to; re-heated and or up to or more than its supercritical and or Thermolysis temperatures for transition and auto-ignition/combustion of the gases of Hydrogen and Oxygen, upon compression which cause the elevated temperatures in a combustion chamber of the engine. These elevated temperatures as created by the compression are and can be greater than the standard and or normally understood achieved temperatures because of the invented and utilised methodologies of increasing the compression ratio and or elevating the intake gas charge for compression by utilising a greater amount of the now combustible exhaust gas and or elevated temperatures of the air intake charge to increase the starting temperature in the cylinder prior to compression such that upon compression of the initial intake charge at elevated intake temperatures above standard cause greater compression temperatures to cause the "fuel"/water transitioning and temperature auto-ignition/combustion. The newly invented and utilised temperatures for each heating methodology in the different embodiments defined herein and or engine redesign elevating temperatures as described for this invention and its processes such that the invented engine design and embodiment and or modifications to increase the compression ratios well beyond known engine technology and usability for Bio/Fossil fuel. These new and unused compression ratios and elevated static compression temperatures of this invention and newly invented and increased to; and not limited to; from 27 to 1 and higher are only able to be used due to the use of the "fuel"/water in the invented methodologies herein. The ability and a process of this invention to control ignition/combustion timing through the "fuel"/water discharge/ejection timing and quantities because of the use of "fuel"/water and its non-combustibility pre-gas formation preventing pre-ignition and resulting engine failure. The control of ejection timing and multiplicity of the discharging quantities also further enhances and utilizes the incorporated methodologies as an invented process not previously used in a combustion engine of the flash boil and thermolysis by extending the transitioning time reflected in the crank shaft rotational timing while heating occurs in components including the cylinder and combustion chamber for the "fuel"/water for and optimum pressure differential for flash boil. Current technology is limited to a maximum of 25 to 1 compression ratio in limited engine type of low and single speed stationary engines.

Standard and or gasoline engines with known ratios ranging round 8 to 1 and 9 to 1 due to the use and limitations of normal or standard Bio/Fossil fuels and their octane ratings called RON. High octane fuels normally utilised in performance engines are also compression ratio limited to 13 to 1 up to 16 to 1, The compression ratio is determined by comparing the volume in the cylinder with a piston at bottom dead centre verses the volume of the combustion chamber when the piston is at top dead centre. This means the rising piston in a cylinder will compress the full volume of what has been introduced to the cylinder into the smaller combustion chamber thus pressurising causing pressure heating of the gases from the cylinder. Thus, developed and invented for this embodiment is increased compression ratios for a combustion engine meaning that either the cylinder volume is increased to provide a greater volume of intake gases to be compressed into the combustion chamber and or the combustion chamber is reduced in its capacity. Both mean an increase in compression ratios being the difference between the cylinder and the combustion chamber volumes and the resulting increase in compression pressure and resulting elevated temperatures generated in the intake (compression) gases thus achieving temperatures required for this invention and the transitioning/ignition/combustion of the "fuel"/water. Thus, that the increased/invented compression ratios can only be utilised with the "fuel"/water of this invention due to the newly imposed compression causing a greater elevation in combustion chamber temperatures exceeding the functionality or operational parameters of Bio/Fossil fuel. But will cause the transitioning of the non-combustible liquid and vapor "fuel"/water through its absorption of the produced/invented heat from the invented methodologies herein to release the 2 stages of pre-combustion energy through expansion, culminating in the combustion of the formed gases of Hydrogen and Oxygen of which provide a further and or more than double the energy of Bio/Fossil fuels with 2.4 times the octane/energy rating of Bio/Fossil fuel. The newly invented compression ratios for an internal combustion engine cause a greater elevation in the cylinder and combustion chamber pressure and temperature as part of the whole utilization of the new fuel, ("fuel"/water) and whilst "high" compression engines are not new, the extreme high compression utilised herein is and will only function with "fuel"/water of this invention and cannot be applied to Bio/Fossil fuels due to Bio/Fossil's early stage comparative low temperature combustibility as a fuel in a liquid and vapor form. Meaning if the normal or high octane Bio/Fossil fuels are used under the invented methodologies for "fuel"/water then the Bio/Fossil fuel pre-ignites and combusts prior to and with the piston lower in the cylinder whilst it's ascending the cylinder to its normal optimum ignition position. Thus, will now cause engine knock and piston/engine failure.

The increased produced heat in a combustion chamber due to elevated compression temperatures and or starting intake temperatures are well above those normal/commonly understood or experienced in combustion chamber compression temperatures and are to achieve the invented and utilised temperatures for the invention to transition the "fuel"/water igniting the resulting gases Hydrogen and Oxygen. This methodology can be used in combination with any or all of the other methodologies of heating various components to effect the new principles of this invention. Increased compression ratios/modifications can be incorporated with the use of increased intake charge temperatures above normal and commonly understood intake gas temperatures. The methodologies of these embodiments can be used but not limited to elevating "fuel"/water temperatures as invented and described herein. The normal/standard intake air supplied to an engine is normally at lower standard temperatures of approximately 20° C. to 100° C. in the cylinder and combustion chamber and can be but not limited to; utilised for this invention when one or more other heating methodologies are imposed on the "fuel"/water and or intake air/gas charges to elevate temperatures. Further elevated temperatures for this embodiment can be, but not limited to; elevated intake air temperatures to compliment or function with any one and or all of the invented principles and methodologies herein. By heating intake air and or combined with the use of hot exhaust gas volumes in the intake charges and or supplied separately to the cylinder and or combustion chamber and or increased exhaust gas retention in the cylinder/chamber to, but not limited to; combining for greater total intake and or compression temperatures, utilises this new and invented principle and methodology as it is different and unique in that the elevated temperature of the intake charge for and in the cylinder pre-compression is not only totally opposite current and know principles and methodologies of engine air intake, thus a purpose of the invented principles and methodologies is to elevate the starting temperature in a cylinder prior to compression and or to effect a higher total and or end temperature upon a piston reaching top dead centre and or optimum ignition compression position at any position for the piston in the cylinder/chamber on any engine cycle/stroke for ejection of "fuel"/water. Thus forming/creating temperatures well above the known and utilised engine compression temperatures and principles normally ranging from 150° C. to 800° C., upon compression only these comparative lower temperatures are for Bio/Fossil fuel only. The new and increased temperatures for this invention range from 1100° C. to 3500° C. at various compression piston position and cannot be used in any way shape or form for Bio/Fossil fuels and can only be applied to the invented "fuel"/water of this invention due to its non-combustibility as a liquid and or vapor. These elevated intake temperatures for the intake charge allow a range of injection timing not normally able to be used due to Bio/Fossil fuels pre-ignition issues and resulting engine damage and ultimate failure. The elevated intake charge pre-compression temperatures that are not limited to being, at, and or greater than the standard compression temperatures as defined herein and commonly understood thus can only be utilised with the "fuel"/water of this invention as there is no "fuel"/water pre-ignition but rather transition of the "fuel"/water in an earlier or pre-compression piston position it does not pre-ignite like the same as Bio/Fossil fuel. These new elevated temperatures are not outside the normal or understood temperatures that occur in a combustion engine thus will not; and do not cause adverse or altered engine operating parameters that may cause engine failure, meaning the new compression temperatures match the flame front temperatures normally produced in the ignition combustion cycle. This invented technology provides these temperatures at different times or cycles in the engine crank rotation and thus piston position in the cylinder on any stroke for "fuel"/water injection into. The utilization of the temperatures/methodologies in the new cycles and or piston positions can only be achieved with the invented "fuel"/water of this invention. Under the new and invented elevated intake temperatures, ejection of the "fuel"/water at, but not limited to; its elevated temperatures described and invented can but not limited to; be at any point in any cycle and piston cylinder position as the starting temperatures in the intake and or non-compression cycle and or exhausting cycle of the engine are at the newly invented pre-compression temperatures in line with the invented principles of injecting into the modified and or high temperature gas charges in an engine cylinder/chamber. These temperatures exceed the known current principles technology and although reduced air density ratio can be produced from the intake gases being hotter and "thinner", this is offset by the derived pure Oxygen from the invented and transitioning of "fuel"/water and the increased energy formed in the combustion chamber from the 2 (two) expansive transitions as of the "fuel"/water providing increased combustion chamber pressure pre-ignition, greater than the density reduction plus the 2.4 times the explosive energy of Hydrogen verses Bio/fossil fuel the opposite occurs in a standard engine with no intake heating such that an intake charge/air commonly understood in principle and methodology is to obtain the coldest possible air/gas intake charge including with use of exhaust gas as part of that intake charge. EGR (exhaust gas recirculation) which is currently used in known applications as technology for reduction of Nitrous Oxides (NOX) through intake charge dilution as an inert gas. Meaning a reduction in oxygen for oxidation. This is normally achieved by supplying the exhaust gas from Bio/Fossil fuels which is non-combustible as a percentage of the total volume of intake gas from the Bio/Fossil fuel combustion diluting the air intake. However in this invention EGR or any form of exhaust gas supply introduction and or retention of exhaust gas in the engine cylinder and or combustion chamber actually enhances the whole process due to the increased starting temperatures of an intake charge for the "fuel"/water thus but not limited to; facilitating and or commencing the transitioning/ignition/combustion processes and increases volatility and overall combustion expansion effect as exhaust gas from "fuel"/water combustion actually includes un-combusted and or reconstituted "fuel"/water liquid, vapor and or gas. These exhaust gases can also contain "fuel"/water liquid, vapor, or gas as a result direct injection of the "fuel"/water into the hot exhaust gases and or heated intake charges on any engine stroke or piston position in the cylinder and but not limited to forming as combustible gas completing the invented transitioning processes described for this invention. The exhaust gases from "fuel"/water contain reconstituted heated and or supercritical "fuel"/water and or water alone in either liquid/vapor or gas states thus forms un-combusted "fuel"/water thus that the exhaust gas becomes a fuel itself as invented herein. The retained, reconstituted liquid and or vapor "fuel"/water is non-combustible the same as the pre-gas transitioned ejected "fuel"/water thus allowing the "fuel"/water to remain in and or be injected/supplied into the hot exhaust gases and those gases are below the Thermolysis and auto-ignition temperatures thus will not pre-ignite even though supercritical temperatures are achieved and or maintained, but requires the final compression temperatures upon the piston reaching optimum and or desired compression position in the cylinder and or combustion chamber for the final elevation of temperature of the contained gases of the cylinder. This invented exhaust gas fueling process can further support a new embodiment of the invention by continual re-use of exhaust gas as the fuel and only injecting further "fuel"/water to offset or increase combustion energy and or heat losses as used as work energy used in the cylinder/combustion chamber. The heat work energy losses naturally occur in a combustion engine and vary according to engine demand as placed upon the engine, requiring it to supply more power (heat/work energy) for higher demand thus with a greater use of heat/energy for the work load a greater amount of fuel is required from the invented "fuel"/water. This new embodiment allows a volume of injected "fuel"/water to be supplied to the combustion process only as support for "fuel"/water consumed in the heat/energy/work from the previous combustion/use to maintain the required amount of "fuel"/water as consumed from the "fuel"/water contained in the exhaust gas to meet the engine speed and load demands. Such that the extra "fuel"/water as injected also can be but not limited to; an additive prior to the engine reaching a minimum operational temperature supporting heating methodologies as described for this invention, that upon the temperatures being elevated the injected "fuel"/water can be but not limited to; a secondary or non-primary source of "fuel"/water thus a primary source of "fuel"/water can be in this embodiment the "fuel"/water found in the exhaust gases and a normal injection cycle as commonly understood can be secondary. The "fuel"/water found in the exhaust gases can be and not limited to; re-constituted/reformed and or retained "fuel"/water from a previous combustion event and or resulting from ejection of the "fuel"/water into the exhaust gases at any point in the engine cycle. This allows the use of exhaust gases and its temperatures to provide a fuel to the combustion process such that any combination of any or all of the principles of this invention will allow by closing all inlet and exhausting valves to completely seal the cylinder and or combustion chamber will cause the piston to compress in any and every stroke or engine cycle the exhaust gases containing the "fuel"/water to elevate those gases in temperature to heat the "fuel"/water for transitioning and to auto-ignite. Thus the whole process will function as a single piston cycle of compression, transition, ignition/combustion, power/energy, production and retention of the heated exhaust gases containing "fuel"/water and or water alone and oxygen thus upon re-compression usually but not limited to; without the introduction of more intake gases/charges or external exhausting of previous combustion gases and the ejection/injection/introduction of minimal amounts of "fuel"/water to meet the demands/requirements that result from the normal engine heat losses which is the energy/work utilised to provide the power of the engine. By utilising "fuel"/water in an original combustion event the reconstituted "fuel"/water in the exhausting gases is made of heated oxygen and water thus the oxygen for oxidation is provided in the exhaust gases from the transitioning of any "fuel"/water and or water alone either found in, and or injected into the exhaust gases thus eliminating the need for external intake charges provide said Oxygen for oxidation in a combustion process and only when utilising "fuel"/water as part of the whole new and inventive processes. The amount or volume of Oxygen can be less than normally experienced for a normal intake charge and will not affect the combustion process as the derived Hydrogen from the "fuel"/water will ignite and combust at far greater fuel to air ratios than Bio/Fossil fuels. Such that whilst a 2-part Hydrogen to 1 part Oxygen will be produced providing an approximate air fuel ratio of 2 to 1 and recognized as a known combustible blend albeit known as a rich mixture, being when a greater amount of combustible fuel is present as compared to the oxidizing agent. However, with this the invented process the retained or reconstituted oxygen in the exhaust gases provides further oxygen for the oxidation/ignition/combustion of the Hydrogen whether that Hydrogen is injected in "fuel"/water or found in the intake and or exhaust gases. This can convert a 4-stroke and or 2-stroke engine and its processes into a single cycle/stroke engine and function, such that a combustion event occurs every time the piston rises to top dead centre and or to an optimum and or selected ignition combustion position for the piston. In this embodiment this is able to be achieved as the valves are maintained closed after engine warm up to the required temperature such that a compression occurs on each and every stroke like a 2 stroke but usually and not limited to; with no exhausting and or external intake process. Such that the exhaust which only contains water and Oxygen as the combined fuel source of this invention is re-used repeatedly over and over again indefinitely because the chemical reactions are repeated as the water is converted to Hydrogen and Oxygen, combusted then reconstitute into water and Oxygen in the cooling exhaust gases. The auto-ignition occurs each and every time because of the retained and or introduced exhaust gases as a fuel at their elevated temperatures and containing "fuel"/water of this invention. This almost perpetual motion is supported with injection of more "fuel"/water, as required for engine speed and load demands. The loses of the combustion chamber/engine are through heat loss/use, work energy and dissipation through components that normally occurs. This new functionality of this embodiment is only able to be achieved and function due to use of the new fuel ("fuel"/water). A useable wider combustible air fuel ratio range can be utilised from a lean mixture of 90 parts oxygen and 10 parts Hydrogen to 25 parts Oxygen and 75 Parts Hydrogen, and a 2 parts Hydrogen and 1 part Oxygen naturally occurs from the formed gases from the water. Meaning that under the invented conditions provided in a combustion chamber Hydrogen will combust within its own oxygen as released when the water heat transitions into a gaseous state of 1 part Oxygen 2 parts Hydrogen. This feature is new and inventive as the exhaust gas now also contains from the re-constituted "fuel"/water larger quantities of Oxygen normally not found in or available from Bio/Fossil fuel combustion and its exhaust gases. The exhaust gas from "fuel"/water is totally opposite to normal, conventional and commonly known or understood exhaust gases from Bio/Fossil fuels composition as it is non-combustible and will not reconstitute into its original state of liquid and or vapor Bio/Fossil fuel or any type of combustible composition like the invented/utilised "fuel"/water. Thus Bio/Fossil fuel exhaust gases offers no combustion chamber energy for work in subsequent ignition/combustion cycles due to the inert nature of the gases that form Bio/Fossil exhaust gas such as Hydrocarbons, Carbon Monoxide, Carbon Dioxide, Nitrous Oxides and Particulates. Singularly or in combination these gases are NOT COMBUSTIBLE. This differs to and is totally opposite to the exhausting gases from the "fuel"/water combustion and the water's subsequent re-constitution in cooling exhaust process after combustion thus the reconstituted "fuel"/water contained in the exhaust gases can be a fuel source. The exhaust gases of this invention are reused due to reconstitution of the "fuel"/water forming in the cooling exhaust gas either within the engine or as expelled exhaust gas being re-introduced into the engine. Reconstitution, a known principle but never put into use or effect in a combustion engine provides a new principle, technology and inventive process for the use of "fuel"/water. Thus that at temperature the "fuel"/water of this invention ultimately ignites/combusts and a portion of that which does not combust will remain as a gas and or reconstitute as "fuel"/water and or water alone in a supercritically heated liquid and or vapor. Reconstitution, is a known by-product that naturally occurs in the cooling exhaust gas, subsequent to combustion in an engine process, an effect of use of "fuel"/water of this invention. Therefore, as invented, exhaust gas reuse actually can be and or perform as a new fuel supply and or alternate supply and or combine with a new and separate volume of water alone and or "fuel"/water in a combustion process. The reconstituted, retained and or injected "fuel"/water in the exhaust gases can be heated due to the function of pre-heated "fuel"/water ejection into but not limited to; a cylinder and or combustion chamber containing a hot exhaust charge and or heated compression charge; and or any heat from previous combustion processes and or from any invented engine process to elevated cylinder and or combustion chamber temperatures, and or incorporation in the hot exhaust and or intake and or compression gases and or from heated new ejecting volumes of "fuel"/water from the combustion chamber delivery component, that has been exposed to all the invented temperature elevating methodologies thus performing in invented principles, systems and processes described herein, for elevated combustion chamber/cylinder for "fuel"/water temperatures causing transition/ignition/combustion. In this embodiment the pre-heated intake air and or exhaust gases and or a combination of; and or mixed in a heated intake air/gas charge can be introduced and or retained in the cylinder and or combustion chamber such that an intake air charge and an exhaust charge are interchangeable. Meaning either can be the other for this invention/embodiment, used with "fuel"/water in combustion engine in the cylinder/combustion chamber and can be a primary and or secondary fueling methodology in an intake/exhaust or any pre-compression charge and or elevate in the starting and or total compressing charge as they are now interchangeable charges to achieve elevated temperatures of this invention greater than the commonly known and understood principle of engine cool air/gas intake. The currently known principle of a coolest possible intake charge includes the incorporation of normal exhaust gas cooled pre-intake to support the known current operating principles. The heated intake system and principles of this invention and whilst contrary to known or practiced applications for a combustion engine thus reducing air density actually does not cause the known adverse effects but rather through the creation of pure Oxygen and hydrogen gases from the Thermolysis transition of the "fuel"/water actually maintains and increase the air density ratio and pressure in the cylinder and or combustion chamber over and above the standard known pressure in the cylinder/chamber from a normal intake charge. Thus maintaining and or improving the efficiency of combustion of "fuel"/water processes/methodologies in this invention and are not able to be utilised with Bio/Fossil fuels as Bio/Fossil fuels do not have the same expansion and do not provide the pure Oxygen. Therefore "fuel"/water use is not common knowledge nor currently understood and or used in any manner as it is totally opposite to known and applied principles. The newly elevated temperatures of intake charges in the cylinder and or combustion chamber such that ejecting "fuel"/water can now enter the cylinder/chamber into the elevated temperatures the same as; and or above the pre-heated but not limited to supercritical temperatures in the fuel delivery component in the combustion chamber. Such that these cylinder and or combustion chamber temperatures at a lower piston compression positions in the cylinder/chamber can utilise the invented principles and methodologies to exceed the known and commonly understood pre-compression and or compression temperatures in the cylinder/chamber; of, up to supercritical temperatures and can be over 500 Degrees Celsius ambient for the "fuel"/water ejection at various piston positions within the cylinder/chamber. The overall temperatures both pre-compression and at optimum compression are greater than normally understood or utilised temperatures in a standard combustion engine and are invented and specific for this invention and use with "fuel"/water of this invention. Thus ejection can occur in this invention at lower compression/piston height/cycle/stroke in the cylinder/chamber and would normally provide lower combustion chamber temperature, and is also at far reduce chamber pressure further increase the pressure differential between the delivery system the combustion chamber/cylinder further supporting, initiating and or completing Flash Boil and reducing the temperature point of Thermolysis as the temperatures can be up to or more than supercritical. However due to utilised and invented methodologies the intake charge whether as hot gas retained from a previous combustion event supplied in total or partial in volume or having an external pre-heated intake air charge mix, with or without exhaust gas included to further elevate the overall intake charge and or any subsequent compression temperatures up to or above the "fuel"/water supercritical temperature and or to the invented/developed Thermolysis temperature as now utilised in this invention thus the timing and or the piston power/compression position in the cylinder/combustion chamber will upon its ascendancy and compression in the cylinder/chamber further elevates the total combustion chamber temperature heating fuel delivery components and stored "fuel"/water and heating the ejected "fuel"/water to initiate and or complete both transitions and Thermolysis ultimately causing auto-ignition. Thus increased temperatures of the intake charge at lower/reduced compressions whether a lower compression engine type or ejection of the "fuel"/water earlier timed in the compression stroke and or ejection of the "fuel"/water in an exhaust event/stroke allows for far greater pressure differential/drop between the pressure of the fuel delivery system of this invention and known pressures of a combustion chamber/cylinder. The invented and utilised elevated intake charge temperatures can be utilised for low compression engines or lower compression/cylinder/chamber piston position utilising the greater injection pressure differential with the newly heated intake charge can only be utilised in this invention because of "fuel"/water and the invented conversion methodology and does not work for Bio/Fossil fuels as it causes pre-ignition and combustion of that fuel with the resulting effects as discussed herein. The conditions described above cause immediate conversion/transition of Flash Boil, that transition/conversion continues through Thermolysis forming the gases of Hydrogen and pure Oxygen and Bio/Fossil fuel vapor where Bio/Fossil fuel is retained in the "fuel"/water or where provided to the cylinder/combustion chamber separately. The elevated temperature of the combustion chamber/cylinder further assist in progressing a conversion/transition at temperatures and not limited to; 150 Degrees Celsius and above for a piston at bottom dead centre. These starting temperatures are not normally or usually occurring at bottom dead centre for a piston. As the rising piston compresses the hot intake charge, the temperature is further elevated thus causing greater heating which has a starting temperature already above the standard engines intake, to cause greater heating to the already transitioning "fuel"/water vapor for Thermolysis gas transitioning. As described earlier the "fuel"/water can contain Bio/Fossil fuel and or have electrical discharging in the combustion chamber and or have any described heating methodology for this invention and can include pre-elevated temperatures for the intake charge that are being compressed; and or increased compression ratios, thus that the final heating of the intake charge at piston top dead centre is of the invented temperature ensuring Thermolysis utilising any of the methodologies of temperature elevation described herein. The "fuel"/water can be ejected/injected earlier in the engines cycles to either exhaust and or compression and or multiple times at different cycles or piston positions, to cause the ejection or multiple ejections for transitioning, to occur at a time of the greatest possible pressure differential between a "fuel"/water combustion chamber delivery device and the pressure in the engine cylinder and or combustion chamber, to cause an increase in speed or available time for Thermolysis subsequent to a preceding Flash Boil event as part of the total transitioning of the "fuel"/water. Thus providing greater time for heating of the "fuel"/water as the piston rises in the cylinder and increases the compression pressure and derived heat from that compression to initiate and or complete the Thermolysis which under conditions created for this invention in the cylinder/chamber have lowered the Thermolysis temperature to the auto-ignition temperature, causing the auto-ignition of the gases of the "fuel"/water at the piston optimum compression temperature height in the cylinder/chamber. The ignition point in the cylinder/chamber is, but not limited to piston position in the cylinder/chamber and is; but not limited to; temperature related position as is commonly known the with the highest possible compression position for crank rotation. Thus in this invention the ejection can occur at any time, any piston position, cycle, unlike the normal/standard known engine and injection technology of direct injection. This embodiment, invented methodology can be utilised for early and or multiple points/timing of ejection of the "fuel"/water as the piston but not limited to; ascends in a cylinder/chamber allowing for multiple ejections into the combustion chamber/cylinder to cause multiple transitions and ignitions in a single and or multiple engine cycle thus that an initial ejection can occur in any piston position such that a subsequent ejection can occur after the initial ejection with the piston in a different position within the chamber/cylinder of an internal combustion engine. That in turn produces multiple flame fronts to provide flame front temperatures which in turn can and not limited to; provide the conditions for all transitioning and or Thermolysis as described herein. The multiple discharged/ejected "fuel"/water is; but not limited to; varying volumes in each discharge into the cylinder and or chamber beginning with a smaller volume discharge increasing to a larger volume discharge. In this invention, individual and grouped multiple "fuel"/water discharges are unique and different to other known multiple discharging systems. The single and multiple discharges of this invention and embodiment utilise the invented methodology of heat, to create larger volumes of heat in the cylinder/chamber by enabling an increasing size and heat intensity of an ignited flame front and in any piston position of the engines crank rotational cycle and but not limited to; in advance or any position for a piston prior to, or after; of, top dead centre or optimum compression position for the "fuel"/water on either the known or normally understood exhausting and or compression stroke and any other piston position in the cylinder and or combustion chamber. This newly invented injection strategy for "fuel"/water only is in, but not limited to; an initial smaller volume of discharged "fuel"/water followed by increasing volumes in a next and subsequent discharges in any one crank cycle for "fuel"/water. This is a repeated process in an unlimited cascading process and effect. This invented and new methodology for the injection/ejection of "fuel"/water discharges only, into the engine cylinder/combustion chamber. The multiple and or individual discharging increases flame front size and heat by increasing the amount of ejected "fuel"/water for; and in each discharge of a single discharging cycle that are ejected into the cylinder/chamber flame front to increase the overall size and available heat from that flame front. This ever increasing and or multiple heat outputs from the flame fronts is invented for the "fuel"/water to transition larger volumes of "fuel"/water in single and or multiple discharges without extinguishing the initial flame front thus creating from multiple "fuel"/water discharging with different and subsequent increasing volumes of the "fuel"/water from and into a previous discharge which has ignited producing the invented flame front methodology in a cylinder/chamber. Another unique difference between "fuel"/water and why it is only able to be used in this invention with multiple discharging as compared to Bio/Fossil fuel and also what makes the invented multiple discharging unique is that the "fuel"/water produces expansion energy in a cylinder/chamber through transitioning before any combustion to provide added energy unlike and totally different to Bio/Fossil fuel that ignites immediately in vapor form upon ejection. However, transitioning from the injected volume of "fuel"/water provides useable energy equivalent to; and or greater than normal Bio/Fossil fuel combustion. Thus upon ignition, an igniting flame front provides a catalyst (heat) for subsequent discharges that are ejected into that flame front. This methodology replicates this same transitioning/ignition function in that flame front for, but not limited to an increasing and or varying volumes of the "fuel"/water for each subsequent discharge/ejection and thus transitioning each ejected volume of "fuel"/water first before combustion energy is derived and or can be but not limited to; upon the last discharge ejected into that flame front that can provide a total energy producing event. Thus a final ignition of the last ejecting discharging volume of "fuel"/water can, but not limited to; combine with any and or all previous ejected volumes providing/creating an energy event to move a combustion engine piston in a cylinder/chamber. However, a single/individual discharge of "fuel"/water can be but not limited to; a sufficient volume and can provide the correct expansion energy/work/heat through transition, ignition and combustion where utilised and in this invention which can provide sufficient energy to move the piston and power the engine. This can also be, but not limited to; multiple discharges of the same volume to perform the same functions as described herein. The individual discharges can be grouped together in a manner such that they appear to be one discharge with less than; and or only a micro second between each individual discharge. A final ejecting volume can and not limited to; combine with any and or all the other expansion events from all or one other ejecting volume of "fuel"/water and or any Bio/Fossil fuel in combination where utilised as described herein, to transition, ignite and combust and or utilised with any or all initial ejected volumes of "fuel"/water and or water alone or fuel as discharged. A single ejecting volume of water and or "fuel"/water can cause enough expansion/work/heat energy and can combine and or work with previous ejecting/discharging volumes of Bio/Fossil fuel where those ejections have also occurred at multiple and or different piston positions in the cylinder/chamber to ultimately move the piston in a power stroke. This can be and not limited to a single ejecting volume and or combined with previous discharging/ejecting volumes of water and or "fuel"/water; and or Bio/Fossil fuel where that is retained in the ignition/combustion processes to heat transition and auto-ignition as the combined invented processes and methodologies of this invention. This invented flame front process and its increasing elevating heat intensity to transition and auto-ignite the larger and final ejecting volume of the "fuel"/water is new and unique to this invention. The ejecting protocol of multiple discharges of "fuel"/water is completed in less than micro-seconds to enable this methodology and controlled by the invented ECU (computer) program providing instantaneous ignition combustion of the discharged "fuel"/water or water alone. This methodology is opposite and totally different to known technology and functionality in that current and known multiple injection technology which is performed to provide the engine with a first single main injecting volume causing the only ignition and combustion energy, being the total energy derived from any and or all ejections in a cylinder and or combustion chamber of Bio/Fossil fuel with any subsequent ejections for reduction in emissions to complete the chamber burn for Bio/Fossil fuel and does not contribute to the energy output from combustion, due to the reduced volume injected for emissions reduction. However an initial discharge of "fuel"/water that transitions from a liquid to a gas in either the conditions of the cylinder and or combustion chamber or an existing flame front thus supply enhances that flame front and the derived heat from any ignition followed by combustion from that flame front such that an initial and continual flame front provides the heat as defined herein of between 1800° C. and 3500° C. enabling subsequent ejection/discharges of the "fuel"/water into previous ignited/combusting flame fronts in a cylinder/combustion chamber. An increasing volume of "fuel"/water over a previous ejection for each and every subsequent discharge in an increasing scale dependent on engine load and speed such that higher loads or energy/work requirements facilitate a measured proportionate scaling up/increase in individual volumes ejected to provide the work/energy required to power the engine. Thus, the scaling up creates an increasing size in the flame front with greater heat to transition the increasing volume of each subsequent liquid volume of "fuel"/water to form a gas to auto-ignite that gas. This process can be, but not limited to; being performed where no other elevated temperatures as described herein are available and can perform with any single or all of the invented methodologies of heating in this invention. The ejecting discharging processes commences with small volumes of "fuel"/water as compared to Bio/Fossil fuel with an initial single injecting volume to produce the energy from ignition and combustion. "Fuel"/water individual discharges/ejecting volumes, including and not limited to; an initial volume followed by further discharges can occur in a proportionate increasing volume from that initial discharged volume in each subsequent discharge for any single engine cycle. This provides an initial flame front from a reduced or smaller volume requiring less starting volume of heat in the cylinder and or combustion chamber for transitioning and auto-ignition. This discharge can either be water alone and or incorporated with Bio/Fossil fuel in a homogenized blend as "fuel"/water or ejected in a separately supplied Bio/Fossil fuel volume in the cylinder/chamber and or can be water alone ejected supplied into to the cylinder and or combustion chamber. The ejection of "fuel"/water in the above methodology into a cylinder/chamber to cause the herein described invention transitioning/conversion to gas and auto-ignition from elevated temperatures. The initial and or smaller/reduced volume will reach auto-ignition temperature and ignite producing the flame front and temperatures required for a larger volume discharged into the cylinder and or combustion chamber. The invented methodology of multiple discharging for the "fuel"/water as described above and unlike known multiple discharging can be used with any other invented methodologies described herein to provide an initial or continual flame front, ignition/combustion in a cylinder and or combustion chamber providing temperatures as discussed herein such that it will cause thermolysis of any ejected "fuel"/water either as a primary and or secondary and or any subsequent discharging/ejecting "fuel"/water with each discharge increasing in volume of "fuel"/water providing an increasing volume of heat for the next discharge. The multiple discharging/ejecting of the "fuel"/water is controlled by an ECU and invented programs that enables different pulse widths (injector valve openings) for each individual duty cycle of the injector which gives the invention and this embodiment the ability to eject initial smaller volumes followed ever increasing volumes, while the principles invented herein the actual program settings can be and not limited to multiple variations of duty cycles for the fuel delivery devices which are specific to individual engine styles and types. The timing of the injection cycle and or ejection of the "fuel"/water is also invented for this invention utilising the new and invented methodologies described herein of which can only be utilised with "fuel"/water of this invention. Unlike Bio/Fossil fuel which doesn't transition like the "fuel"/water nor does it release energy from vaporization and requires ignition/combustion for any energy release which has to occur with usually 5 to 10 degrees of crank rotation before or after top dead centre and different to the "fuel"/water of this invention which can be but not limited to a greater range of degrees of crank rotation with which to be discharged/ejected into the cylinder and or combustion chamber. The temperature elevation of the "fuel"/water can at any time in any engine cycle be initiated and or completed via the heating from the electrical discharging in the combustion chamber and or from an electrical discharging device of this invention post "fuel"/water discharging. All of methodologies of temperature elevation for the "fuel"/water as described herein have such an effect on each transitioning events and normally understood principles that have now become new principles as Thermolysis is now, due to this invention of the same temperature and or greater than the auto-ignition temperature of water alone and far greater than Bio/Fossil fuel so now all combustible gases ignite provide the energy source to operate an internal combustion engine. The transitions of "fuel"/water provided by the invented methodologies extracts 3 separate energy outputs from normally non-combustible fluid utilising elevated pressures and temperatures. Thus a first energy release is an expansion of the "fuel"/water via conversion/transition from non-combustible liquid to a non-combustible vapor. A second conversion/transition of the non-combustible vapor into a gas of Oxygen and Hydrogen. Combined transitions cause a physical expansion of 1800 times its own initial liquid volume thus causing and applying pressure in the confines of a combustion chamber. The third energy release is combustion of the formed combustible gases from a non-combustible liquid applying further physical expansion pressure within the combustion chamber forcing the piston down the cylinder and rotating the connected crankshaft thus powering the engine. Pressures and pressure reductions and elevated temperatures for the "fuel"/water as described herein can cause lineal temperature reduction for Thermolysis in line with the reduction to below 1800° C. depending on applied pressure and temperature for gas formation of "fuel"/water. Thus discovered and invented the Thermolysis temperature can be reduced to the auto-ignition temperature due to the imposed pre-ejection temperatures at the pressures and normally above supercritical water temperature of 374° C. at the known pressure of 3,272 psi where upon ejection of "fuel"/water at the specifications into an engine cylinder/chamber of lower pressure than the known supercritical point and temperatures greater than the known supercritical point at approximately above or below 1000° C. subsequent to the Flash boil, Thermolysis can now occur at the know autoignition temperature to finally cause the auto-ignition of the "fuel"/water. These invented/utilised temperatures combined with an imposition of pressure and pressure reduction causing flash boil for the "fuel"/water from a delivery system discharging into the combustion chamber in turn causes Thermolysis transitioning to now be more easily and more rapidly produced in a combustion chamber as part of this invention and now is not totally reliant on heat at a specific pressure but rather the combination of the invented and applied methodologies, principles for transition to release the energy from "fuel"/water creating an energy source for a combustion chamber of combustion engine from a non-combustible liquid. The use of "fuel"/water of this invention is also for, but not limited to; high temperature combustion chambers in this invention or where lower compression and or lower temperature combustion chambers are utilised, then the invented and applied components, principles and methodologies employed to enable the use of "fuel"/water in these normal and or standard combustion chambers of internal combustion engines, can also utilise Bio/Fossil fuel flame fronts whether included in the "fuel"/water or provided separately to the combustion chamber to assist and or provide a temperature source usually but not limited to; an amount below an energy providing volume for the engine load and speed, providing heat via an initial ignition/combustion for temperature for the invented transitioning and/or but not limited to, use with and or combined with combustion chamber electrical discharging in the methodologies described herein. A combination of either or both together elevating the "fuel"/water temperature to either initiate and or complete Flash Boil and or Thermolysis transitioning at the required temperatures. These transition temperatures are also well above the auto-ignition temperature of Bio/Fossil fuel and or water alone. Therefore the Bio/Fossil fuel either as part of "fuel"/water or as a separate introduction or as retained in an engine cycle, completes its gas formation prior to any water component, instantaneously igniting and combusting because of the applied temperatures thus further elevating the available temperatures to initiate and or completes Flash Boil and or Thermolysis transitioning of the water component and whether in the "fuel"/water or as water alone to form Oxygen and Hydrogen. Where no Bio/Fossil fuel component is found in the "fuel"/water for initiating flame fronts, the process can be created by separately introduced Bio/Fossil fuel usually but not limited to, from the original delivery system. The introduction of the Bio/Fossil fuel separately to the "fuel"/water into a combustion chamber and upon ignition and combustion provide a flame front of the same or higher heating value as other methodologies of this invention to provide temperature for the "fuel"/water to initiate or complete Thermolysis and auto-ignition processes as described herein. In this invention the flame front can be a catalyst to complete Thermolysis utilising of the Bio/Fossil fuel in but not limited to lower compression and temperatures in a chamber/cylinder where retained or utilised as described herein and can be incorporated with any or all other methodologies described for this invention or used on its own. A "fuel"/water flame front can, but is not limited to, elevate the temperature to the principles required for "fuel"/water use as utilised in this invention. The use of individual vapor and gas formation temperatures of this invention from the time of ejection into the cylinder and or chamber with or without the invented elevated ambient temperatures in those areas of the engine up to the eventual compression stroke as the crank shaft rotates moving the pistons in the cylinder can but not limited to; include the ejection of the "fuel"/water prior to compression to cause an overall reduced ignition time from the point of ejection of the "fuel"/water due to the accelerated vapor and gas formation of pre-heated supercritical "fuel"/water. The ejecting supercritical "fuel"/water with a 0° C. vaporization temperature can also be incorporated with but not limited to; the newly invented process of and in coordination with the extreme pressure differential as previously described. Such that after ejection the Bio/Fossil fuel vapor and Hydrogen gas formations are at least twice as fast compared to standard or normally understood vaporization and gas formation rates and that now occur in less than micro seconds and the ability to ignite earlier in the engine compression cycle. This effectively can provide a final Thermolysis transitioning temperatures in the flame front from Bio/Fossil fuel before piston reaches top dead centre at the peak or optimum compression point thus producing hotter total ambient temperatures in a combustion chamber earlier to ensure the water component transitions and ignites before or at top dead centre for optimum engine performance and allows for advanced ignition timing to improve and optimise power outputs. The inclusion of electrical discharging of this invention replicates/mimics the process through the supply of electrical discharging heat as described herein. The known and normally understood function of a Thermolysis process simply by the fact that it requires greater temperatures to form its gas, than that of gas formation and auto-ignition of Bio/Fossil fuel and or Hydrogen meaning the utilised temperatures will ultimately cause the ignition of both, at their respective temperatures as temperatures elevates within the combustion chamber as per the invented and utilised methodologies. Thus the temperature of ejected "fuel"/water further increases in combustion chamber temperatures whether of this invention as described herein. In a standard combustion chamber the "fuel"/water can but not limited to; combine with other methodologies of temperature elevation of this invention to reach the respective transition temperatures to form gas from the "fuel"/water then ignite the "fuel"/water or Bio/Fossil fuel followed by the water then Hydrogen gas in a process that occurs when Bio/Fossil fuel is utilised in the combustion chamber meaning that the "fuel"/water will separate in its respective vapor and gaseous states and or remain as separate components where separately introduced and or retained in the combustion chamber. Due to the different gas formation and ignition temperatures of Bio/Fossil fuels and Hydrogen, with the Bio/Fossil fuel having temperature ranges at a lower rate of between 550° C. to 700° C. and Hydrogen with a new gas formation temperatures due to this invention of starting at 1200° C. and ignition temperatures of 1,000° C. so that with the different temperatures and whilst in, but not limited to; a compression stroke the elevation in temperature of the Bio/Fossil fuel will form vapor and ignite/combust earlier/prior to, and or more advanced than the Hydrogen formation providing an earlier flame front to contribute heat to the transitioning process of water to Hydrogen thus providing more time in but not limited to; a compression stroke to complete transition and overall combustion of the total "fuel"/water charge. The ignition/combustion of Bio/Fossil fuel methodology is only where Bio/Fossil is utilised in each embodiment as described herein. The created elevated combustion chamber and or cylinder temperatures of this invention contribute to elevated ambient temperatures for thermolysis prior to optimum compression temperatures to elevate temperatures pre-"fuel"/water ejection and or application of the electrical discharge prior to ejection of the "fuel"/water into an engine cylinder and or combustion chamber and can combine but not limited to; with any and or all other temperature elevating principles and methodologies of this invention. The pre-ejection "fuel"/water elevated temperatures provide a reduction in the vaporization temperature to 0° C. or below and now aids and supports the ignition/combustion earlier in an engine cycle and can allow elevated intake compression temperatures to complete transitioning prior to piston reaching optimum position for this invention, which is not limited to top dead centre, where normal Bio/Fossil fuel ignition and combustion has to occur. Making the entire invented system, principles and methodologies new and totally opposite current systems, principles and methodologies. Flash Boil and Thermolysis known principles but never utilised or able to be utilised in an internal combustion engine until this invention; and only with the use of the "fuel"/water in combination with applied pressure, pressure reduction, heating and these transitioning methodologies of this invention to form combustible gases. Where no initiating flame front from either the "fuel"/water or separately introduced volume of Bio/Fossil fuel the Hydrogen gas forms from the inventive processes and principles of this invention in the combustion chamber and can be transitioned and ignited through invented and applied modifications of an engine including but not limited to, use of exhaust gases and heated intake air charge, and or the addition of the high temperature electrical discharges prior to the "fuel"/water ejection. In this invention the "fuel"/water can be pre-mixed in the storage tank and can transit through a normal or standard delivery/supply system in fluid communication to the combustion chamber, supplied by and through original equipment of an engine and can apply the principles and processes of heating, pressure and pressure reduction and further heating as described herein through a modified standard injector. The injector in this embodiment is resealed such that the body of the injector becomes exposed to the ambient conditions of the combustion chamber to cause an elevated temperature to that body causing heat transfer to the "fuel"/water stored inside the injector. The applied and transferred heat causes the "fuel"/water to become supercritical in temperature and homogenized thus upon ejection into the combustion chamber the homogenized "fuel"/water and or water alone where the Bio/Fossil is not retained will upon, perform the transitioning processes within the combustion chamber of a normal and commonly understood combustion engine. In a normal/standard where Bio/Fossil fuel is retained in any of the manners described herein and commonly understood combustion chamber of an internal combustion engine a flame front will form upon ignition/combustion of a combustible vapor or gas, whether Hydrogen and or Bio/Fossil fuel liquid. Bio/Fossil fuel normally have combustion, flame front temperatures in ranges of between 1,800° C. to 3,500° C. The invented principles and methodologies do not exceed engine limits they merely apply the temperatures at new cycles in the engine such that the methodologies increase ambient temperatures to impose upon the new fuel, "fuel"/water of this invention, in fluid communication, in the combustion chamber delivery device of this invention and in the invented combustion chamber conditions forming the invented processes to extract energy from a non-combustible liquid and the subsequent energies from gas formation from a non-combustible liquid to a combustible gas (not vapor as forms from Bio/fossil fuels) and the invented incorporation of flame fronts and their temperatures as utilised in this invention and in any engine cycle and or piston positioning in the engine cylinder and or stroke allowing flash boil and or Thermolysis transitioning processes to be completed in a cylinder and or combustion chamber to enable the use of the invented "fuel"/water. This invention also enables "fuel"/water to be ejected into the exhaust gas in but not limited to; an exhaust stroke and or into retained exhaust gases in the combustion chamber for and or during a compression/ignition event. This above process of exhaust gas heating upon fuel ejection into it, can also provide the "fuel"/water with a single process to elevate its temperature prior to compression in line with the invented methodologies and principles herein and can be but not limited to; utilised where no preheating of the "fuel"/water is completed in the delivery system. Thus the transitioning in the exhaust gases either recirculated or retained and or in a cylinder and or combustion chamber, and or combined with other pre-heated intake air as supplied to the intake side of the engine chamber and or cylinder can now occur. This can also function with but not limited to; in combination with individual and or all other methodologies as described herein, including modified and or increased engine static compression ratios creating more pressure heating of a compression charge through a reduction in the size of the combustion chamber and or chamber pressure increases by the introduction of greater volumes of intake air which can be pre-heated or not and or exhaust gases causing further increases in compression stroke temperatures so ejecting "fuel"/water to come into contact with these elevating compression temperatures. This contact further elevates the "fuel"/water temperature and for a basic unmodified compression ratio/temperatures and can be greater than the invented supercritical (plus) fuel temperatures of the "fuel"/water of this invention. By further elevating its temperature due to that exposure to the heated intake gases and the created ambient temperatures will initiate and or cause the multiple energy releases of the "fuel"/water through transitioning in the combustion chamber. The processes of transitioning "fuel"/water in a combustion chamber creates greater movement of the introduced fuel as it physically expands in surrounding greater temperatures and lower pressures allowing greater movement during flash boil and or Thermolysis transitioning further enhanced when ejected earlier in the engine cycle which has lower chamber pressure thus greater pressure differential between the high-pressure delivery system and the cylinder/chamber pressures. Then combined with the elevating compression of, but not limited to; the formed pre-heated intake gases/air causing combined effect of an increasing heating of the gases/air as the piston rises in the cylinder causing more heating and movement of the "fuel"/water and thus expansion thus increasing and creating a compounding effect to further pressure heat in a compression stroke in the combustion chamber/cylinder during transitioning and prior to ignition/combustion. The "fuel"/water whether fully or partially formed in homogenous blend in the delivery system can form upon ejection a fully homogenized "fuel"/water liquid and or vapor due to the chamber pressures and temperatures. Then transitioning into the combustible gases of Hydrogen and Oxygen. This new invented principle and methodology is only able to be created by use of "fuel"/water and its formation and transitioning processes from an Homogenized liquid to vapor to gas. Expansion energy from the transitioned gas formation combine with the energy of combusting gases to increase the total pressure/energy within the combustion chamber to force the piston down the cylinder at the same or greater rate as Bio/Fossil fuels at a reduced ejected liquid volume into the combustion chamber due to the greater created expansion pressure applied to the piston because of this invention. Transitioning as part of this invention causes the non-combustible liquid and vapor of "fuel"/water to ultimately form a combustible gas for ignition and combustion and due to inventive principles and methodologies of heating the "fuel"/water through applied and invented processes causing a reduction in "fuel"/water vapor point temperature and but not limited to; with the changed and invented ambient conditions in the combustion chamber of elevated temperatures, either from gases or supply of electrical discharges or increased compression to the invented ratio's, such that the transitioning and ignition/combustion of the "fuel"/water is now at a faster rate and more complete than normal standard Bio/Fossil fuels alone. The combusting gas combines with the expansion energy of both transitions to increase total energy/pressure in the combustion chamber and applied to the top of the piston on a power stroke upon combustion of the gases of Hydrogen and Oxygen. This facilitates a reduction in all injected fuels and a subsequent reduction in pollutants and harmful emissions whilst maintaining the same power output. The greater the water content up to 100% reducing emissions to zero only producing water and Oxygen at the tail pipe. Where the same or similar liquid volumes of "fuel"/water are used as Bio/Fossil fuel more power is derived from the engine due to the increase in useable energy derived from the new "fuel"/water. Conversely a reduction in "fuel"/water will provide the same or similar energy with a reduction in liquid consumption. The gases of Hydrogen and Oxygen when combusted add 2.4 times the energy than that of Bio/Fossil fuels in comparative volumes. Thus, the derived energy by the combined transition of non-combustible "fuel"/water and the combustion of the Hydrogen is totally opposite in principle and methodology of Bio/Fossil fuel as commonly understood. The Extreme pressure/velocity of ejecting "fuel"/water of this invention upon entry into the combustion chamber and or cylinder couple with normal turbulent movement of the intake gas charge in the engine chamber and or cylinder and the normal gas compression movement caused by the piston movement in the cylinder further increases the temperature of the "fuel"/water through contact. The resulting transitions by the "fuel"/water causing expansion into the formed gases in a combustion chamber and or cylinder increase total compression pressure and temperature of the compressed intake charge as self-perpetuating process, not previously used in an internal combustion engine to and or greater than that of the normal high compression auto-ignition engines up from 600 to 700 Degrees Celsius being normal minimum temperature required for normal or standard Bio/Fossil Diesel and or Gasoline/Petrol to between 700° C. to 3500° C. but still within the normal operating temperatures of Bio/Fossil fueled flame fronts within a combustion chamber in a combustion engine or gasoline/petrol fuels. These temperatures where insufficient for heating to the auto-ignition of the majority of formed gases of Hydrogen due to the "fuel"/water not been elevated in temperature as described herein, will be heated to initiate and complete the multiple transitioning process in the invented and modified conditions in and of a combustion Chamber with elevated intake temperatures and or compression ratio's, and or flame fronts temperatures from Bio/fossil fuel as invented and utilised in the combustion chamber for the "fuel"/water and or where Bio/Fossil fuel is introduced separately into a combustion chamber due to the Bio/Fossil fuels lower vaporization and ignition temperature compared to water and or water component of "fuel"/water such that the above invented processes will substantially convert/transition any water component to a gases to cause ignition of those converted gases. However, when the "fuel"/water is elevated in temperatures as described herein, the "fuel"/water will have a lower combined vaporization point reduced from over 500° C. to Zero ° C. therefore more easily transitions, in the processes flash boil and Thermolysis and not limited to; requiring the other invented methodologies described herein. Flash boiling and thermolysis are known scientific and engineering principles and methodologies for transitioning fluids, into a gaseous state. However, these processes have never been incorporated or utilised in a formation of combustible gases from a non-combustible liquid where those gases are for the use in a combustion chamber of an internal combustion engine, Such that where the combustion chamber is of lower or insufficient temperatures the invented "fuel"/water can be elevated to cause its formation and its initiation of transitioning with the reduced vapor temperature. The chamber temperatures can also but not limited to; be achieved by the "fuel"/water coming into contact with the invented single or multiple high voltage, high temperature electrical discharge's in the combustion chamber to cause the transitioning and ignition/combustion of the "fuel"/water. The electrical discharge is when applied to a combustion chamber first is opposite and unlike and different from normal currently understood sparking systems of a gasoline/petrol engine and is of increased voltage and current producing heat in that electrical discharge to heat the "fuel"/water as described herein regardless of engine type. In an embodiment of the invention the voltage is achieved by the addition of a DC capacitor fitted to an ignition coil or coils to increase the high voltage output but not limited to; from 30,000V to over 250000V and usually greater. The increased current compared to normal spark ignition systems is provided through multiple discharges at or less than 1 micro second apart and whilst individually delivered, the appearance is a constant high voltage electrical stream. At less than a micro second secondary coils may need to be utilised depending on individual coil strengths and outputs.

The multiple discharges provide constant contact/heating source for the ejecting "fuel"/water during its ejection thus providing the optimum and invented temperatures for vapor and gas formations from the liquid "fuel"/water followed by heat causation of ignition/combustion. The heat generated from the electrical discharge causes the ignition as the auto-ignition temperature of the "fuel"/water is reached through the electrical heating as the Thermolysis temperature starting at 1800° C. is far greater than the auto-ignition temperature of 1000° C. Whilst delivery of an electrical current in the form of a spark is not new or inventive in this invention it is not a spark as normally understood rather an extreme constant electrical discharge of far higher voltage, current and temperature provided prior to the ejection of a fuel as described to heat the "fuel"/water to transition it to a gas and subsequently ignite. As previously stated herein the spark is discharging prior to the ejection of the fuel, thus the fuel heats up rather than ignites and combusts forming a gas by absorbing the ambient heat as the fuel passes through the electrical discharge. Upon reaching a gaseous state the same electrical discharge is of greater heat intensity than the auto-ignition point of either Bio/Fossil fuels and or water, thus the fuel "fuel"/water can be ignited from the derived heat and not the use of an electrical discharge as normally and commonly understood. Where the combustion chamber temperature is only sufficient to ignite and combust any Bio/Fossil fuel component as delivered to the combustion chamber either separately or as part of the "fuel"/water, that Bio/Fossil fuel component will ignite and combust, further elevating the ambient temperatures from the flame front which produces a combusting temperature of between 1800° C. and 3500° C. This combusting temperature of the Bio/Fossil fuel component exceeds the temperature of both Thermolysis the lower auto-ignition point of the newly formed Hydrogen gas and coupled with the Oxygen in the mixture causes ignition and combustion of the Thermalized gases of hydrogen and oxygen from the water component of the "fuel"/water. In this invention and not limited to; in the active and reactive invented processes the "fuel"/water when exposed to ignition temperatures of the Bio/Fossil fuel can cause a separation of the homogenized "fuel"/water in the combustion chamber in this new and inventive process back into the two core elements of the Bio/Fossil fuel and water. Next further heating in the combustion chamber can occur with the heating of the intake air charge itself. In this invention this can but not limited to; occur using the exhaust gases by heat exchanging the temperature of the exhaust gases with the intake via conduction in an air heat exchanger of this invention. The air heat exchanger performs as all other heat exchangers of this invention however is utilised to heat the intake air. The now heated intake air is totally opposite to known intake air technology for combustion engines, the current understanding and commonly understood technology in all cases attempts to reduce the temperature of the intake air/gas charge to maximize volumetric efficiencies to fit as much intake air into the cylinder on the intake stroke to maximize the static compression ratio. Unlike commonly understood principles and methodologies of cool air intake, a new principle of this invention is but not limited to; elevating the starting temperature of an intake charge to increase the compressed temperature on the compression stroke with which to inject fuel and or "fuel"/water into. Elevating the starting intake charge temperature is totally opposite technology and principles to normal and commonly known intake systems. Thus this invention can provide elevated temperatures above the normal and commonly understood compression temperatures of between 150° C. and 700° C. increased to 1000° C. and greater. This new inventive technology allows use of "fuel"/water in engines of but not limited to; lower compression with lower compressed intake temperatures, those below higher and or the invented high compression ratio engines as described herein. Meaning lower compression ratio engines that normally ignite and combust low octane and or use gasoline/petrol for their energy source, can utilise exhaust gas retention or EGR or pre-heated intake air/gas charges as invented for elevated pre-compression temperatures and compression temperatures to come into contact with the ejecting "fuel"/water and regardless of an engine cycle. The ejecting "fuel"/water in the above methodology for an engine can also utilise the Bio/Fossil fuel in the "fuel"/water and or separately introduced in any combination with a heated intake charge to cause transitioning, ignition, providing an initiating flame front to provide the heat normally found with the modified invented high compression engines. Where, and not limited to; exhaust gas retention or EGR and or heated intake charge are not utilised to provide that heat the invention can utilise increased compression ratios. Where exhaust gas is utilised either retained or recirculated and or supplied separately into the intake air stream or combustion chamber can indirectly supply a combustion chamber with the "fuel"/water as now normally found unused in the exhaust gases in this invention. "Fuel"/water is multi-functional in this invention, found in the exhaust gases due to cooling of exhaust gas after combustion causing re-formation/reconstitution of the "fuel"/water at lower temperatures. The re-constituted "fuel"/water is, but not limited to water alone and occurs at temperatures below the supercritical point of 374° C. These temperatures are normally and commonly found in the exhaust gases usually but not limited to; in exhausting stroke in the cylinder. Exhaust Gas Recirculation (EGR) is normally, commonly and only understood to be used to reduce NOX (Nitrous Oxides) output in the exhaust gases by altering or diluting a combustible intake air charge ratio with non-combustible gases. This in turn forms what is commonly understood as a rich air fuel Ratio (AFR) which is the compared fuel quantity to combustible air quantity called AFR. The standard is 14.7 air parts (average) to 1 part fuel. This minimizes the temperature of combustion in a combustion chamber and the ensuing exhaust temperatures whilst maximizing power output. This invention and its invented "fuel"/water can utilise greater fuel quantities and quantities non-combustible gases such as exhaust gas to combine with the intake air and the predominately formed "fuel"/water gases of Hydrogen and Oxygen to create the combustible mixture such that different AFR either rich or lean are useable without increasing NOX or increasing other emissions. Because the exhaust gases contain re-constituted water and the now wide ranging combustion ratio of the "fuel"/water as Hydrogen and the formed pure gas of Oxygen from the "fuel"/water whether injected and or retained in the exhaust gases thus that an increased or reduced volume of "fuel"/water can be utilised to reduce NOX and only generally produces Oxygen and water not harmful emissions that are normally emitted from the tail pipe when Bio/Fossil fuels alone are used and given the reconstitution of water as a fuel in the retained and or recirculated exhaust gases the engine AFR naturally becomes rich to reduce NOX without adding to the other harmful emissions, this benefit is only achievable through this invention and it's principles and methods with the use of "fuel"/water. The new and invented principles and methodologies for the use of exhaust gases are totally opposite in this invention. Exhaust gas can be recirculated or retained in or supplied to an engine cylinder and or combustion chamber either separately supplied gases or retained from a previous combustion cycle from the same cylinder/combustion chamber and or another cylinder or combustion chamber. The exhaust gases are utilised in this invention to provide fuel, ambient heat, elevating temperatures to heat the fuel delivery devices in the combustion chamber to heat the stored "fuel"/water, for the ejecting fuel and or "fuel"/water pre and or post and or being ejected in the cylinder and or combustion chamber and to provide a pre-heated fuel and all fuels in fluid communication and "fuel"/water as retained in the exhaust gas itself. In this invention there is retained "fuel"/water in exhaust gas as, but not limited to reconstituted water and or exhaust gases containing separately introduced "fuel"/water at or below or above supercritical temperatures which also performs another function of cooling exhaust gases through heat absorption from the re-constituting or introduction processes forming heated "fuel"/water in the exhaust gas.

This also provides a benefit of NOX reduction via exhaust gas temperature reduction. NOX is the result of high temperatures in the exhaust cycle and resulting exhaust emitted to atmosphere. So, whilst the invented principles and methodologies herein increases the ambient temperatures in the cylinder and or combustion chamber and the pre and post ejected "fuel"/water for effects described herein, results in a reduction in exhaust gas temperatures from emitted from the combustion chamber through heat absorption by reconstituting "fuel"/water. Such that re-heating fuel in the exhaust charge and heat absorption from all heat exchangers to heat the "fuel"/water during and prior to ejection into the combustion chamber and in fluid communication in the delivery and supply systems thus reducing overall temperatures in tail pipe emitted exhaust gas. Conversely combustion chamber temperatures are increased by elevating the intake temperature charge and or by diluting the intake air with hot exhaust gases to form a blend. A normal intake charge of air can range in temperature from an average of 5° C. to around 140° C. either naturally aspirated or with a turbo or super-charger with the use of an intercooler as commonly understood. Intake temperatures can be hotter up to approximately 160/180° C. with no intercooler. These temperatures on their own are not hot enough to perform and function and are not the temperatures invented or utilised in this invention. The hotter exhaust gases are utilised and not limited to either the heat exchangers and or the combustion chamber and or the combustion chamber delivery devices and or ejecting fuel. The lower temperatures of a standard/normal intake air charge as described above will only allow the engine an auto-ignition compression temperature of around 150° C. to 700° C. as per the engine design. So those combustion chamber parameters will not auto-ignite "fuel"/water or transition effectively in a standard design/configuration unless the "fuel"/water in liquid form is elevated in temperature usually but not limited to; near or up to supercritical temperatures of 374° C. which is totally opposite to normal injection of fossil fuels in a combustion engine. Where fuel is only heated to engine operating temperature for colder climates where fuel freezing occurs, this temperature however is insufficient for the "fuel"/water to perform/act/react/transition to release its energy when not heated to temperatures described and invented for this invention. Hence for a standard engine the heating of "fuel"/water in heat exchangers is necessary pre the combustion chamber. The heating of the "fuel"/water to or near its supercritical point/temperature reduces the vapor point from approximately 450° C. (depending on the specific blend) down to Zero (0) ° C. Thus the reduced vapor point being the temperature point of liquid to convert to vapor/steam and reduces the transition temperature of Thermolysis and increases the speed which of the overall conversion within the combustion chamber/cylinder but not limited to; reaching the auto-ignition temperature of the gas of Hydrogen at 1000° C. As utilised in this invention, an increase of exhaust gas in an intake charge as retained or recirculated, increases the total compressed temperature of all the gases on the compression stroke. Such that in a combustion chamber/cylinder the invented and utilised greater elevated starting and compressed temperatures assist the transition processes of Flash Boil and Thermolysis and heat conduction into the fuel delivery devices. The added heat and subsequent turbulence in the combustion chamber/cylinder replicating the effect on the "fuel"/water imposed by the use of heat exchangers improves and supports the creation/formation of a homogenized "fuel"/water where Bio/Fossil fuel is retained, enabling the release energy of the "fuel"/water in a combustion chamber/cylinder. Thus this invention creates in its delivery system in fluid communication and its components a replication of the combustion chamber functionality and or vice versa with the applied heat onto the "fuel"/water causing but not limited to; formation of an homogenized blend, where Bio/fossil fuel is retained and or used, causing transitioning and ignition of the new "fuel"/water in a chamber/cylinder of a combustion engine. There is no release of energy within the delivery system due to the applied high pressure but rather causes; and not limited to; the formation of a non-combustible homogenized blend. The combined releases of energies are achieved in the chamber/cylinder where a reduction in high pressure to lower comparative pressures is experienced by the ejecting "fuel"/water to initiate, and or complete the 2 known utilised transitions as part of the invented processes culminating in the formation of a combustible gases of Hydrogen and Oxygen for a third and final release of energy. The combined methodologies from storage tank to the chamber and or cylinder can cause the non-combustible "fuel"/water of this invention to release its energy upon ejection into but not limited to: the cylinder and or combustion chamber of an engine. The standard normal process and commonly understood functionality of internal combustion engines using Bio/Fossil fuels as their energy source with its normally understood processes and functions are totally opposite and different to those herein invented and will not cause the release of energy of the new "fuel"/water and requires the invented principles, methodologies, functions and processes as described herein to be applied to the invented and utilised "fuel"/water of this invention to release its energy. Meaning the original Bio/Fossil fuel cannot be replaced with the invented "fuel"/water of this invention without the use and or application of one and or more of the components, methodologies and or principles of this invention. The new processes and functions of the ejecting "fuel"/water into the cylinder and or chamber can only occur because of the applied principles, protocols and methodologies of this invention being imposed onto the "fuel"/water and or "fuel" in fluid communication and in the chamber/cylinder causing transitioning and ignition/combustion of the derived gases in the combustion chamber/cylinder. In this invention prior to being received by a high-pressure pressurising device, Bio/Fossil fuel and or "fuel"/water in fluid communication in the first heat exchanger device can be further elevated in temperature and supplied at an elevated pressure above 1 atmosphere up to the embodied high-pressure input at 200 psi whilst in fluid communication ensuring flow between components preventing boiling, An elevated pressure on the Bio/Fossil fuel and or "fuel"/water maintains the liquidity of the fuel or "fuel"/water at temperature prior to a second high-pressurising device where further heat can be applied. The first heat exchanging devices can heat but not limited to 200 Cc. Any heat exchanging device in this invention can, but not limited to; use any engine temperatures found in fluids, components, and or, but not limited to; exhaust gases from the engine. In this invention/embodiment temperatures as derived in the exhaust gases or exhaust system or supplied to heat exchanging devices causes the transfer of that heat in and from the exhaust gas into the Bio/Fossil fuel and or "fuel"/water to elevate it's temperature, to; but not limited to; up to 450° C. and can depend on temperatures from any other prior heating and or integration of any re-circulated Bio/Fossil fuel and or "fuel"/water that combine for this invention. The greater the initial/pre-heating utilising any recirculated fuel of any type, can but not limited to; cause greater elevation of the temperature of the "fuel"/water prior to entry to the first and or any heat exchanger. In this invention the output temperature of the "fuel"/water achieved by a first heating device can be limited by input maximum temperature limit of a second and or higher pressurising pressure device for any fuels of this invention where utilised. Where such limitations do not exist the input supply temperatures can have no limit, and where no such limits exist the "fuel"/water can be elevated to any temperature and or where available pressure from a pressurising device to maintain liquidity where liquidity is required from time to time in this invention. The heated "fuel"/water whether a liquid and or vapor in fluid communication in or between the storage area and combustion chamber delivery devices is non-combustible unlike and totally opposite to conventional and commonly understood Bio/Fossil fuel. Liquidity for "fuel"/water isn't essential in fluid communication but preferred for this embodiment. "Fuel"/water is not limited to being maintained as liquid after the first heating device. If no first pressurising device is utilised a secondary high pressure pressurising device can be utilised on its own to induce and or receive the Bio/Fossil fuel "fuel"/water mixture with or without re-circulated fuel and or "fuel"/water and or pre-heating and or heat from a first heating device and can rely on a single heat exchanging/heating device and or pressure heating by pressurising the "fuel"/water in fluid communication and or in the combustion chamber of an internal combustion engine when that chamber and or device is of sufficient heating capacity to heat the "fuel"/water to the temperatures as described herein. In this invention non pre-heated "fuel"/water but not limited to; can be supplied to a high pressurising device which can and not limited to; provide as a first heating device from applied pressure on the "fuel"/water at or above 40 psi prior to entry into the high pressurising device thus that the device increases said pressure from the 40 psi such that exiting the high pressurising device increases the pressure in fluid communication to; but not limited to, 3,272 psi and can be over 3,272 psi and or greater thus will cause increased pressure heating of the "fuel"/water in fluid communication, Thus during pressurisation and after exiting a high pressurising device whilst maintaining liquidity and continued pressure heating can occur between a high pressure pressurising device and the combustion chamber delivery devices and ultimately in the combustion chamber conditions as created for this invention. This can occur and is not limited to the functioning in the original manufacturers injectors where retained and utilised and or incorporated to function in the invented methodologies and principles of this invention. A next heating system which is an example of use of heat derived from the exhaust manifold such that the manifold can be of such a design as to have the "fuel"/water heated in a surrounding cavity of the manifold that contains and holds a volume/quantity of "fuel"/water thus that heat is transferred from the exhaust gases through the walls of the manifold to the "fuel"/water contained inside the adjoining cavity as part of the exhaust manifold prior to entry to a combustion chamber delivery device and or combustion chamber and or cylinder. This embodiment of an exhaust manifold heat exchanger is new and inventive as current technology does not provide for fuel and or "fuel"/water to be stored in an exhaust manifold for the purpose of heating to form a combustion chamber combustible liquid. All exhaust manifolds as current technology are to pre-heat coolant for engine temperature control not fuel or "fuel"/water temperature control. The current design of manifold heating for this invention for "fuel"/water involves the proto-type and incorporates the wrapping of the exhaust manifold and or exhaust pipe with the high-pressure fuel lines thus that the fuel lines are touching and or in close proximity to receive radiated heat. This causes conduction of the heat through the walls of any suitable fuel lines utilised in this manner, the lines absorb the heat of the engines exhaust conducting or transferring the heat into the non-combustible "fuel"/water contained within the fuel lines. The fuel lines used in this manner are, but not limited to: high pressure metal fuel lines to better absorb the heat from the Exhaust manifold and or heat from the exhaust gases to induce and transfer the heat more efficiently from the exhaust gases from the engine to heat the metal fuel lines to heat the water or Bio/Fossil fuel and or "fuel"/water contained inside the fuel lines. This heating of the fluid/liquid "fuel"/water is prior to the heating in the combustion chamber delivery devices and or the engines cylinder/chamber for this invention. All heating of water, "fuel"/water, Bio/Fossil fuels in this invention is working in combination with the high-pressure heating being applied to any liquid fuel combustible or non-combustible in fluid communication and or in a combustion chamber. This heating in the fuel lines can also occur but not limited to: during distribution to individual combustion chamber delivery devices, from a common rail distribution component. The common rail fuel distribution component of this invention adds heat or heats alone the "fuel"/water as compared to current and known technology of common rail fuel distribution which does not heat the fuel in any known methodology and the applied use of any methodology where fuel is found in a common rail is to cool the fuel to provide cooled fuel to maintain known and commonly understood fuel density ratios, nor is it commonly understood that a common rail fossil fuel distribution component would contain a non-combustible "fuel"/water for supply to fuel delivery components in a combustion chamber, to ultimately form a combustible gas in the process described herein that in fact requires the application and imposition of heat and pressure on to the "fuel"/water also described herein. While further mixing the Homogenous blend of Bio/Fossil fuel and water into "fuel"/water where Bio/Fossil fuel is utilised and retained in the "fuel"/water whilst maintaining pressure and liquidity can cause pressure heating of the Bio/Fossil fuel and or "fuel"/water combined with but not limited to: the use of exhaust gas as a source of heat as in embodiments of this invention supplied from the exhaust system but is not limited to the use of exhaust gas for heating. In an embodiment the fuel supply components can either be separate components more commonly known as a fuel rail but is not like a normally or commonly understood fuel rail containing, new different and not previously utilised or incorporated functions and methodologies making it new and unique as a fuel rail component of this invention, and or can be incorporated in the exhaust manifold itself as a single component with multiple functions, as designed, developed, invented for this invention.

Thus creating a fuel rail exhaust manifold component that:—heats and maintains fuel pressure whilst mixes/blends and distributes to individual combustion chamber delivery devices where upon the next stage of "fuel"/water heating occurs. These chamber devices can also be OEM fuel delivery devices where retained for this invention and subject to all parameters described for this invention. The Bio/Fossil fuel as "fuel"/water of this invention allows exposure to extreme temperatures without causing the formation of combustible liquid or vapor due to the large water content and relative pressure on the "fuel"/water in fluid communication. In an embodiment exhaust gas heating is achieved through the invented common rail fuel distribution component that acts as the heat exchanger supplying heat for the "fuel"/water contained in it from the received hot exhaust gases then distributes the heated "fuel"/water to individual engine cylinders. This component unlike normally and commonly understood fuel rails also mixes/blends the "fuel"/water under pressure by use of undulating inner surfaces and or rifling of the outer walls of the inner feed tubes this feature to assist the mixing and blending of the "fuel"/water is not needed or utilised in normal or commonly understood fuel rails because normal fossil fuel is not a combination as per the invented "fuel"/water herein. The invented common rail fuel rail in this embodiment but not limited to; utilises hot exhaust gases fed directly into the common rail fuel device to transfer heat to the "fuel"/water contained inside prior to distribution through its contact from internal walls or surfaces that are in contact with "fuel"/water and are heated by exhaust gases and; but not limited to: external walls that are heated by and not limited to contact with exhaust gases and can work in combination with the embodiment of the wrapping of the high pressure fuel line around the exhaust manifold as an embodiment of an exhaust manifold heat exchanger which then supplies in fluid communication the "fuel"/water into the heated invented common rail fuel distribution device. The high pressure "fuel"/water line wrapped around the exhaust manifold is another heat exchanging device performing and functioning as all other heat exchangers of this invention. This added heat exchanging system enables the fuel rail device to maintain and or increase the "fuel"/water temperature being supplied to the combustion chamber delivery devices with "fuel"/water at between 40° C. and 450° C. Known fuel systems and fuel rails and delivery systems and that distribute fuel individually to the combustion chamber delivery devices as the manufacturers original fuel systems for an engine or as perform as an exhaust manifold, do not function as described for the invented fuel systems herein and do not perform as described above or described for this invention. The normal/commonly understood distributing fuel rails and systems do not blend or mix as the normal Bio/Fossil/diesel/gasoline fuels are single blends not requiring mixing or blending into one fuel, nor heat or perform as a fuel, nor have extreme heating from exhaust gases supplied at above normal engine temperatures, due to combustibility of Bio/Fossil fuels alone in a liquid state, Thus the effects of the invented principles for "fuel"/water of this invention will not work or function as invented on normal commonly understood Bio/Fossil fuels due to the temperatures utilised described herein and can cause issues outside the combustion chamber of possible pre-ignition and or combustion and or vapor lock due to the boiling of the fuel along with the loss of fuel density and reduction in injected fuel volumes creating lean burn and incorrect air fuel ratios this is totally opposite to the new "fuel"/water of this invention as it is non-combustible until converted to a gas which only occurs in the combustion chamber after the initiating processes described herein for this invention. Normal Bio/Fossil fuels with incorrect air fuel ratios or ratio's the same as is used in this invention will cause engine miss fire, engine knock, overheating, leading to; power loss, and increased harmful emissions, ultimately component and engine failure. This invention enables extremely lean Bio/Fossil fuel air fuel ratio's in the "fuel"/water and heated, but not limited to: by exhaust gases to the invented temperatures and or in any heating system including the current embodiment and unlike normal fossil fuel such as Diesel and Gasoline alone will not combust as this inventions "fuel"/water is a non-combustible homogenized blend of Bio/Fossil fuel and water liquids and vapours only able to release its energy in the inventive processes described herein. Heating of the "fuel"/water in its distributing device of this invention also distributes to the individual combustion chamber delivery devices in fluid communication adding further high pressurised pressure heating in the delivery system and into the combustion chamber deliver devices thus that the "fuel"/water combustion chamber delivery devices have two forms of "fuel"/water heating. The high pressurisation pressure device for the in fluid communication continues to apply pressure on to the "fuel"/water causing pressure heating in conjunction with but not limited to; heat as derived from the combustion chamber gases as radiated onto the fuel delivery devices and conducted/transferred through the walls of the fuel delivery device onto the "fuel"/water prior to the "fuel"/water ejection into a combustion chamber and or upon ejection into the combustion chamber. All components in high pressure fluid communication between a high pressurization device and the combustion chamber delivery devices.

The heating/mixing/blending/distribution (fuel rail) device of this invention can provide further heat to the "fuel"/water of this invention utilising external and or internal electrical or mechanical heat sources to elevate the temperature of the fuel rail to transfer that heat onto the stored "fuel"/water. This component of this invention can through direct heat transfer from those sources or any heat source for the "fuel"/water can heat via conduction through the heated walls of the fuel rail. The "fuel"/water within the "fuel rail" heating distribution device of this invention can be elevated and not limited to; temperatures up to and greater than the minimum supercritical point of 374° C. depending on the temperatures of the external and or internal heat sources whilst the "fuel"/water is in fluid communication. In this invention the high pressurising device, pressurizes from and upward of over 3,272 psi in normal operations and in this embodiment up to, but not limited to; 36,000 psi ensuring liquidity in fluid communication between the high-pressure pressurising device and the combustion chamber delivery devices at elevated temperatures up to and over 450° C. "Fuel"/water is also maintained as a liquid at increased elevated temperatures using higher pressures at or above supercritical temperatures or below via a first pressurising device that can but not limited to supplying the high pressurising device of this invention. The releasing of the energy of the "fuel"/water in this invention usually but not limited to; occurs during ejection of the fuel water at the pressure differential from the combustion chamber delivery device/delivery system in fluid communication at a range from 3200 psi and above, the upper limit of the high pressure fuel system only governed by component limits and their technology current at 40,000 to 45,000 psi as commonly understood and the range of pressures known to occur in combustion chamber of internal combustion engines upon compression which generally ranges between 150 and 800 psi depended on the engine style whether naturally aspirated or turbo or supercharged and either spark/compression auto ignition engines. The unique invented feature is that this system can eject into the ignited and combusting flame fronts of the original fuel injection system where retained or the effects of multiple discharges of the "fuel"/water where those discharges create an initial flame front and combustion pressure in the chamber. This initial discharge whether from the original fuel causing its combustion or from the discharging "fuel"/water and its transitioning/combustion creates pressure and heat in the chamber/cylinder to assist subsequent ejecting discharges either from an initial discharge of original fuel or "fuel"/water. The transition and release of the "fuel"/water's energy from the initial or subsequent ejected discharged volumes, such that the transition, ignition and ultimately combustion from the formed combustible gases provide expansion pressure and energy in the chamber thus causing and or assisting as a compounding effect to create more heat and pressure in the chamber, such that this heat is also providing greater heat for the heating of the injector/fuel delivery devices to heat directly the stored "fuel"/water in those devices for subsequent discharges prior to ejection, followed by, and not limited to: also heating of the ejected "fuel"/water in the chamber after ejection and subsequent to any previous discharge of either original fuel and or "fuel"/water of this invention ultimately creating pressure energy and heat to push the piston down the cylinder to rotate the crankshaft of but not limited to; an internal combustion engine. The water only fueled engines of this invention using "fuel"/water as defined herein utilise the methods and principles as described herein and is; but not limited to; as previously described for "fuel"/water containing Bio/fossil fuel component is supplied to the combustion chamber delivery device/injector at an elevated temperature usually but not limited to; a minimum of 115° C. This minimum is usually but not limited to being increased or further elevated in temperature by the "fuel"/water combustion chamber delivery components and or the combustion chamber ambient gaseous temperatures to effect its transition and ultimately ignition and combustion. The elevation in temperatures up to and over supercritical temperatures either of the "fuel"/water and or water alone can occur in and from; but not limited to; high pressure heating, and or exhaust gas heating in any engine location and or exhaust output and or where utilised in a heat exchanger, and or the combustion chamber delivery devices and or upon ejection of the "fuel"/water or water alone into the elevated temperatures of the combustion chamber prior to ignition; and or during transition of the "fuel"/water into its gaseous state and or during the combustion process. The fuel and or "fuel"/water whilst stored in the delivery devices in direct contact with the combustion chamber can be further elevated in temperature above the supercritical point. The fuel and or "fuel"/water temperatures would normally cause a change in state at ambient pressures from a liquid to gases of Oxygen and Hydrogen at pressure of and below 3,200 psi. The fuel and or "fuel"/water of this invention is maintained at greater pressure of 3,200 psi and greater but not limited to; higher pressures of this embodiment at 36,000 psi. This embodiment of the invention applies higher pressure between the high-pressure device and the chamber fuel delivery devices greater than 3,200 psi on to the "fuel"/water to ensure liquidity of the "fuel"/water in fluid communication and at any achievable temperature as derived from a combustion engine exhaust and or electrical and or mechanical heating. The heating of the "fuel"/water enables ejection of the "fuel"/water from the combustion chamber delivery devices to cause transitions of the liquid "fuel"/water in the combustion chamber/engine cylinder. The elevated temperatures under high pressure in fluid communication and in the delivery system cause a reduction of the vaporization point upon ejection into the combustion chamber of the "fuel"/ water from over 100° C. reduced to 0° C. depending on "fuel"/water blend. The "fuel"/water temperature can increase to over 374° C. in fluid communication and in the delivery system due to continually available combustion chamber temperatures of over GC due to the inventive repositioning of either the new "fuel"/water delivery device and or the original fuel injector when retained. The "fuel"/ water delivery devices of this invention and or the original fuel injectors now have greater exposure to combustion chamber temperatures from exhaust, compression and combustion gases that can now surround the combustion chamber fuel delivery devices to heat their exterior walls. The created/invented increase in the fuel delivery devices exposure for heating is invented by enlarging the sleeves lower inner diameter or opening that locates and secures the injector/delivery device's position in the sleeve and subsequently the cylinder and or head. Such that the lower section of the sleeve that houses the delivery device/injector and or nozzle of; in direct communication with the combustion chamber and or engine cylinder allows the ambient temperatures from the compression, combustion and exhaust gases to surround and come into contact with the delivery devices outer walls where upon the walls of the delivery devices then conduct/transfer that heat into the "fuel"/water. This transfer of such extreme heat that elevates the "fuel"/ water temperature is only able to be achieved because of the use of the invented "fuel"/water at the utilised pressure for the described methodologies of extracting the 3 releases of energy of water. Further such heating is only achievable because of the applied pressure both of which combine to effect the described principles for the newly invented fuel. Such that the "fuel"/water maintains liquidity at temperature with no change/reduction to its ejected density ratio and enabling it to effect the transitioning methodology and known principles of flash boil and Thermolysis combined with the reduction in the vapor point temperature never before utilised in combustion engine. The invented and utilised sleeve design requires the invented multi-tapered outer flat O-ring seal combination to now seal the delivery device to the sleeve or where the sleeve is not required, to the combustion chamber, and or engine head and or cylinder and prevents the increased combustion pressure leakage from the use of the new "fuel"/water fuel. Standard o-ring seals fail to seal the new injector/fuel delivery device in their new location in the cylinder/combustion chamber. The invented multi-tapered seal can but not limited to; have top and bottom tapers/radiuses, the upper or top radius/taper can be a radius to match the injector/delivery device nozzle and or body and or juncture/joint as the point of contact/sealing or have opposing tappers/radiuses to seal each surface. These radiuses can be any radius to suit the delivery device/ injector usually but not limited to 45 degrees and or a matching the taper/radius to the injector/fuel delivery device at the preferred point of contact either the nozzle and or the body or both thus that the more pressure applied by the locating holding clamp the greater the pressure on both the top and bottom of the seal forcing a contact pressure seal between the delivery device and the inner wall of the sleeve. The seal is usually but not limited to; constructed of, but not limited to copper and or annealed copper to seal filling the space between the nozzle and the enlarged sleeve inner wall diameter to prevent compression and or exhaust and or combustion gases escaping to atmosphere and causing a loss of compression/combustion pressure thus preventing the engine from functioning correctly and loss of power. The designed O-ring seal has two tapers that fits between the nozzle/body of the injector/fuel delivery device such that the one taper locates and is in contact with the inner wall of the sleeve and the second taper with the external/outer walls of a nozzle and or body of a fuel delivery device/injector. The sleeve is in communication with a combustion chamber and or a cylinder in direct proximity to the engine piston of an internal combustion engine and between the external or outside of the internal engine head and or cylinder thus connecting the outside of the cylinder/combustion chamber with an internal cylinder/combustion chamber. This allows access by the injector/fuel delivery device from the outside of the engine to the inside of a cylinder/chamber. The new seal forms a seal between the components and prevents the increased internal pressure created from the "fuel"/water from escaping to atmosphere. A normal flat seal does not prevent/stop pressure leakage to atmosphere when the invented "fuel"/water is transitioned and combusted. The multi-tapered/radius seal makes a pressure contact on the radiuses and or tapered surfaces between the outer walls of the injector nozzle/body and the inner wall of the sleeve so that upon tightening the clamp that secures the injector/fuel delivery device a pressure seal is achieved between the opposing tapers thus the greater the tension/pressure from the clamp the higher the pressure that is applied in the sealing areas between the devices nozzle/body and the invented engine sleeve. The heat in the gases in the combustion chamber transfer that heat via conduction through the devices walls located but not limited to; in the sleeve to further heat the "fuel"/water stored inside. The "fuel"/water stored in the combustion chamber fuel delivery devices is either maintained or elevated further in temperature due to the injector/fuel delivery devices location in the sleeve and the invented sleeve design allowing the elevated temperatures derived from the combustion chamber gases to surround the nozzle and or body of the injector/fuel delivery devices. The "fuel"/water upon its arrival at the injector and or "fuel"/water delivery device's input is at over 115° C. at extremely high pressure described herein and preheating has occurred from the storage tank to the combustion chamber including pressure heating and component heating in methodologies and principles of this invention. The "fuel"/water is subjected to greater temperatures in the injector/fuel delivery device due to their re-positioning and re-sealing to provide a gap around the nozzle of the delivery devices thus that the hot engine gases surround the nozzle and or body of the component such exposure to combustion gases elevating the "fuel"/water temperature contained inside via conduction through the walls of the delivery device. The temperature of the delivery devices is elevated to combustion chamber temperatures. Thus elevating "fuel"/water temperature in combustion chamber devices to; or above the supercritical point of 374° C. The pressure, mixing and blending with elevated temperatures up to supercritical for the "fuel"/ water for this invention ensure the invented homogenous "fuel"/water where utilised. This homogenous liquid and or vapor blend of light non polar oils such as Diesel & Gasoline and water (the "fuel"/water) of this invention where but not limited to: fossil fuel being retained in the "fuel"/water such that the original fossil fuel can also be in a separate injection strategy from the original equipment/injector and can be but not limited to being retained as an initiating ignition and flame front thus combustion and can be utilised in conjunction with the "fuel"/water ejection, ignition, combustion processes of this invention. The use of heat and heating for the "fuel"/water incorporating the principles and methodologies of this invention and described herein are totally opposite to commonly or normally understood fossil fuel use and commonly understood fuel injection. The current principle is to cool and or keep fuel cool to maintain density and correct fuel air ratios. The applied temperatures of this invention onto the "fuel"/water can only be utilised because of the use of "fuel"/water and the applied pressure in this invention. Thus the pressure drop upon ejection of the "fuel"/water into the combustion chamber usually at; but not limited to, a combustion chamber pressure range of 150 psi to 800 psi or higher where a discharge occurs during and into a combustion event as compared to the pre-ejection pressure over 3,200 psi and as embodied herein 36,000 psi. The ejected "fuel"/water is subject to further stages of contact heating from a combustion chamber/cylinder pre and post ejection with heat from the elevated temperature of a heated intake gas charge either as a separately pre heated air charge and or the inclusion of the newly invented and combined exhaust gas/Oxygen/"fuel"/water blend now resulting from previous "fuel"/water combustion reforming/reconstituting in the exhaust. These gases will now have a relatively high water/oxygen content blend of exhaust gases, due to the reconstitution of the "fuel"/water in cooler exhaust gases as compared to the combustion temperature in the cylinder/chamber. This Water/Oxygen rich exhaust gas now performs 2 functions in a subsequent intake/compression charge of heating and enrichment, and or the fuel for the subsequent engine cycle. The exhaust containing "fuel"/water at supercritical temperatures is the same and or similar to the stored "fuel"/water in the combustion chamber delivery devices and or injectors thus that upon recycling and or retention in a combustion chamber and or cylinder elevates the starting intake gas temperatures for subsequent compression and combustion of that and or a next combustion chamber discharge from an injector and or a fuel delivery device of this invention such that the "fuel"/water content from it reconstitution in the exhaust can be of sufficient quantity to form a combustible mix for the subsequent cycle. This now also supports and or increases combustion chamber heating of the exposed injectors/fuel delivery devices to further elevate their stored "fuel"/water and or subsequently and or in conjunction the discharging/ejecting "fuel"/water into a cylinder and or combustion chamber. Through the elevated starting then final compression temperatures due to temperature increases of the intake and compressing gases in the cylinder/chamber, such that upon ejection the heated stored "fuel"/water that is increased above normally understood pre-ejection temperatures is further elevated due to the elevated ambient cylinder/chamber temperatures the invented methodologies and principles described herein and reducing the transition time of the "fuel"/water such that the fossil fuel can be, but not necessarily removed for a combustion process allowing transition, ignition and combustion of water as a singularly introduced non-combustible liquid to release 2 initial transitioning forms of energy ultimately converting to a gas not vapor as is experienced with fossil fuels and combusting as the third form of energy and can now be introduced separately as water alone and or as part of an homogenized "fuel"/water blend. The increased "fuel"/water pre-ejection temperature reduces the vaporization temperature to create flash boil and thermolysis and causes separation of the "fuel"/water where a homogenized blend is utilised. The dissimilar Liquids of water and fossil fuel with different specific densities of 0.7 for fossil fuel and 1.0 for water such that when elevated in temperature have different vapor temperatures thus that fossil fuel will vaporize at a lower temperature and with a lower ignition temperature will ignite and combust at lower temperatures, thus forming from a homogenized blend, an initial fossil fuel flame front of temperatures greater than the Thermolysis temperature of water. Thus when fossil fuel is incorporated in the combustion process either as the Homogenized blend or as a separately introduced element it can, but not limited to provide elevated temperatures for the water to perform thermolysis to form Hydrogen and Oxygen in the invented methodology in a combustion chamber/cylinder of a combustion engine. The inclusion of Bio/Fossil fuels either applied as an original ejecting volume and or in the "fuel"/water homogenized blend of this invention can either aid and or elevate the water component to its temperature or point of transition as described herein to effect the release of the 3 sources of energy from water and ultimately causing the 3rd stage combustible gas to ignite and combust in the combustion chamber providing the final energy expansion. The heat of a previous ignition/combustion processes of fossil fuel and or "fuel"/water in an internal combustion engine causes residual heat, up to and or greater than supercritical temperature of the "fuel"/water. The other major heat source in an internal combustion engine is the flame front and combustion from either the original fossil fuel and or the "fuel"/water. Where the fossil fuel is removed from the "fuel"/water either as part of the processes described herein or because it's not included as the "fuel"/water or the water is treated as described herein for this invention can effectively transition separately into its other states releasing its energy from the transition process to release combustion energy in a combustion engine using non-combustible liquid and vapor to ultimately formed into combustible gas. As normally understood this use of "fuel"/water utilises totally opposite principles, functions and methodologies compared to known with fossil fuel use. Both pre-combustion transitions of "fuel"/water are usually but not limited to formation in the combustion chamber/cylinder. Vapor formation from "fuel"/water is not a combustible liquid vapor and is totally and completely opposite to liquid vapor Bio/Fossil fuel conversion/transition functionality principles methodologies, compared to the "fuel"/water its principles, methodologies functions and components.

The liquid and or vapor from the "fuel"/water is not combustible and provides initial energy via thermal expansion from flash boil and Thermolysis in a combustion chamber. The "fuel"/waters transitioned vapor in this embodiment of the invention is; but not limited to; a non-combustible combination of fossil fuel and water, as "fuel"/water homogenously formed as a single liquid and or water/vapor alone and can be, but not limited to; formed in fluid communication in the delivery system and or in the combustion chamber of an internal combustion engine prior to or during an ignition combustion process. Fossil fuel only changes 1 state into combustible liquid vapor. That transition itself does not contribute energy through increase in combustion chamber pressure from that transition and requires ignition and combustion of fossil fuel to create its expansion pressure and release of its single energy source and the only energy from fossil fuel. Conversely the "fuel"/water of this invention is totally opposite and different to any other fuel currently known with new functions, new principles and achieves two changes of state of the "fuel"/water in but not limited to; in a combustion chamber/cylinder of an internal combustion engine. The 2 releases of energy from the "fuel"/water occur pre-combustion culminating in a final combustion of the derived gases Hydrogen and Oxygen being the third and final release of expansion/pressure energy of the "fuel"/water. The creation of energy through the expansion pressure formed in the combustion chamber and applied to the top of an engine piston from the 2 initiating transitions of "fuel"/water forming non-combustible vapor, followed by the formation of a gaseous state is; prior to ignition or combustion at this point, providing similar or greater expansion pressure/energy in a combustion chamber than fossil fuel combustion alone to move a piston of a combustion engine without the combustion of the "fuel"/water. The transition pre-combustion of the new "fuel"/water to non-combustible liquid vapor is totally opposite to normal Bio/Fossil fuel as commonly understood as it forms combustible vapor. In this invention an energy is derived/provided to the combustion chamber/cylinder through the physical expansion/transition of "fuel"/water as it changes from non-combustible liquid to non-combustible vapor in a combustion chamber. The combustion chamber pressure increases through physical expansion of the "fuel"/water during transition which provides that the "fuel"/water expands minimum by volume of 1600 times its original volume in the cylinder/chamber transitioning into non-combustible vapor. Expansion further occurs 200 times by volume when "fuel"/water's non-combustible liquid vapor transitions from that vapor to gases of Hydrogen and pure Oxygen. No ignition/combustion has occurred at this point for the "fuel"/water within a combustion chamber/cylinder of an engine. The processes created by this invention creates a two stage transitioning process known firstly as Flash Boil and secondly as Thermolysis which can cause separation of the invented homogenized blend. These multiple transitions of the "fuel"/water as defined herein now occur in, but not limited to; and for this embodiment within the combustion chamber of an internal combustion engine, prior to; and or in an ignition and or combustion and or exhaust process to cause over 1.27 times more pressure/energy than Bio/Fossil fuel combustion alone through the transitions without the combustion of the "fuel"/water as compared to normal fossil fuel combustion at similar liquid volumes. The new "fuel"/water transition energy alone, can provide more expansion pressure/energy in the combustion chamber without combustion compared to the combustion of equivalent volumes of liquid fossil fuel alone, providing up to; and over a minimum of 1.27 times more pressure/energy in the combustion chamber from the transitioning without combustion of the "fuel"/water. In fossil fuel conversion from fluid to a vapor state it only provides a 9 times expansion of volume, providing insufficient expansion energy/pressure to move a piston and relies on the combustion of the liquid vapor alone in contrast to the function to the function of the new "fuel"/water created by this invention. The piston of a combustion engine will only move when fossil fuel alone is used, when fossil fuels combustible liquid vapor is ignited and combusted. Combustion of fossil fuel provides an average 1400 to 1600 times expansion energy of its own volume when ignited and combusted, not transitioned and is less than the combined transitioning of 1800 times expansion by volume for the new "fuel"/water of this invention.

The new "fuel"/water provides through transition more expansion pressure/energy to the combustion chamber without being combusted. The subsequent ignition/combustion of the final stage of transitioned "fuel"/water from the predominate gases of Hydrogen/Oxygen and provides a further 2.4 times greater energy than that of combusting fossil fuel at comparative liquid volumes, thus the new "fuel"/water has an expansion ratio of approximately 2,920 times by volume. Net pressure/energy from the new "fuel"/water in comparative volumes to fossil fuel alone is greater than 2.08 times more energy provided by the "fuel"/water in a combustion chamber/cylinder using comparative liquid volumes, thus reducing the use of fossil fuel when "fuel"/water is used by over of 60% up to 100% reduction of fossil fuels the original fossil fuel volume whilst providing the original energy to the engine. The invention applies heat to "fuel"/water in; but not limited to;—fluid communication, delivery systems, storage areas, heating components including all the heat exchanging methodologies and heat exchangers of this embodiment and the invention; and or in the combustion chamber of a combustion engine either but not limited to compression/ignition and or exhaust strokes of an internal combustion engine. Combustion chamber/cylinder heat is produced in the compression/ignition and or exhaust strokes, and or found in exhaust and or compression gases producing a residual and or ambient combustion chamber heat of over 200° C. with heat of combustion and flame fronts at over 1800° C. of either or both the original Bio/Fossil fuel and or the Bio/Fossil fuel found in the "fuel"/water homogenized mixture and or the water alone. The water (Hydrogen/Oxygen) combustion can further elevate the combustion temperature thus directly heating/elevating the chamber/cylinder temperatures to conduct/transfer greater heat from the flame front and combustion process into the combustion chamber delivery devices and the subsequent ejected "fuel"/water discharges which are usually but not limited to; in direct communication with the combustion chamber/cylinder and or the hotter exhaust gas from the Hydrogen and Oxygen combustion. This elevated temperature from the gases of water can further elevate the temperature of the injectors/fuel delivery devices that via conduction through the walls can increase the temperature of the "fuel"/water above 450° C. thus enabling the transition and ignition and combustion in a combustion cylinder/chamber of water alone. The injector/devices transfer the heat directly to the stored "fuel"/water inside thus, achieving; maintaining or increasing the temperature of the stored "fuel"/water to above 374° C. its supercritical point/temperature up to the exhaust and intake compression temperatures of each specific engine cycle prior to ejection and now subject to greater temperatures normally found with Bio/Fossil fuel ignition/combustion with the use of water as described herein, thus providing even greater elevation from cylinder/chamber ambient temperatures to heat the injector/delivery devices and the ejected "fuel"/water causing the ignition and combustion of water alone and or "fuel"/water of this invention. The "fuel"/water in a combustion chamber delivery device for this invention is maintained under high pressure by the high pressurizing pressure device in fluid communication in the delivery system. The "fuel"/water can be at any temperature above 100° C. at 40 psi and above, its supercritical temperature ensuring a homogenous liquid in fluid communication in the delivery system. The elevated temperature of the liquid "fuel"/water stored in the combustion chamber delivery devices at pressure enables the first applied principle of Flash Boil of a liquid for the first stage transition upon ejection of the "fuel"/water into the combustion chamber. When the "fuel"/water is ejected at elevated temperatures the vapor point or temperature of it conversion has reduced to 0° C. down from over 100° C.

substantially up to 100 percent conversion to a vapor upon ejection in reduced combustion chamber/cylinder pressures. The pressure drop assists the completion of that transition also due to the elevated temperatures of the combustion chamber gases the "fuel"/water is ejected into. The induced transition from non combustible vapor to a combustible gas is assisted and supported by elevated pre-ignition temperatures at combustion chamber reduced pressure when ejected "fuel"/water enters the combustion chamber thus causing and or assisting flash boil reaction. The greater the ambient temperature at the reduced pressure in the combustion chamber further assists the next step/process in the invention of thermolysis. Thermolysis a known process never applied to a combustion engine normally occurs at 1800° C. at 1 atmosphere, due to the inventions parameters described herein causing both the vaporization and point of Thermolysis are reduced thus causing/assisting the 2 transitions within the combustion chamber/cylinder at the ambient temperatures and lower pressures than that of the "fuel"/water delivery system. This includes but not limited to combustion chamber delivery devices and their storage areas. Flash boil is the thermal expansion/transition of the non-combustible liquid "fuel"/water into non-combustible vapor. The thermolysis process however creates the combustible gas as well as contributing to the total expansion pressure from transition of the non-combustible liquid and vapor. This liquid and vapor as transitioned as the "fuel"/water upon ejection from the combustion chamber delivery device can but not limited to; forming in a combustion chamber due to the reduced vapor point and chamber/cylinder pressure and the elevated ambient cylinder/chamber temperatures, compared to the "fuel"/water delivery system thus "fuel"/water transitions via flash boil forming non-combustible vapor and completes thermolysis into a combustible gas either as a supplied fuel and or a retained/reconstituted "fuel"/water in the exhaust gases retained or supplied separately to the chamber/cylinder. Flash boiling and transitioning of the "fuel"/water occurs because of a combination of elevated pre-ejection pressures and temperatures in the delivery system which exceed the combustion chamber pressures causing pressure differential and reduction in pressure of the "fuel"/water upon ejection into a combustion chamber. As the "fuel"/water is ejected from the combustion chamber delivery device and or an injector, a further temperature elevation of the "fuel"/water occurs in the hot gases within the combustion chamber/cylinder with the "fuel"/water already heated above normal or known operating temperatures for Bio/Fossil fuel. The hotter than standard and or commonly understood and known combustion chamber/cylinder temperatures can be gases of; but not limited to exhaust or compression gases utilising preheated intake charges and are; but not limited to being equal and or hotter than the temperatures of the ejected "fuel"/water upon ejection. The temperature can be at, but not limited to; in excess of 200° C. under compression or exhaust gas retention in the cylinder/chamber. The "fuel"/water is subjected to the pressure drop/differential between the delivery system and the combustion chamber/cylinder that not only provides the conditions for Flash Boil into a non-combustible vapor from the liquid "fuel"/water but in addition the high ambient temperatures of over 200° C. in the combustion chamber/cylinder collaborate to assist in the initiating and or completion of the transition for Thermolysis and formation of the combustible gases of Hydrogen and Oxygen. Ambient combustion chamber/cylinder temperatures can reach over 600° C. pre-ignition on compression and greater when exhaust gases are retained and or utilised and or heated intake charges are creating temperatures greater than the Supercritical temperatures. Flame front and combustion temperatures reach over 3000° C. in the combustion chamber thus providing temperatures in excess of the known Thermolysis temperature of 1800° C. and above the discovered/invented Thermolysis temperatures of below 1800 degrees of this invention. The newly discovered and invented Thermolysis temperature is a reduced temperature as compared to the commonly known temperature that when the "fuel"/water and or water under extreme pressure and also elevated in temperature pre-ejection up to and above its supercritical temperature that upon ejection the "fuel"/water transitions immediately from liquid to vapor to gas with the temperature the "fuel"/water having a vaporization point of 0° C. causes a reduction in the temperatures required for all phases of transition allowing the invented process of Hydrogen and Oxygen creation in a combustion chamber/cylinder of an internal combustion engine from a non-combustible liquid. The "fuel"/water instantly transitions and physically expands in approximately 1 to 2 micro seconds forming a non-combustible liquid vapor. The higher (over 374° C.) combustion chamber ambient temperatures compression and or ignition and or combustion that the incoming "fuel"/water are exposed to and combining with a pressure differential drop between the "fuel"/water in fluid communication and or in the delivery system and the combustion chamber/cylinder cause an instant conversion from liquid to vapor to gas. The transitioned "fuel"/water as a vapor in this invention and unlike normal fossil fuel vapor is not combustible at this point as discussed and totally opposite in characteristics and normal and commonly understood fossil fuel. However, the new "fuel"/water has released its first energy source in the combustion chamber/cylinder through its expansion delivering pressure/energy as discussed for this invention. The vaporization point of the "fuel"/water of this invention is reduced to an average of 0° C. due to its elevated temperature in the delivery system under pressure which subsequently reduces the initiating temperature of Thermolysis to less than its known 1800° C., thus transitioning the non-combustible liquid "fuel"/water and vapor into combustible gas predominately of Hydrogen and pure Oxygen at or near the auto-ignition point of Hydrogen. The new and invented principles and methodologies of this system and new applications for this invention ultimately creating combustible gas from non-combustible liquid and vapor whilst utilising the energy of said liquid and vapor during transition and or formation of a gas in but not limited to a combustion chamber/cylinder of an internal combustion engine. This process and application is not currently used, understood or associated with fueling or powering of an internal combustion engine. Thermolysis of water either on its own or as part of "fuel"/water whether supplied separately or as a homogenous fluid is not known or commonly understood in the use of powering an internal combustion engine. The "fuel"/water whether combined in fluid communication, or in the delivery/storage system and or combined in the combustion chamber/cylinder and utilising the methodologies and principles of this invention ultimately causes the formation of the gases Hydrogen and Oxygen. The formation of the gases of Hydrogen Oxygen provides the third release of energy through expansion from ignition and combustion of the gases derived from the "fuel"/water of this invention. The temperatures found in the combustion chamber and the flame front of over 1700° C. are greater than the known temperature point of thermolysis and the newly invented temperature point for Thermolysis achieved by the invented processes, methodologies, and specification as described herein. Whilst the auto-ignition point of Hydrogen has remained the same the invented methodology of multiple cylinder/chamber discharges of the "fuel"/water utilises the increased combustion temperature such that an initial discharge of "fuel"/water further increases the available heat for subsequent discharges. This creates multiple flame fronts of Hydrogen and Oxygen able to ignite subsequent discharges of "fuel"/water to self-propagate a combined combustion effect and increase overall power/energy that is achievable in a cylinder/chamber. Hydrogen will combust within a range of Hydrogen to Oxygen mix of 8% to 95% oxygen under pressure in a combustion chamber/cylinder thus that it will self-combust without adding outside intake air, allowing greater exhaust retention or recirculation for total intake temperatures of an intake charge and or compression temperatures and or all combining for a total increase in cylinder/chamber compression temperatures without diluting the explosive charge/energy to produce, support, initiate, and or complete all the transitioning and ignition features as invented here to release the energy of a non-combustible liquid/vapor to produce a combustible gas for a final release of energy. The heating of the non-combustible "fuel"/water vapor to each its gaseous state of Hydrogen and Oxygen is completed in 1 to 2 micro seconds enabling the combustion of those gases within the operation time frames of normal combustion. The final phase of heating of the injecting "fuel"/water in this embodiment of the invention occurs in a flame front and or combustion. The flame front can be formed in any one of the following ways:—1 auto-ignition of the "Fuel"/water; 2 the auto-ignition of the water only; 3 the auto-ignition of any fossil fuel whether combined with the "fuel"/water or where fossil fuel is retained in its original introduction in a combustion chamber or any combination to form an initiating flame front/heat source for transitioning and Thermolysis of the injected "fuel"/water as defined by this invention. The fossil fuel can create an initial flame front with its temperature to combine with pressure, ambient ejection temperatures, the reduction in the vaporization and Thermolysis temperatures at pressure can complete homogenization of the "fuel"/water and vapor where that process has not been completed in fluid communication. This invention for "fuel"/water can cause an initiating flame fronts due to reduced vaporization point of 0° C. of the "fuel"/water being ejected into ambient temperatures in the combustion chamber/cylinder of over 500° C. Meaning the second transition of the fossil fuel either within the "fuel"/water or where fossil fuel alone is injected/introduced separately to the cylinder/chamber has an auto-ignition point ranging normally between 600° C. to 700° C. verses the auto-ignition point of Hydrogen at 1000° C. Meaning the Hydrogen will ignite and combust later than the fossil fuel which will produce a flame front of 1800° C. and greater the temperature of over 1800° C. in the flame front and either as compression ignition and or spark ignition flame front the temperature range between 1,800 to 3,500 Degrees Celsius depending on engine load, engine speed and other operational Bio/Fossil fuel component of the "fuel"/water will ignite first thus forming gas via thermolysis. The resulting Hydrogen ignition and combustion can produce greater flame front temperatures due to the available pure Oxygen from the "fuel"/water. This is enhanced by the invented multiple ejecting discharges to form greater flame front temperatures which in turn allows greater overall volumes of discharging "fuel"/water to transition and ignite. This strategy allows the invented lineal increasing volumes of ejecting fuel water producing more energy in the combustion chamber and engine power output. This staged or staggered increase allows reduced throttle opening to limit the required volume of original fuels where retained in the injection process of the fossil fuel for an external flame front. The heat/temperature of the combustion chamber provide to the "fuel"/water 3 heat sources, the above mentioned ambient temperatures from exhaust gases and the heat from compression gases; and finally the heat provided by the combusting "fuel"/water as the third phase of heating comes from the combustion chamber flame front and provides the final heating phase for the "fuel"/water to complete the final transition of the "fuel"/water to vapor to a combustible GAS of Hydrogen and an oxidizing gas of Oxygen. This combustible GAS from the "fuel"/water has an auto ignition temperature of between 600° C. and 1; 000° C. depending on the volume of fossil fuel in the "fuel", where water only is utilised the auto-ignition temperature is 1000° C. causing instantaneous ignition in the minimum 1,800° C. temperature of the flame front. The application of heat to the fossil fuel where fossil fuel is used causes an increase in temperature of the fossil fuel either injected as standalone fluid or as incorporated in the "fuel"/water of this invention as a combined fluid with water in this invention herein called "fuel"/water. The heating to supercritical temperatures of the "fuel"/water under pressure in the fuel delivery system in fluid communication between the storage tank and the injector and subsequently in the temperatures of a combustion chamber upon ejection causes the "fuel"/water to form homogenous fluid due to the changes in characteristics of supercritical water allowing that water to accept/blend/mix into one fluid with nonpolar fluids. Light oils such as Diesel and Gasoline are nonpolar light oils and by heating the "fuel"/water to the super critical temperature of water the "fuel"/water blends into a homogenous single liquid. The Supercritical temperature of the "fuel"/water combines with the mixing fuel rail and pressure in fluid communication and delivery system, the injectors and the combustion chamber and process enhancing the homogenous combining of the "fuel"/water within the limited time contained in this process from first pump to ignition of the "fuel"/water. The mixing fuel rail in fluid communication between but not limited to the high-pressure pump and the injectors in this embodiment of the invention. The features of this invention provide blending of the two normally dissimilar liquids and further assists in transition and ignition properties when delivered into a combustion chamber of an Internal combustion engine through flash boiling, being the conversion of a liquid to a vapor. The applied pressure as part of this invention in fluid communication and in the delivery system combine to assist with formation of homogenous "fuel"/water and causes the flash boil and or creation of the non-combustible vapor in the combustion chamber due to extreme pressure drop between the delivery system and when the "fuel"/water is ejected into the combustion chamber. The flash boil of the liquid "fuel"/water provides the initiating basis for combustible gas formation the Thermolysis, in a combustion chamber of an internal combustion engine. Flash boil of the "fuel"/water due to this inventions pressure differential at whilst the "fuel"/water is at super critical temperature produces a 0 Degrees Celsius vaporization point for the "fuel"/water upon ejection into the combustion chamber. The combined processes and methodologies of the application of heat, pressure and pressure reduction and further heating again under the principles of this invention facilitates the extraction of the available energy and transition/ignition of the non-combustible "fuel"/water releasing 3 individual sources of energy in but not limited to; a combustion chamber of an internal combustion engine. By comparison fossil fuel alone has a single energy release only, as found or commonly understood with fossil fueled engines. This invention through the inventive processes and principles have added 3 new and different releases of energy from the "fuel"/water. Supply of the water either standalone or as "fuel"/water through the use alone has a single energy release only, as found or commonly fossil fuel alone allowing the reduction and or removal of fossil fuel from the "fuel"/water whilst still providing the expansion pressure/energy to operate the engine. The heating of the non-combustible water transitions that water in but limited to; the combustion chamber of combustion engines to release 3 individual energy sources expansion pressure/energy which is applied to the top of the piston forcing the piston down the cylinder as normally understood. The "fuel"/water is ignited either by compression ignition and or spark ignition for this invention, where the "fuel"/water delivered to the combustion chamber the transition process is the same, resulting in the "fuel"/water reaching gaseous state for ignition. The "fuel"/water whether in fluid communication or in the combustion chamber is non-combustible vapor and only when subject to the inventive processes, methodologies and systems of this invention. Heat, pressure, pressure reduction and heating again causes the transition to a combustible gas. The stored liquid "fuel"/water in this embodiment but not limited to; receives minimal heat in the storage area insufficient for supercritical temperatures. The water and or "Fuel" is supplied via fluid communication through a filter to a primary low-pressure supply pump. The fossil fuel can be supplied separately and or; but not limited to a low-pressure pump to mix in fluid communication. Fossil fuel input for the "fuel"/water in this embodiment is usually but not limited to the input of the low pressure first pump in this embodiment. The pump can be external or internal to the storage tank. The low-pressure pump in turn through fluid communication supplies the "fuel" to a secondary high-pressure pump via a first heat exchanger in fluid communication. The "fuel" can be heated anywhere between in the storage tank to the combustion chamber inclusive whilst in fluid communication at various temperatures and in any component in the delivery system of this invention between the tank and combustion chamber inclusive. The "fuel"/water under multiple and increasing levels of pressure while in fluid communication maintains liquidity whilst being heated and supplied to the combustion chamber. The increasing pressure on the "fuel"/water allows increased temperature, proportionate to that pressure thus providing conditions for temperature elevation in each stage from the tank to the fuel injector. The fuel injector provides the necessary basis for the next stage of heating in this embodiment of the invention for "fuel"/water whilst in fluid communication in the combustion chamber/cylinder in this embodiment but not limited to; "fuel"/water delivered in fluid communication directly into the combustion chamber/cylinder being ejected from the nozzle of the injector, where the "fuel"/water experiences a reduction in pressure and the final 2 stages of "fuel" heating. The increase in temperature of the "fuel"/water in the combustion chamber/cylinder is due to the ambient temperatures of the chamber/cylinder of 374° C. and higher. That increase in temperature and reduction of pressure from the delivery pressure ranges of this invention of upward of 3200 psi (there is no upper limit) and only limited by current technological limitations of pumps, injectors, supply lines and associated components of the delivery system. The 3,200 is the minimum pressure for the supercritical "fuel"/water of this invention. However, this invention utilises but not limited to 36,000 psi in fluid communication in the delivery system, which supports the pressure differential between the delivery system and the combustion chamber/cylinder of between 700 and 1500 psi. The combustion chamber pressure is not limited other than to be below that of the delivery system for the pressure differential thus an added benefit in the transition process. Whilst this invention utilises the pressure differential and pressure drop from higher pressure in delivery system to the lower pressure in the combustion chamber/cylinder to perform the first transition of the "fuel"/water, this is further supported by the elevated temperature of the "fuel"/water in fluid communication in the delivery and supply system of this invention. The elevated temperature to supercritical levels at the higher pressure work together to effect the first transition. The first transition has a third effect in the combustion chamber to form part of the first transition process which is another phase of heating, being the compression heat created in the combustion chamber which in this invention ranges from supercritical temperature to over 1000° C. This inventive process and methodologies differ completely from; and are not found or understood to work/perform/function in normal and or normally understood process of fuel injection or supply of fossil fuel to a Internal Combustion Engine which only convert the liquid to a vapor in a single function to provide the energy through combustion of that vapor with no other energy provided to the combustion chamber from fossil fuel alone.

There are 8 individual phases or stages in the heating of the fluid to cause gaseous state in the combustion chamber. The "fuel"/water in fluid communication is heated progressively in stages in respect to the applied pressure in the stages described herein, to maintain its liquid state whilst in fluid communication between the tank and the "fuel"/water delivery device. The "fuel"/water is subject to multiple pressures and pressure through thermal expansion of the liquid whilst being heated in fluid communication. The pressure also assists in creating an increase in temperature of the "fuel"/water. The second heating device for the "fuel"/water distribution component is invented to be utilised between the high pressurisation device and the "fuel"/water delivery device of the combustion chamber. The invented component both distributes to the fuel and or "fuel"/water to the delivery device but also heats the "fuel"/water. The later methodology is self-serving as the greater the heat the greater the expansion pressure therefore the greater the heat, whilst supporting the maintenance of the liquid state including the "fuel"/water storage areas in the "fuel"/water delivery device. The "fuel"/water delivery device provides heating of the "fuel"/water under pressure as part of this invention within the fluid communication. The combustion chamber delivery device is exposed to exhaust and compression temperatures to heat the exposed nozzle in fluid communication with the combustion chamber. The exposed outer wall of the injector in turn absorbs heat from the combustion chamber and transfers to the contained "fuel"/water that's under pressure in the "fuel"/water delivery device. The applied pressure from the high pressurization device of this invention that maintains the pressure on the "fuel"/water in a liquid state of water and or water and fossil fuel combined and maintains the fuel and or "fuel"/water in a liquid state in fluid communication at temperature. The final 2 stages of heating of the "fuel"/water are effected at reduced pressure as compared increasing "fuel"/water temperature up to and greater than its Supercritical point. The applied pressure from the high-pressure pressurising device/pump combined with the thermal expansion pressure due to increased temperature of the "fuel"/water now causes the pressure to exceed 3200 psi without physically increasing the device/pump output pressure thus causing the required minimum pressure in fluid communication/delivery system for liquidity of the "fuel"/water. The induced transition of this invention of the "fuel"/water in the combustion chamber is due to the reduced pressure found in the combustion chamber as compared to the high pressure applied to the "fuel"/water in fluid communication in the delivery system at the temperatures defined in this invention to the "fuel"/water in fluid communication and or in the delivery system of this invention in an engine creates the principle of flash boil which as commonly understood is a process not used in the delivery of fuel to a combustion engine. Flash boil is the known process of changing the state of; in this case the liquid "fuel"/water into a vapor. This transition is caused through the reduction of pressure on the heated/supercritical "fuel"/water in fluid communication transfers from the delivery system at higher pressure including but not limited to: the injectors and or high-pressure pumps of this invention to an area of lower pressure within the combustion chamber. The pressure in the delivery system ranges from but not limited to 3200 psi to over 36000 psi depending on available equipment and technology. In this invention the "fuel"/water in fluid communication in the delivery system is under pressure. That pressure applied to the "fuel"/water and the subsequent pressure reduction upon ejection of the "fuel" into the combustion chamber at a lower pressure creates a dramatic pressure differential causing the "Flash Boil". Flash boil initially changes the state of the water into non-combustible liquid vapor the elevated temperatures of the combustion chamber cause further heating of the vapor at the reduced pressure and in doing so commences the last transition called Thermolysis which is the transition or formation of a gas from a liquid through the application of heat to that liquid. In this invention and embodiment the thermolysis process transitions non-combustible liquid into a non-combustible vapor then to a combustible gases Hydrogen and Oxygen. Thermolysis is achieved by injection of supercritical temperature "fuel"/water at extreme pressures into elevated temperatures and reduced pressure of the combustion chamber ultimately into elevated temperatures of the flame front of the igniting fossil fuel either as s separately introduced fuel and or as part of the "fuel"/water of this invention described herein. The fossil fuel can be part of the "fuel"/water or introduced separately as normally found in fuel injection of fossil fuel in internal combustion engine. The flame front provides the final stage of heating aiding in the thermolysis process of the "fuel"/water. The "fuel"/water can be, but is not limited to, pre-mixed to form a homogenous fluid in fluid communication either prior to the combustion chamber or in the combustion chamber as part of the combustion process and introduced as a separate supply of fossil fuel. The transitioning of "fuel"/water via flash boil and thermolysis causes 2 events of energy release.

The energy release occurs via the expansion of the "fuel"/water during its transition providing pressure/energy to the top of the piston at top dead centre to move that piston down a cylinder bore rotating the crankshaft of an internal combustion engine. From a liquid to a vapor to gas in the combustion chamber. Water transitioning causes expansion and increase in combustion chamber/cylinder pressure. The increase in pressure in the combustion chamber through the two initial events of expansion and pressure; vapor and gas formation from the water followed by ignition of the gases Hydrogen/Oxygen cause a further expansion pressure event, again adding to the total pressure/energy. The increase pressure in the combustion chamber resulting from expansion of the "fuel"/water to vapor followed by a further increase in pressure when the gases of Hydrogen and Oxygen is formed. This increasing the overall pressure to greater than that of fossil fuel alone and forces the piston down at a much greater rate with increased energy. This added pressure from the transitioning "fuel"/water alone is greater than that derived from an equivalent volume of fossil fuel being ignited and combusted. A reduced volume of fossil fuels is now introduced into the combustion chamber for combustion energy to maintain the original energy required by the crankshaft to rotate and operate the engine normally. The reduction so significant the engine will now operate normally on the equivalent volume of fossil fuel that is required to idle the engine rather than the added volumes for engine speed/load or performance, function is now carried out by transitioning and combust water.

The pressure derived from transitioning water and combustion of Hydrogen and Oxygen when applied to the top of the piston whilst said piston is at top dead centre on but not limited to; the compression stroke of a combustion engine will substantially replace the expansion energy/pressure derived from oxidation/combustion of fossils fuels in the same combustion chamber. The expansion pressure/energy whether from fossil fuels or "fuel"/water of this the engine connecting rod causing the crankshaft to rotate and the invention causes the piston to move down the cylinder and via the engine to operate the storage unit/tank that holds the non-combustible "fuel"/water can be of any shape or size with two inlet points and two outlets. A first inlet point is for filling the tank with "fuel"/water, a first outlet acts as a breather. A second inlet point is for return "fuel"/water to the tank from the delivery system. A second outlet is for fluid communication for the delivery system with the non-combustible "fuel"/water to the combustion chamber via the various pumps, heating components in fluid communication in the "delivery system", The return "fuel"/water can act as a first phase heat source to pre-heat the "fuel"/water stored in the tank. This type of heating occurs because the heating of the "fuel"/water in fluid communication in the delivery system between the storage tank and the combustion chamber described herein. The stored "fuel" in the tank will heat to between 40° C. and 115° C. depending on the volume of return "fuel"/water and the volume of stored "fuel"/water to act as a pre-heater elevating the temperature of the "fuel"/water in fluid communication with the delivery system to the combustion chamber. In fluid communication from the tank to the combustion chamber there is provided a filter of the tank that will heat to between 40° C. and 115° C. depending between 6 to 12 microns to filter the "fuel"/water pre the combustion chamber. From the storage tank through the filter system the "fuel"/water supplied to the primary low-pressure pump. In a second embodiment, the fossil fuel is supplied directly to the low-pressure pump preferably but not limited to the input side of the pump so that the fossil fuel is drawn into the pump to commence mixing with the water to form the new "fuel"/water in the new inventive process of this invention. The primary pump in this embodiment has a supply pressure to the high-pressure pump from 1 psi to 200 psi. In fluid communication between the two pumps in the "fuel"/water is supplied through a first heat exchanger to ensure the temperature of 40° C. to 200° C. and the pressure within the delivery system prior to the high pressure pump can exceed the low-pressure pump supply pressure due to expansion pressure of the "fuel"/water whilst in fluid communication due to the heat supplied to that "fuel"/water causing the expansion of the liquid "fuel"/ water. In this embodiment the fossil fuel can be supplied in fluid communication via the delivery system as an input or intake via the low-pressure pump and low-pressure section of this embodiment of the invention supply for mixing with the water to form the new "fuel"/water in the delivery system in fluid communication whilst subject to heat and pressure. The fossil fuel in this embodiment can be pre-heated in the return "fuel"/water from the engine. "fuel"/water can also be pre-heated in the fuel tanks or in fluid communication in the storage tank and between that, the engine and or a low-pressure supply pump of this invention for the new "fuel"/water. The pumps can be any type including but not limited to an electric pump. The "fuel"/water in fluid communication enters the second phase of heating in a first heat exchanger located between the two pumps. That heat utilises the cooler exhaust gas, supplied to the heat exchanger component located after the exhaust gas has exited the exhaust manifold of the engine where the gases have a reduced temperature. The "fuel"/water is heated to its highest temperature without boiling in fluid communication lines or heat exchanger prior to being received by the high-pressure pump. The "fuel"/water is heated to its maximum, ranging from 1° C. to 200° C. the pre-boiling point in this invention whilst maintained as a liquid because of the applied pressure from the low pressure primary pump of 100 psi in the fluid communication between the first heat exchanger but prior to the high pressure pump receiving the "fuel". Where a primary pump is utilised that has a higher initial pressure the supplied "fuel"/water temperature to the high pressure pump from the second phase heating in the first heat exchanger is greater up to the operational limits of the high pressure pump; or the heated pre-boiling point of the "fuel"/water dependent on the continuous pressure. Temperatures can exceed 200° C. with sufficient pressure in the secondary phase. The method of heating the water in the secondary phase can be any type of heat exchanging utilising any heated components produced by a combustion engine whether naturally produced or artificially generated such but not limited to an electrical heater element. The fluid communication continues from the secondary heating phase in the first heat exchanger and then supplied into the high-pressure pump where the internal pump pressure causes a further elevation in the "fuel"/water temperature within the pump. The increase in temperature is relative to the starting temperature of the "fuel"/water being received from the first heat exchanger after phase 1 and 2 of the heating process. Prior to the "fuel"/water exiting the high pressure pump the internal volume of "fuel"/water within the high-pressure pump is further heated through the applied pressure on to the fluid. This applied pressure to the "fuel"/water in this embodiment of the invention is up to 36,000 psi but is not limited to this and is governed by the limits of pumps and fluid communication lines. The "fuel"/water will continue to heat through the continued applied high pressure in the fluid communication lines and components between the high-pressure pump and the combustion chamber. The fourth phase of "fuel" heating is within the unique inventive fuel rail which acts as a second heat exchanger component that receives heated elements from the engine, including but not limited exhaust gas and or hot fluids such engine coolant, oils or an electric heater. The "fuel"/water rail is a unique multi-functional component of this invention performing "fuel" distribution to individual injectors or cylinders of the combustion engine and; combined as a fourth phase second Heat exchanger component to further elevate the "fuel" temperature to supercritical temperatures of the "fuel" whilst in fluid communication under extreme pressures provided and described herein.

A third function of the distributing heat exchanging "fuel"/water rail is to act as a mixer. This is achieved by agitating or swirling the "fuel"/water as it travels/moves through or from the input port/s of the "fuel"/water rail to the individual outlets and or distribution points of the "fuel"/water rail that supply each individual injector. In this embodiment the "fuel"/water rail holes receiving the high pressure "fuel"/water are riffled meaning a swirling/rifling pattern is machined into the outer face of the inside of the port to cause the flowing "fuel"/water to rotate within the rail tube holes whilst being heated to cause blending into a single homogenous fluid. In this embodiment of the invention this second heat exchanger utilises exhaust gas to heat the fuel rail to heat the "fuel"/water. The use of the exhaust gas in this location is to draw off the pre-cooled exhaust gas to extract the heat at its hottest point. The exhaust gas is either in whole or in part utilised as a heat source in this embodiment. The gas is transferred to the separate heat exchanger "fuel" rail distribution component to heat the "fuel"/water inside. The heat and the high pressure imposed on the "fuel" whilst in fluid communication causes a next stage of heating and mixing the "fuel" into a homogenous single fluid whilst maintaining liquidity at temperature. The mixing and or combining of fossil fuel and water as "fuel"/water is further supported as the temperature reaches supercritical point of water at 374° C. in the delivery system of this invention which allows the supercritical water to mix with light oils such as Gasoline/Petrol and Diesel as homogeneous liquid. As back ground of this principle it is generally known that water will not mix or combine with oils however when the water is elevated to its supercritical point of 374° C. its state alters and will form "fuel"/water combination in this invention. As commonly understood, the various types of Bio/Fossil fuels are oil based fuels of varying densities, averaging 0.7 as compared to water with a density of 1.0. It is also commonly understood that water and oil will not normally mix or form a new combined/homogenous fluid. Water under normal circumstances is almost uncompressible and with a low thermal expansion rate, high dielectric constant and an excellent solvent for electrolytes. This completely alters at supercritical temperatures of 374 Degrees Celsius and above. Water at supercritical temperatures becomes, compressible, expandable for self-pressurization in fluid communication, and becomes very poor dielectric and solvent for electrolytes and now mixes with nonpolar liquids and other nonpolar substances such as Diesel and Gasoline as light oils are nonpolar fluids therefore by use of this invention and new processes and principles applied to fossil fuel, a homogeneous "fuel"/water blend can form at temperature, pressure and mixing in fluid communication, in the delivery system, the combustion chamber and or in the combustion process at the range of temperatures for this invention at specific stages of this invention near or exceeding the supercritical point or under the compression pressure of 150 psi to 1,500 psi at 200 to 3,300 Degrees Celsius in the combustion chamber.

The 36,000 psi pressure produced for this invention in fluid communication between the high pressure "fuel"/water pump and the injector nozzle of this invention exceeds the known minimum pressure of 3,200 psi required for liquidity of a fluid for supercritical temperatures of the "fuel"/water of and for this invention.

The pressure and temperature of this invention exceed known minimum requirements for supercritical temperatures of this fluid in a liquid state combined herein as "fuel"/water of this invention and causes the two normally chemically opposed fluids to blend/mix into one homogeneous liquid. The pressure on the "fuel"/water whilst in fluid communication in the delivery system of this invention enables further heating via the direct communication of the injector nozzle located in the combustion chamber of a combustion engine. The combustion chamber delivery device "fuel"/water outlet of the injector is located directly into the combustion chamber of the engine called Direct Injection, Direct injection as commonly understood seals the nozzle or end of the injector against the wall of the cylinder/chamber/head to allow peripheral or outer wall sealing of the combustion chamber to prevent heat through exhaust gas or compression intake air to pass between the head and the very end/nozzle exposed to the combustion chamber provides that the outlet orifice or tip of the nozzle of the direct injector is the only area of the injector exposed to the chamber. In this invention the entire nozzle area is exposed to the combustion chamber not just the orifice or very tip of the nozzle, is current technology of direct injection of bio/fossil fuels. The exposure of the entire nozzle area provides a further heating phase as explained earlier in this document and is part of the process of this invention. The pressurised "fuel"/water is delivered to, and stored in, the combustion chamber delivery device under pressure providing conditions to maintain its liquidity prior to ejection at temperature into the combustion chamber. The invention also provides a device for heating "fuel"/water, comprising a nozzle for holding at least one charge of water; the nozzle being positioned and heated by heat generated in a combustion chamber of an internal combustion engine. The nozzle in turn heating at least one charge of water. This embodiment of the invention further provides a water injector for injecting "fuel"/water into a combustion chamber of a combustion engine, comprising: a body having an inlet port for receiving water; a nozzle connected to the body for delivering charges of the water to the combustion chamber; and a metering mechanism within the body and movable relative to the body to deliver single charges of water into the combustion chamber, movement of the metering device relative to the body being lubricated by the "fuel". The present invention still further provides a system for delivering water to a combustion chamber of an internal combustion engine, comprising: a pressurising device for pressurising the water; and; a heating device for heating the "fuel"/water in fluid communication with the pressurising device, so the water passing through the system is pressurised and heated before being delivered to the combustion chamber. Some embodiments of the present invention may result in the use of water as a fuel in an internal combustion engine. In such embodiments, the water may replace all or part of the fuel that would otherwise have been combusted in the internal combustion engine. Some embodiments of the present invention may provide a reduction of greenhouse gas emission and other pollutants from internal combustion engines. Other embodiments may partly or entirely replace polluting internal combustion engine exhaust products with water. Since there is no traditional fuel source (e.g. diesel or petrol) there is no flame front into which to inject charges of water. There is therefore no combusting fuel to provide a flame front as a heat source for initiating thermolysis of the water. To thermalize the water, each of the water injectors includes an electrical supply port that connects each water injector to a source of electricity. The electrical supply port electrically connects a spark (e.g. plasma spark) tip with the power source so as to cause a spark in the heated, pressurised water. Systems including sparking tips, and such as standard spark plugs. In this embodiment of the invention the application is for gasoline (petrol) engines, that require spark ignition of the fuel. These types of engine are normally or commonly understood to have a low combustion chamber compression rate or ratio and require a modified spark output to assist with the transition. This ratio is the difference between the total volume of the engines cylinder that houses the engine piston between the top of the engine block and when the piston is at bottom dead centre within that cylinder as compared to the total volume of the combustion chamber area alone. The later can be a chamber formed in the engine head itself or an area between the top dead centre position of the piston and the top of the engine block where the head meets the block and where a non-chambered head is used and or a combination of both to give the total actual volume for a combustion chamber. This principle is applied to all internal combustion engines including the engines referred to herein. This first embodiment of a gasoline engine version utilises the heated high pressure "fuel"/water of this invention and injects the "fuel"/water into the low compression ratio combustion chamber to effect the same transitions as previously described herein but now applies an electrical spark of this embodiment as a new strategy. In normally understood spark ignition systems the fuel is supplied to the combustion chamber first either by upstream injection or direct injection.

In the normally understood systems this is the only way it can be done as any Bio/Fossil fuel requires time to convert to a combustible vapor in order that the spark can ignite the vapor/intake air mix. Therefore, the spark is at all times following or subsequent to the introduction of a fuel. This embodiment of the invention performs the ignition function in reverse and opposite to current and commonly understood spark ignition and fuel injection strategies. A high voltage spark in a ranging upwards from 150,000 Volts. This embodiment utilises voltage ranging from 400,000 Volts to 1,700,000 Volts and greater. This electrical discharge is performed each ignition cycle in each individual engine cylinder and can be a continuous discharge for the required period and or individual multiple discharges with only a micro second apart, thus giving the appearance of a single continuous event into the combustion chamber. The new sparking or ignition strategy of this embodiment is performed prior to and during the ejection of the "fuel"/water and or a Bio/Fossil fuel and is unlike normal ignition process in that the fuel is ejected into the spark rather than the spark being provided to the cylinder once the fuel is in the cylinder. The invented sparking system for this embodiment are components and principles unlike current or commonly understood sparking ignition systems and does not provide the spark to the combustion chamber to go to ground or battery earth/negative.

The combustion chamber is provided with 2 anodes as part of the construction of the invented sparking device of this embodiment of the invention. The sparking device receives the high voltage discharge from the modified ignition coil through the first anode. That anode then discharges the high voltage spark only to the second anode as part of the new circuit. Because the second anode is the earth/switching side of the circuit and not the commonly understood engine/battery earth circuit, thus the high voltage discharge will only travel between the two anodes in the combustion chamber to complete the new sparking circuit and does not require the engine/battery earth system to complete a normally/commonly understood engine sparking circuit. The new sparking device is of hollow construction of non-electrically conductive material with the 2 anodes inserted into the sides or walls of the sparking device so as to protrude into the combustion chamber side of the outlet of the device. Thus, causing the new high voltage spark to transverse the combustion chamber between the two anodes of the sparking device in a direct path of the incoming "fuel"/water. This direct spark interference with the ejecting "fuel"/water is due to the design of the new sparking device having a hollow centre where upon the "fuel"/water combustion chamber delivery device is installed in the hole in the sparking device thus allowing the ejecting "fuel"/water to fire between the two exposed anodes in the combustion chamber. The "fuel"/water as previously described is then ejected into the discharging spark. Unlike other multiple or dead spark systems which ignite the fuel mixture that is in the combustion chamber first with the initial discharge and follow up with further spark discharges to capture and combust any un-combusted fossil fuel, this new and inventive process utilises a new principle for this embodiment utilising the initial sparking to heat the "fuel"/water to support its transition to vapor then to a combustible gas as described previously and utilised in other embodiments herein; releasing the energy from those transitions lastly for the final release of energy as a combustible gas and igniting the transitioned "fuel"/water by both spark and elevated temperatures which are at the "fuel"/water's auto-ignition point. The dual ignition process caused in this embodiment of the invention ensures up to 100% combustion of the "fuel"/water. This sparking principle is total opposite and new compared to normally and commonly understood spark ignition systems as the normal combustion chamber sparking device (a spark plug) is heat rated so as to not increase combustion chamber temperatures and in fact to keep the combustion chamber as cool as possible whilst still providing a spark to ignite a Bio and or Fossil fuel. That by comparison to this inventions principle of utilising the spark to heat the "fuel"/water to aid in its transition for the release of it energy pre-combustion and subsequently after the spark heating and transitions the eventual spark ignition of the transitioned "fuel"/water in it gas form. The sparking process whilst utilising more than one spark to perform more than one function utilises far greater voltages than normally or commonly understood. These voltages range upwards of 30,000V and can be achieved by elevated capacitive discharges through one or more ignition coils, and or specifically modified capacitor discharge ignition (CDI) systems, producing voltages in the range of up to 1; 700,000V and thus and but not limited to multiple discharges producing the heat as per the principle herein required to transition the "fuel"/water into a gas and to ignite that gas as part of the whole process. A simple embodiment of the increased spark voltage is the use of an ignition coil that normally discharges 40,000V and add a 500 Volt capacitor. This means that instead of 12V on the primary side of the coil which would normally step up the output by 3,333.34 to 40,000 Volts, it now receives 512 volts directly to the primary and steps up the output to 1,706,666.67 Volts. This not only creates heat in the output spark but heats the coil. Controlling coil temperatures is easily achieved by immersing the entire coil into oil which also prevent spark jump between its terminals and causing spark output failure. The oil is circulated via a pump through a cooler to maintain an operating temperature of the coils. The coils are sealed in a vessel holding the circulating oil. The oil is an extremely poor conductor of electrical current and thus insulates the coil terminals.

The invention claimed is:

1. A method of operating an internal combustion engine having at least one combustion chamber and an actuator disposed therein being arranged to drive an output shaft of the engine, the method comprising:
   (i) generating supercritical water from a water feed stream;
   (ii) injecting the supercritical water into a combustion chamber;
   (iii) flash boiling the supercritical water to form water vapour within the combustion chamber;
   (iv) injecting and igniting an organic fuel into the combustion chamber to generate a flame front of at least 1,800° C. to initiate thermolysis of the water vapour to form hydrogen gas and oxygen gas in the combustion chamber; and
   (v) autoigniting the hydrogen gas within the combustion chamber to drive the actuator which drives the output shaft of the combustion engine.

2. The method according to claim 1, including injecting the organic fuel into the combustion chamber in an amount less than 60 wt % of the injected water to initiate thermolysis of the water vapour.

3. The method according to claim 1, including pressurising the water feed stream to a pressure ranging from 0 to 10,000 psi.

4. The method according to claim 3, including pressurising the water feed stream to a pressure ranging from 3,000-6,000 psi.

5. The method according to claim 1, including heating the water feed stream to a temperature of at least 374° C. to form the supercritical water.

6. The method according to claim 1, including heating the water feed stream using heat generated by exhaust gas generated from combustion of hydrogen and/or heat from the combustion chamber.

7. The method according to claim 1, including injecting the supercritical water into the combustion chamber across a pressure drop to form water vapour.

8. The method according to claim 1, including subjecting the hydrogen gas in step (iv) to a temperature above the auto-ignition temperature of hydrogen to combust the hydrogen.

9. The method according to claim 1, including subjecting the water vapour to one or more electrical discharges to also thermolyze the water vapour.

10. An internal combustion engine that generates energy from water, comprising:
   an actuator disposed within a combustion chamber, and connected to an output shaft;
   a fuel tank to contain water;
   a pump and a heat exchanger to generate supercritical water from the water;
   a combustion chamber;
   at least one fuel injector adapted to separately inject the supercritical water and an organic fuel into the combustion chamber, wherein flash boiling the supercritical water forms water vapour and the ignition of organic fuel generates a flame front of at least 1,800° C. to initiate thermolysis of the water vapour into hydrogen gas and oxygen gas in the combustion chamber, and wherein the hydrogen gas autoignites in the combustion chamber to drive the actuator which drives the output shaft.

11. The internal combustion engine according to claim 10, wherein the pump configured to pressurise the water to a pressure ranging from 0 to 10,000 psi.

12. The internal combustion engine according to claim 10, wherein the pump is configured to pressurise the water to a pressure ranging from 3,000-6,000 psi.

13. The internal combustion engine according to claim 10, wherein the heat exchanger is configured to heat the water up to 300° C.

14. The internal combustion engine according to claim 10, wherein the fuel injector is configured to heat the water feed stream to at least 374° C.

15. The internal combustion engine according to claim 10, wherein the fuel injector is in thermal contact with exhaust gas generated from combustion of hydrogen and/or heat from the combustion chamber.

16. The internal combustion engine according to claim 10, including two fuel injectors to separately inject the supercritical water and organic fuel into the combustion chamber.

17. The internal combustion engine according to claim 10, including an electrical discharging device that generates an electrical discharge in the combustion chamber to also thermolyze the water vapour.

18. The internal combustion engine according to claim 17, including an electrical discharging device adapted to generate a voltage of at least 150,000V.

19. The internal combustion engine according to claim 17, wherein the electrical discharging device includes two electrodes having a gap ranging from 2 mm to 25 mm between which the electrical discharge is generated.

* * * * *